Aug. 2, 1960 B. BRIGHTMAN ET AL 2,947,819

ELECTRONIC SWITCHING TELEPHONE SYSTEM

Filed March 13, 1958 34 Sheets-Sheet 1

INVENTORS.
BARRIE BRIGHTMAN
JAMES GORDON PEARCE
BY MATTHEW P. TUBINIS

F. H. Henson
ATTORNEY

LINE TERMINATING UNIT

Aug. 2, 1960 B. BRIGHTMAN ET AL 2,947,819

ELECTRONIC SWITCHING TELEPHONE SYSTEM

Filed March 13, 1958 34 Sheets-Sheet 9

Aug. 2, 1960 B. BRIGHTMAN ET AL 2,947,819

ELECTRONIC SWITCHING TELEPHONE SYSTEM

Filed March 13, 1958 34 Sheets-Sheet 13

Aug. 2, 1960 B. BRIGHTMAN ET AL 2,947,819

ELECTRONIC SWITCHING TELEPHONE SYSTEM

Filed March 13, 1958 34 Sheets-Sheet 15

Aug. 2, 1960 B. BRIGHTMAN ET AL 2,947,819

ELECTRONIC SWITCHING TELEPHONE SYSTEM

Filed March 13, 1958 34 Sheets-Sheet 16

Aug. 2, 1960 B. BRIGHTMAN ET AL 2,947,819

ELECTRONIC SWITCHING TELEPHONE SYSTEM

Filed March 13, 1958 34 Sheets-Sheet 18

ROUTE SELECTOR 17

Aug. 2, 1960 B. BRIGHTMAN ET AL 2,947,819

ELECTRONIC SWITCHING TELEPHONE SYSTEM

Filed March 13, 1958 34 Sheets-Sheet 22

INCOMING REGISTER 34

INCOMING REGISTER 34

INCOMING REGISTER 34

INCOMING REGISTER 34

Aug. 2, 1960 B. BRIGHTMAN ET AL 2,947,819

ELECTRONIC SWITCHING TELEPHONE SYSTEM

Filed March 13, 1958 34 Sheets-Sheet 31

PULSE CHART

United States Patent Office 2,947,819

Patented Aug. 2, 1960

2,947,819

ELECTRONIC SWITCHING TELEPHONE SYSTEM

Barrie Brightman and James Gordon Pearce, Rochester, and Matthew P. Tubinis, Penfield, N.Y., assignors to General Dynamics Corporation, Rochester, N.Y., a corporation of Delaware Filed Mar. 13, 1958, Ser. No. 721,241

46 Claims. (Cl. 179—18)

This invention relates in general to electronic switching systems and, more particularly, to electronic switching automatic telephone systems.

Many types of automatic switching systems have been developed for connecting the lines of telephone, telegraph, and other communications systems together for the purpose of transmitting signals between the lines. Most of the switching systems developed for this purpose have utilized electromechanical devices, such as relays and stepping switches. In recent years, electronic switching systems have been proposed to overcome the inherent limitations of slowness, physical size, power requirements, and maintenance problems of the electromechanical devices.

Most of the proposed electronic telephone systems are of the step-by-step type in which the link used to establish a call is held operated for the duration of the call. In offices serving a large number of lines, it is more economical to use systems of the common control type in which a register sender is associated with a calling line only for the period of time required to establish a connection to the desired called line.

Accordingly, it is the general object of this invention to provide a new and improved telephone system.

It is a more particular object of this invention to provide a new and improved electronic switching telephone system of the common control type.

In the electronic switching common control telephone system herein disclosed, the line terminating units, which may be line circuits terminating subscriber lines or trunk circuits terminating trunk lines, and the registers in the office are interconnected by transmission highway networks of the time division channel type. Each of the line terminating units and each of the registers comprises a channel identification storage circuit and the storage cricuits are all interconnected by a control network. A channel allotter provided in the system is controlled to apply marking signals corresponding to a transmission network having an idle channel therein and an idle channel within that transmission network to the control network on a one at a time basis for the purpose of assigning an individual channel for the transmission of called unit selecting information between a calling line and an assigned one of the registers. When a register has been assigned for use and the identity of an idle channel is being marked over the control network, a calling unit finder provided in the system serves to transmit an enabling signal to each of the units in turn. When the enabling signal is received by a calling one of the units, the storage circuit in that unit is controlled to read in the network and channel marking signals applied to the control network by the channel allotter. Simultaneously therewith, the calling unit transmits a register start signal to the registers for the purpose of controlling the storage circuit in the assigned register to also read in the marking signals appearing on the control network. The channel allotter is then controlled to apply the marking signals identifying the next idle channel to the control network for the purpose of assigning the next idle channel to another calling unit and the next register assigned for use.

The storage circuits in the calling unit and in the register associated with that unit, by virtue of the seizure of the same channel, thereafter control the connection of the associated calling line and register, respectively, to the transmission network in the time position of the channel identified by the marking signals read into those storage circuits. Voice frequency dialing signals transmitted over the calling line are transmitted to the register in the seized channel and are there utilized to register the designation of the called unit. The storage circuits in registers having the designations of called units registered therein are controlled on a one at a time basis by a register finder to read out the network and channel marking signals corresponding to the individual channels seized by those registers to the control network. The channel allotter is controlled to discontinue the application of marking signals to the control network whenever any one of the registers is being read out. Simultaneously with the reading out of the storage circuit in any one of the registers, a selector is controlled in accordance with digit marking provided by that register to select the called unit and the storage circuit in the selected called unit is controlled to read in the network and channel marking signals applied to the control network by that register. The calling unit finder is inhibited during the operation of the selector so that enabling signals are not transmitted to the line terminating units by the finder during this period to insure that the channel marked by a register cannot be seized by a calling line. When the channel identification has been read in by the storage circuit in the called unit, the register, the register finder, and the selector are released and the channel allotter is again controlled to apply marking signals to the control network. Thus, a talking connection is completed between calling and called units over an individual channel on one of the highway networks and the common equipment utilized to establish the connection is freed for use on another call.

Release of the calling and called units is controlled by voice frequency release signals transmitted over the calling and called lines when the call is terminated and the channel used in the connection is marked as idle to the channel allotter by a monitor circuit which continuously scans the channels of its associated transmission network for release signals.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise thirty-five figures on thirty-four sheets.

Fig. 1 shows the trunking diagram of a telephone system in which the invention may be embodied.

Figs. 2 and 3, which should be arranged with Fig. 3 to the right of Fig. 2, show a long distance switching center in block diagram form.

Figs. 4–10, inclusive, when arranged as shown in Fig. 35, show circuit details of a line terminating unit for use in a long distance switching center.

Figs. 11 and 12, when arranged with Fig. 12 to the right of Fig. 11, show circuit details of a seize and release scan circuit for use in a long distance switching center.

Figs. 13–17, inclusive, when arranged as shown in Fig. 35, show circuit details of a transmission highway monitor circuit for use in a long distance switching center.

Figs. 18–20, inclusive, when arranged as shown in Fig. 35, show circuit details of a control counter circuit and a calling unit finder circuit for use in a long distance switching center.

Figure 23:
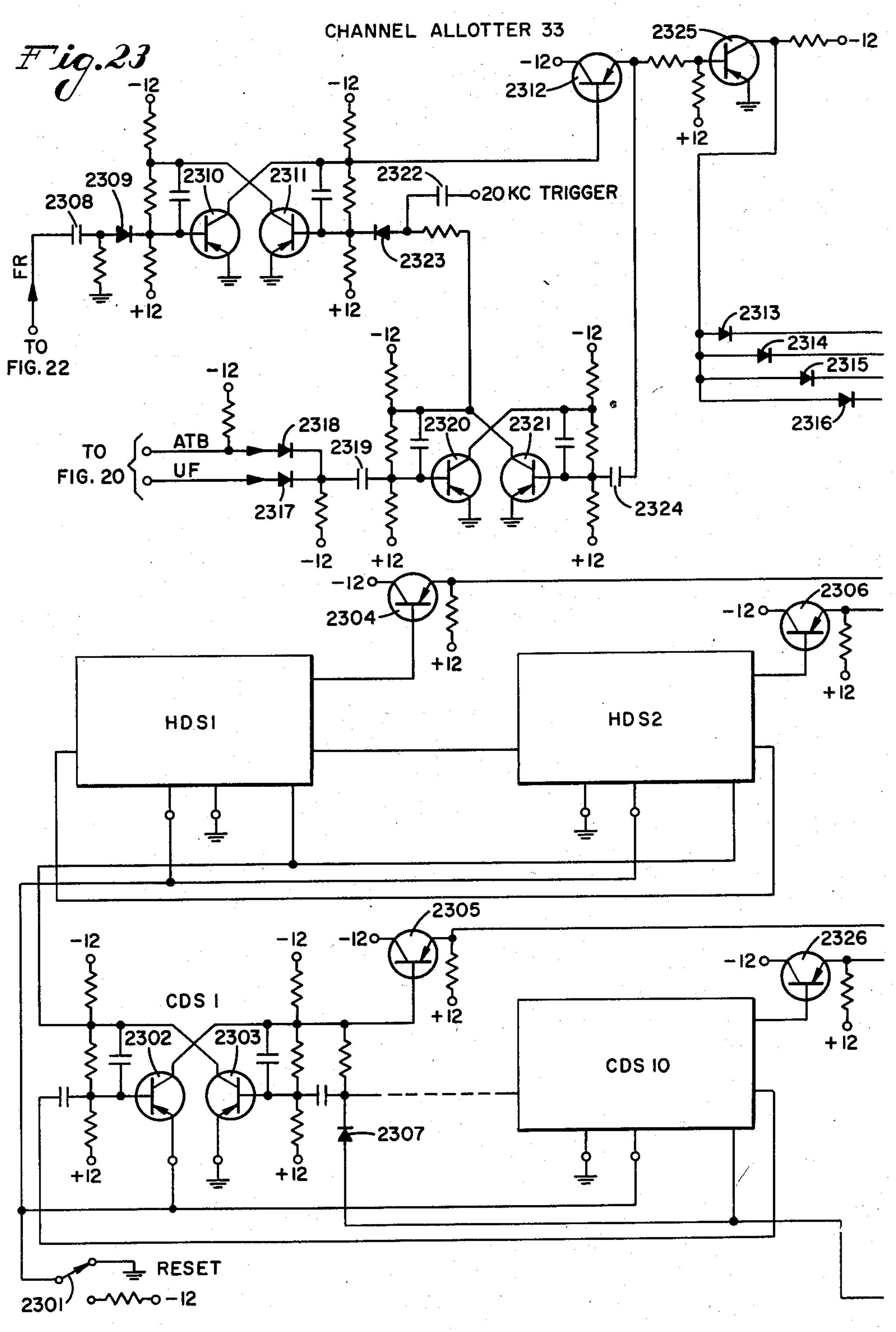
Figure 24:
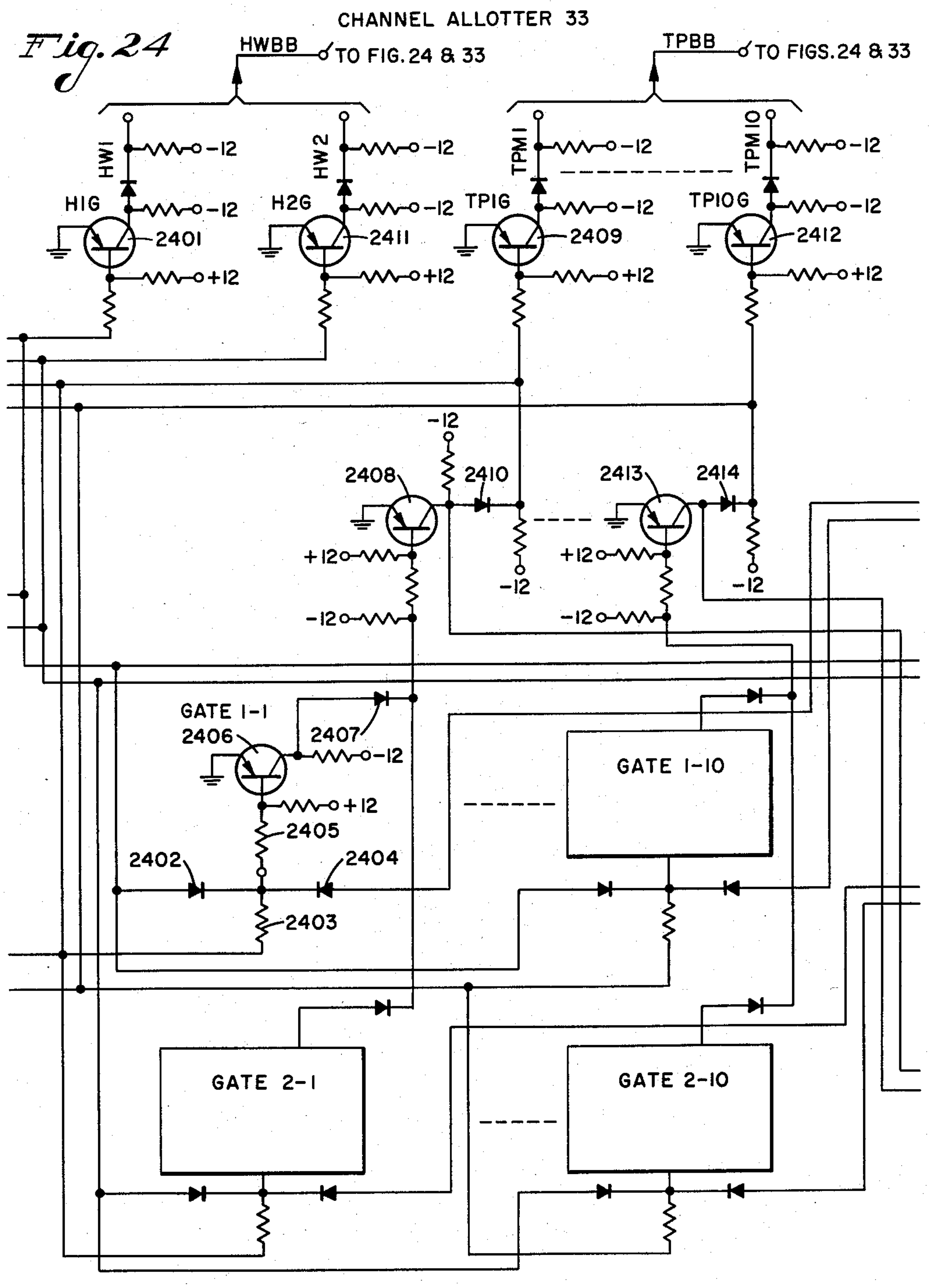
Figure 25:
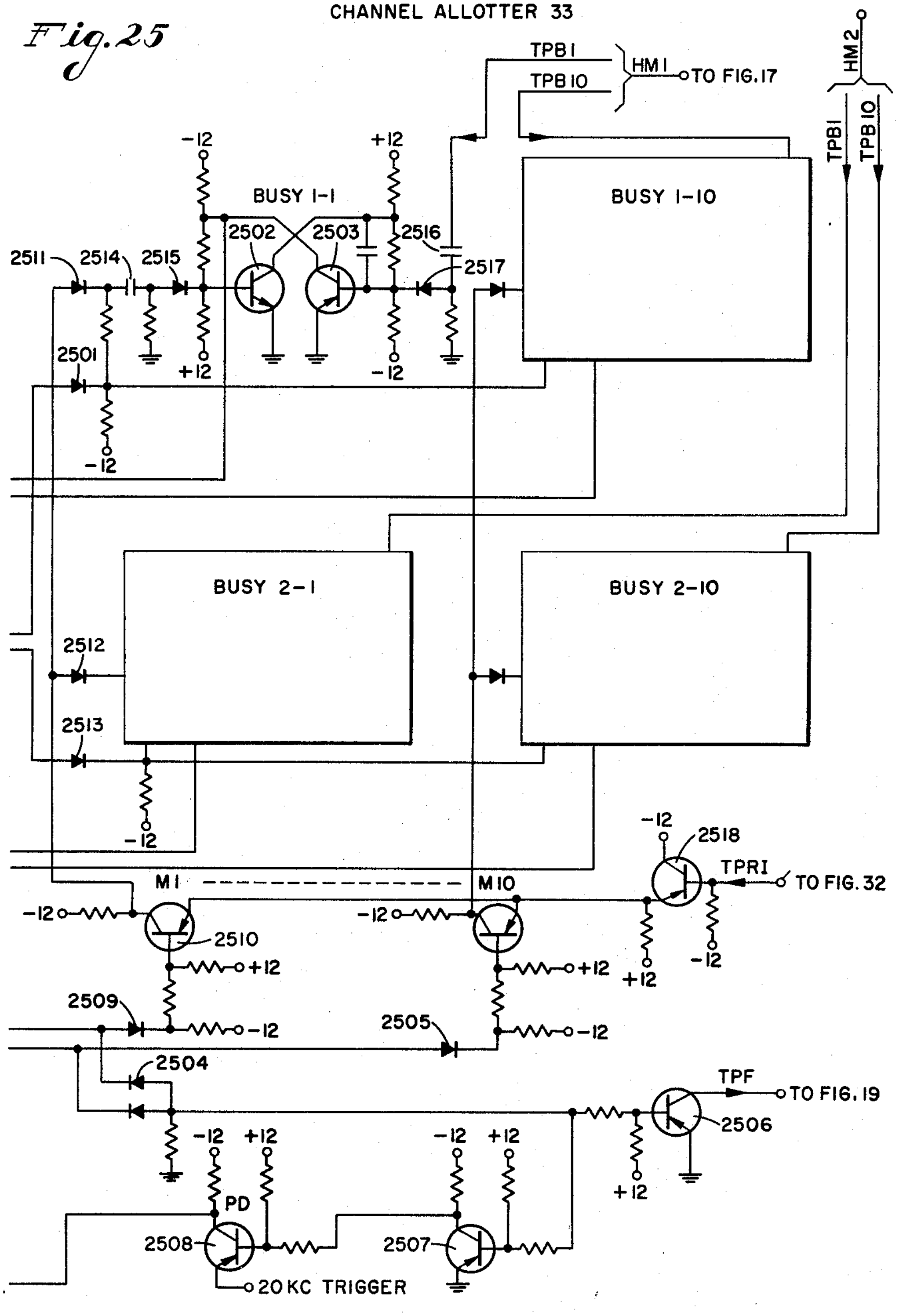
Figure 26:
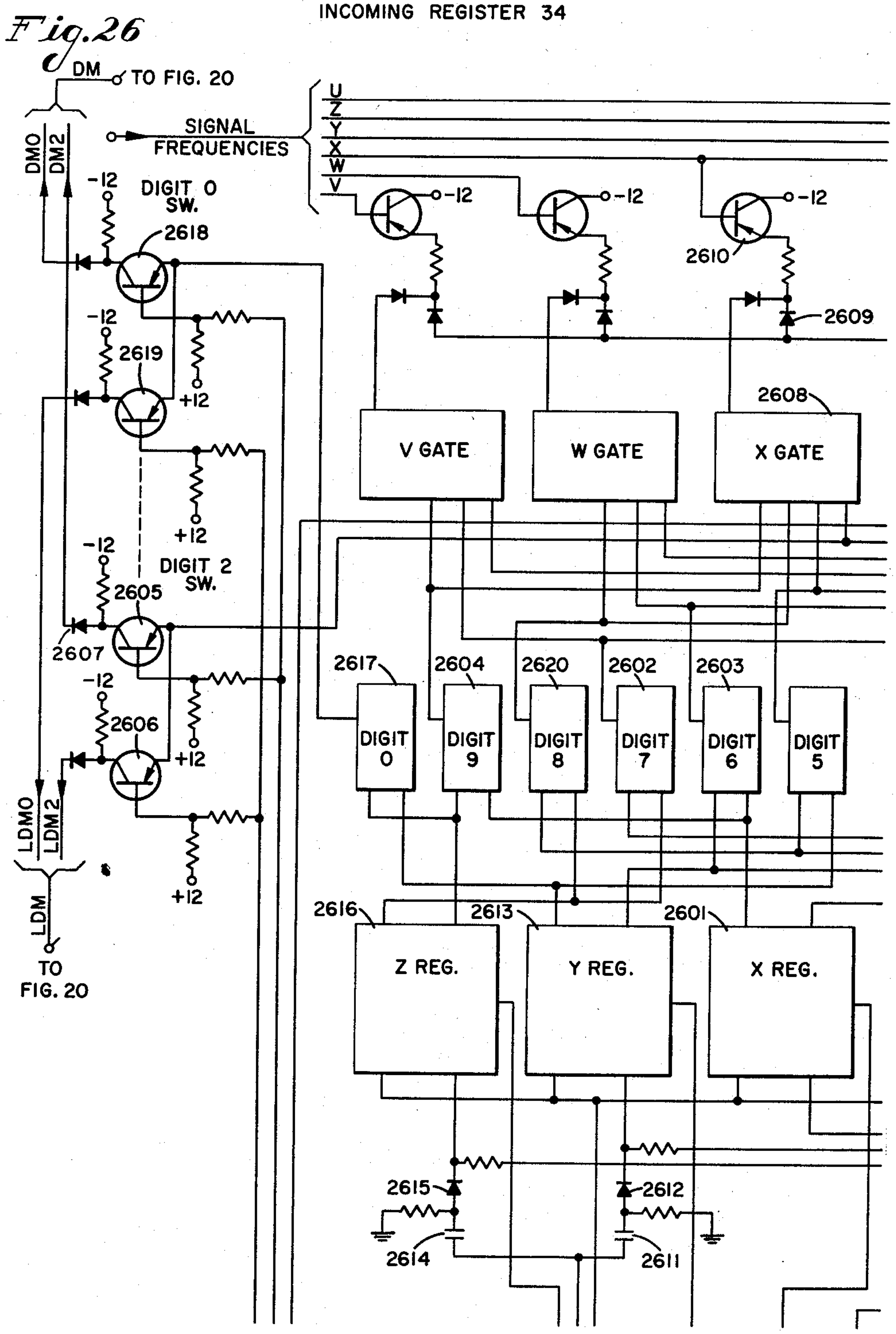
Figure 27:
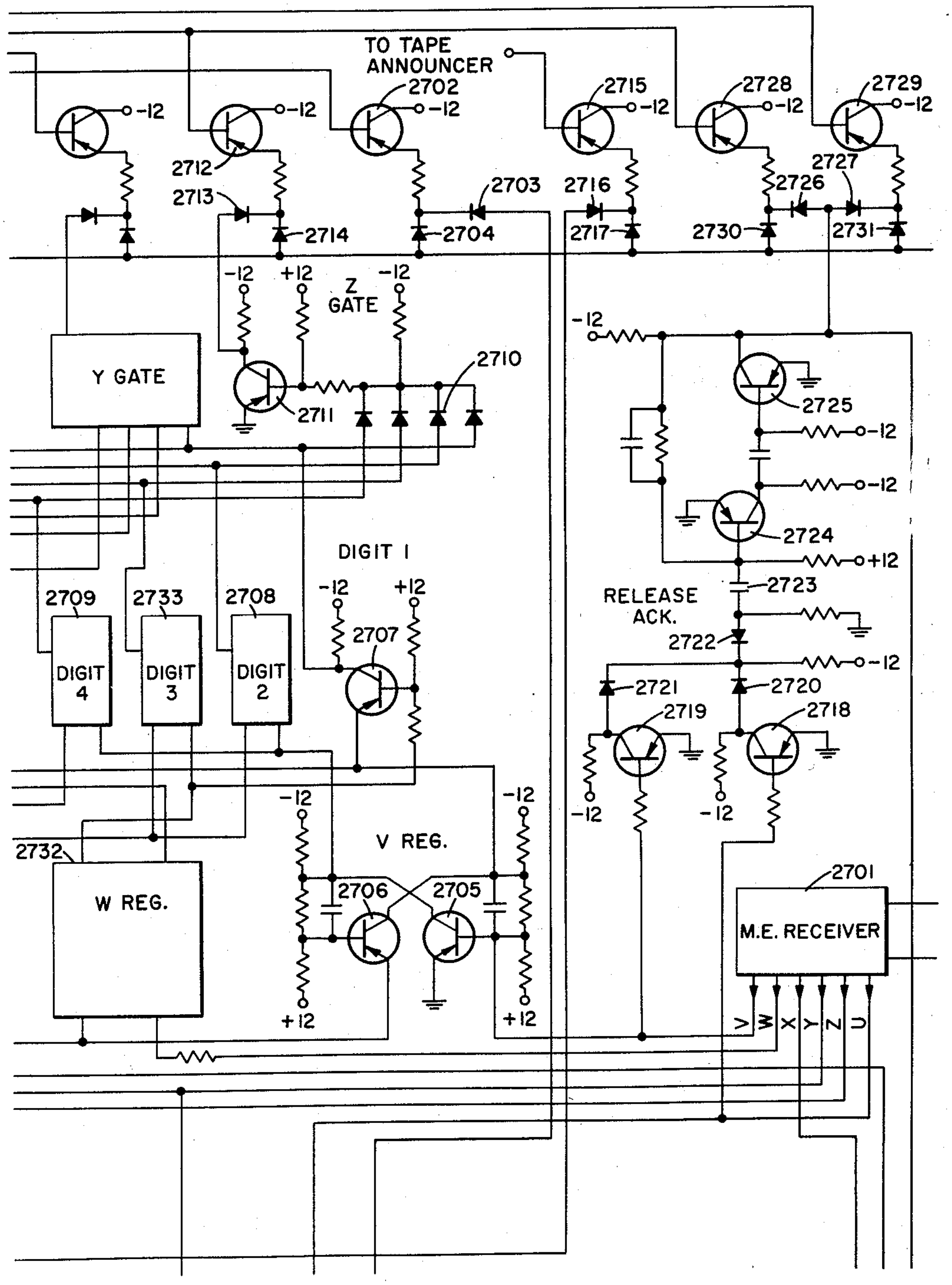
Figure 35:
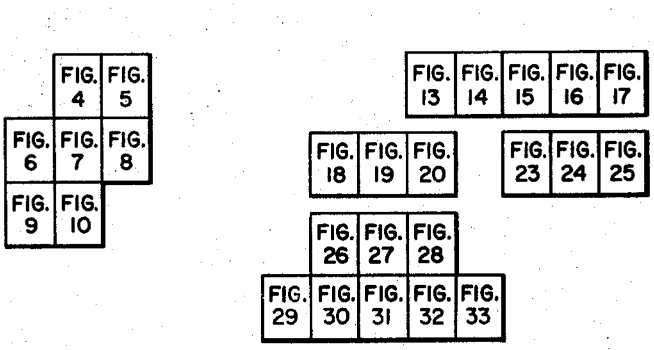

Figs. 23–25, inclusive, when arranged as shown in Fig. 35, show circuit details of a channel allotter for use in a long distance switching center.

Figs. 26–33, inclusive, when arranged as shown in Fig. 35, show circuit details of an incoming register for use in a long distance switching center.

Figure 34:
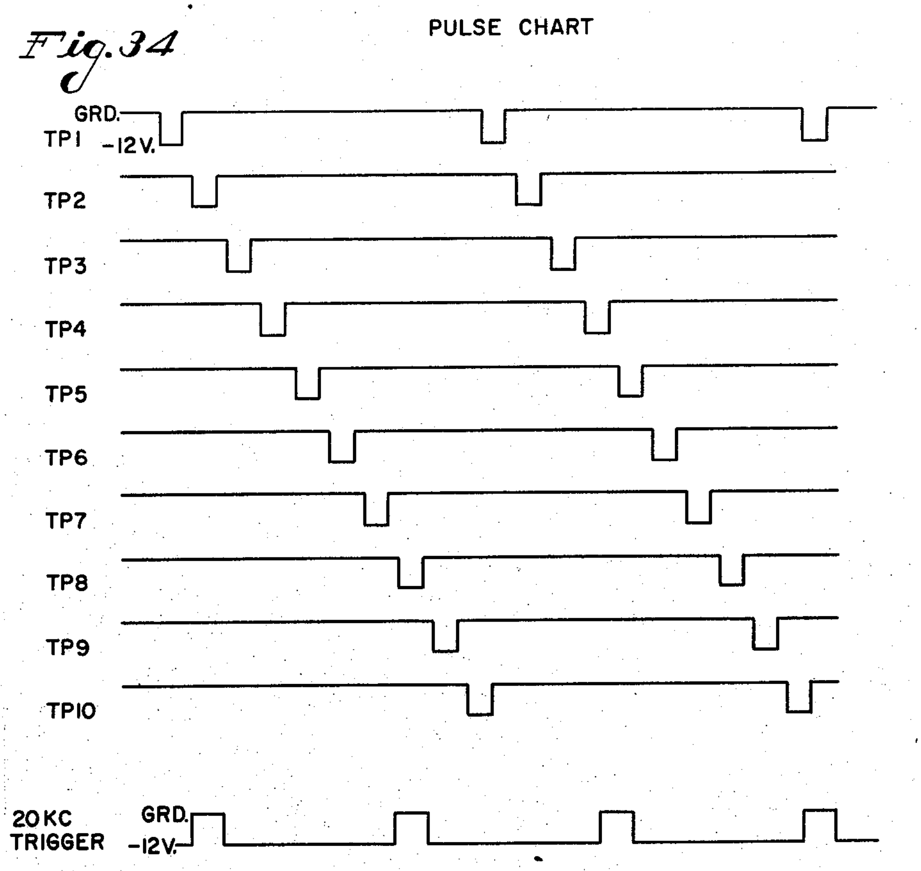

Fig. 34 is a pulse chart of control pulses used in the disclosed system.

Figure 1:
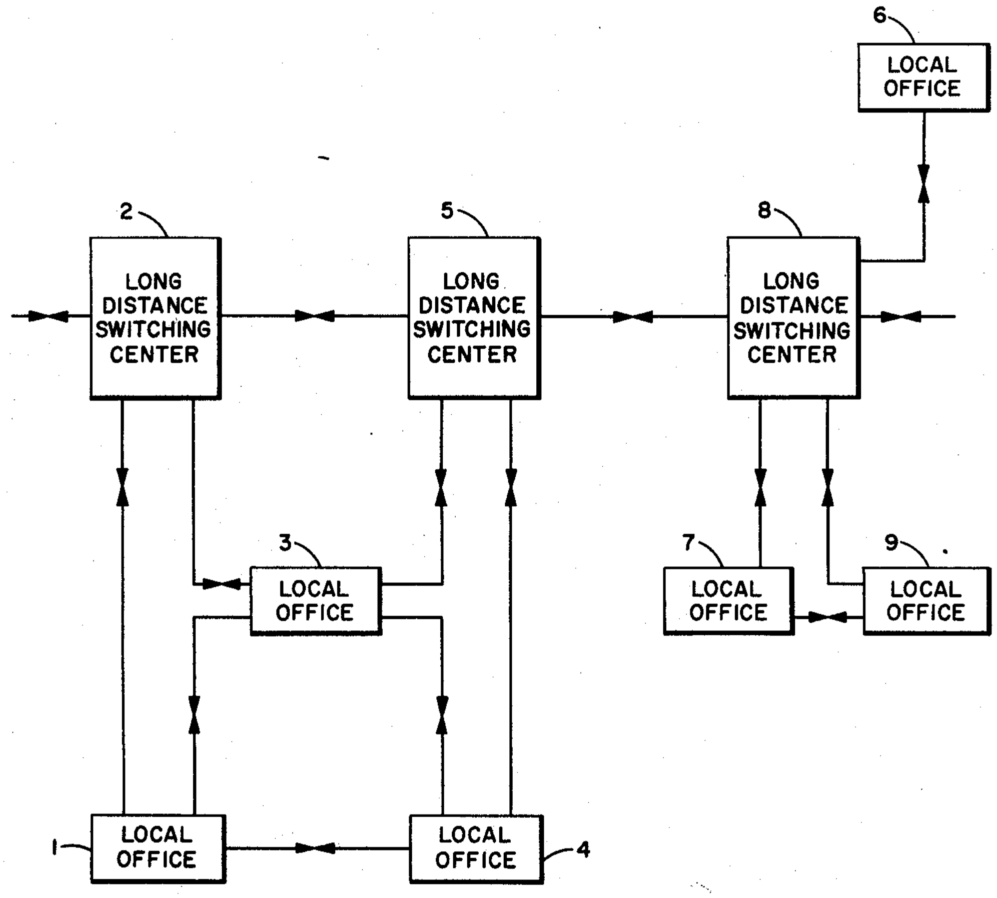
Figure 2:
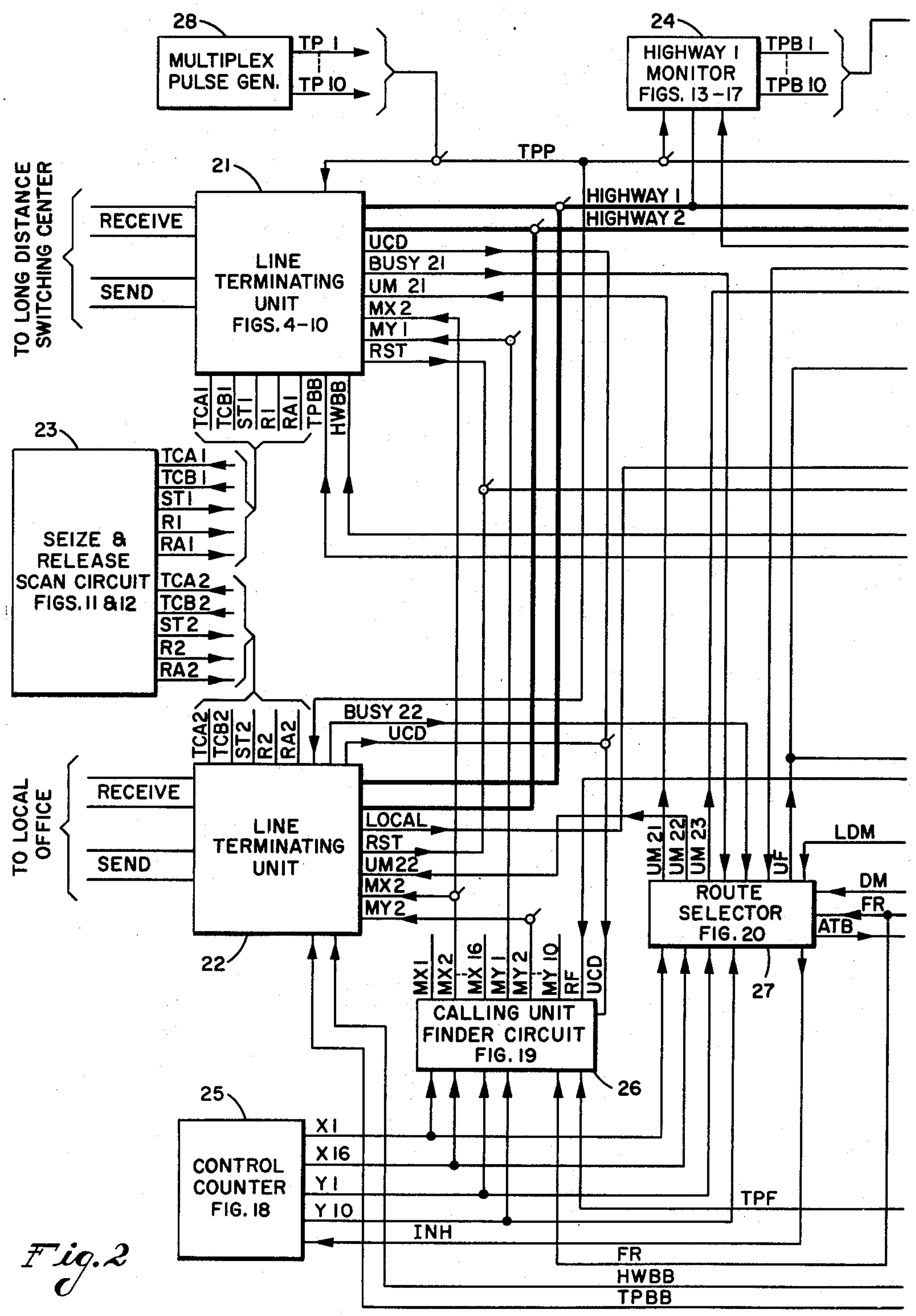
Figure 3:
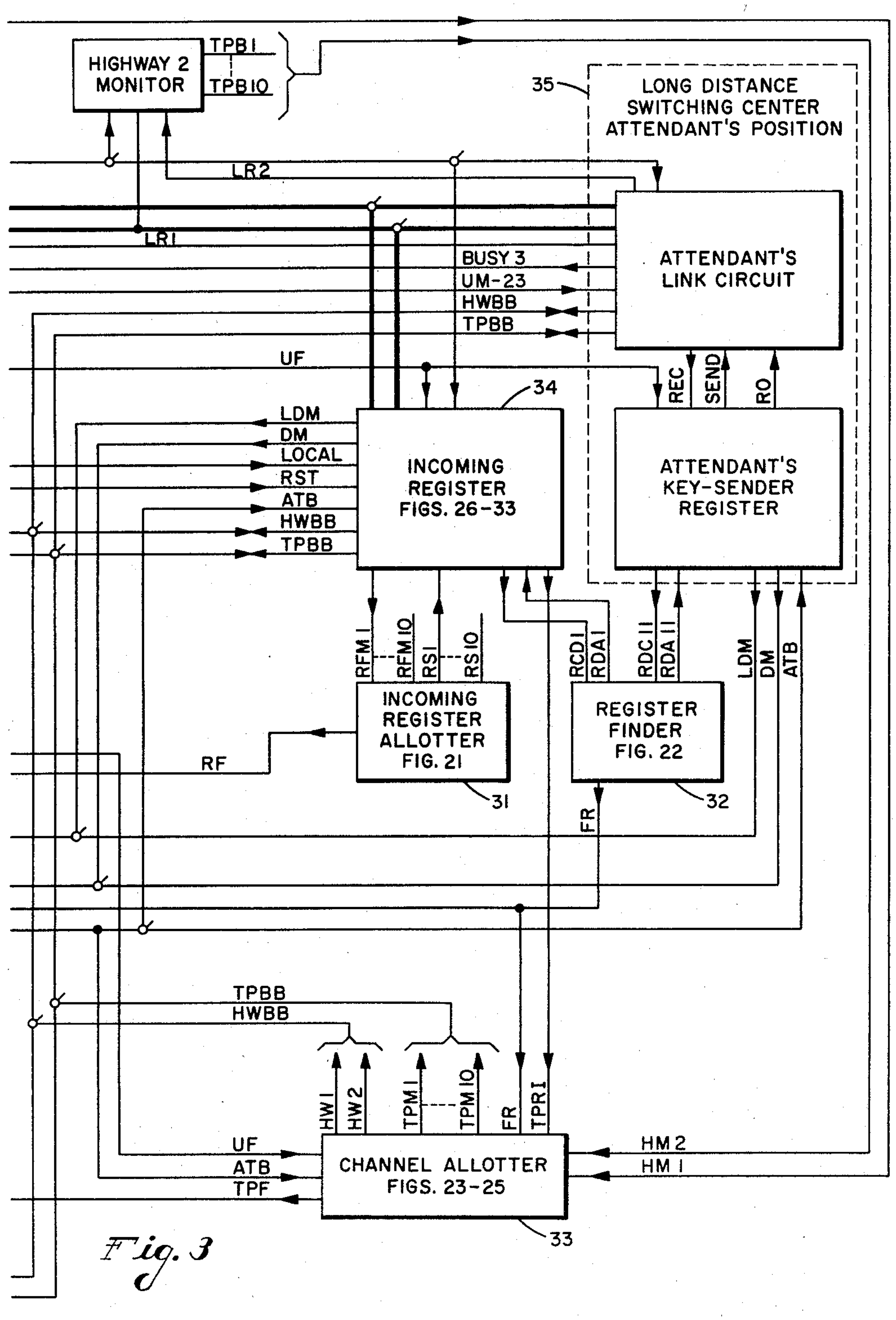

The overall operation of the system in which the invention has been illustrated can best be understood by reference to Figures 2 and 3 in conjunction with reference to the trunking diagram shown in Fig. 1. The invention has been illustrated as being embodied in a system developed for the military, but the principles taught by the invention can be practiced in commercial type telephone systems.

As shown in Fig. 1, calls between subscribers in different local offices may be routed through one or more long distance switching centers. For example, a call from a subscriber in local office 1 to a subscriber in local office 9 is routed through long distance switching centers 2, 5, and 8. The call is initiated by the transmission of a voice frequency seize signal over a trunk line interconnecting office 1 and long distance switching center 2, which trunk line is four-wire and may be either physical wire or a radio link. In long distance switching center 2, the line terminating unit terminating that trunk line is marked as a unit terminating a trunk line from a local office. For example, unit 22 in Fig. 2 is identified as a local unit by the inclusion of conductor local, which extends between unit 22 and incoming register 34. In response to the seizure of unit 22 and the subsequent marking of conductor local, incoming register 34 is controlled to automatically route the call to the attendant's position 35 in that long distance switching center. In accordance with instructions received over the connection from the originating subscriber at local office 1, the attendant at position 35 then keys the number of the desired subscriber in local office 9 on the key set associated with the key sender register at position 35. The keyed number comprises routing digits corresponding to long distance switching centers 5 and 8, an arbitrary digit which may be the digit "1," identifying local, a digit corresponding to local office 9, and the number assigned to the desired subscriber station in local office 9. The common equipment in long distance switching center 2 then functions to seize an idle terminating unit, such as unit 21 in Fig. 2, which terminates a trunk line extending to long distance switching center 5, and a seize signal is transmitted over that trunk line to seize the unit terminating that trunk line in long distance switching center 5. In long distance switching center 5, an incoming register, such as incoming register 34 of Fig. 3, then controls the common equipment, in accordance with the digit received from the key sender register in office 2, to select an idle terminating unit which terminates a trunk line extending between long distance long distance switching centers 5 and 8. The operation in long distance switching center 8 is identical to that just described in long distance switching center 5 with the exception that the arbitrary digit "1" followed by the digit corresponding to local office 9 control the incoming register 34 in that office to control the selection of an idle terminating unit extending to local office 9 in the groups of local terminating units. The key sender register in long distance switching center 2 then controls the switching equipment in local office 9 to select the desired called station. Thus, it can be seen that the extension of a call is controlled from the attendant's position at the first long distance switching center encountered, the intermediate switching centers are each controlled by a single digit to select an idle trunk line to the next long distance switching center, and the final long distance switching center is controlled by two digits to select the desired local office.

Figures 2 and 3, which show in block diagram form the equipment located at any one of the long distance switching centers, will now be described in more detail. Although just two line terminating units, namely, units 21 and 22, have been shown, it is to be understood that there is supplied a group of line terminating units 21 for each long distance switching center accessible to the illustrated long distance switching center, and a group of line terminating units 22 for each local office accessible to the illustrated long distance switching center. For example, long distance switching center 5 comprises a group of line terminating units, such as unit 21, which terminate trunk lines between long distance switching centers 2 and 5 and a group of line terminating units, such as unit 21, which terminate trunk lines between long distance switching centers 8 and 5. Long distance switching center 5 also comprises a group of line terminating units, such as unit 22, which terminate trunk lines between local office 3 and long distance switching center 5 and a group of line terminating units, such as unit 22, which terminate trunk lines between local office 4 and long distance switching center 5. Similarly, only one incoming register, namely, incoming register 34, has been shown but it is to be understood that the number of incoming registers actually employed will be determined by the existing traffic conditions.

The line terminating units, such as 21 and 22, the incoming registers, such as 34, and the attendant's link circuits, such as the one illustrated at position 35, are all interconnected by one or more transmission highway networks. Two transmission highway networks are shown and are labeled highway 1 and highway 2. Each of the transmission highway networks comprises four wires carrying ten time division multiplex channels. Multiplex pulse generator 28 is provided in the system for the purpose of continuously providing recurring pulses on conductors TP1–TP10, which pulses individually identify the ten channels in each highway network. The pulses applied to conductors TP1–TP10 by multiplex pulse generator 28 may have a recurrence frequency of 12 kc. Preferably, each pulse persists for approximately four microseconds and a guard time of approximately four microseconds is provided between pulses. The pulses applied to conductors TP1–TP10, and which are graphically illustrated in Fig. 34 of the drawings, are routed over cable TPP to all of the line terminating units, to each of the highway monitor circuits, to each of the attendant's link circuits, and to each of the incoming registers. As will be more fully described hereinafter, the above-described pulses are used in each of these circuits to periodically activate switches within each of the circuits for the purpose of connecting that circuit to a selected one of the highway networks in a selected time division channel.

The line terminating units, the incoming registers, and the attendant's link circuits are also interconnected by a control network comprising bus bars HWBB and TPBB. Since the illustrated system includes two highway networks, the highway marking bus bar HWBB comprises the two conductors HW1 and HW2. The time position marking bus bar comprises ten conductors TPM1–TPM10, inclusive. Channel allotter 33 is controlled to apply a D.-C. potential to one of the highway marking conductors and to one of the channel marking conductors at any given time for the purpose of individually assigning an idle channel to each calling line.

To illustrate the operation of the system, assume that channel allotter 33 is applying a D.-C. potential to conductors HW1 and TPM1 to thus identify channel 1 on transmission highway network 1 as the next idle channel to be assigned for use. Also assume that incoming register 34 has been assigned for use by incoming register allotter 31. Incoming register allotter 31 comprises a ring circuit having a number of stages equal to the number of incoming registers and is controlled to seize the next idle register when the previously assigned register is taken into use. An idle register is identified by the presence of potential on an individual register free marking conductor, such as RFM1, and is seized by the allotter by the application of a potential to an individual register seize conductor, such as RS1. Next assume that a voice frequency seize signal appears on the receive conductors of the trunk line terminated by line terminating unit 21. The trunk line receive conductors are coupled within unit 21 to conductors TCA1 and TCB1, which extend to seize and release scan circuit 23. Circuit 23 is associated with ten or more terminating units and is controlled to continuously scan the TC conductors from each of its associated terminating units for seize, release, and release acknowledge signals. By using a common circuit, such as 23, a single multifrequency receiver is shared by ten or more units instead of having an individual receiver provided for each terminating unit. When the multifrequency receiver in circuit 23 is connected to conductors TCA1 and TCB1, the voice frequency seize signal appearing on those conductors is detected by circuit 23 and a potential is applied to start conductor ST1 to seize line terminating unit 21. Unit 21 is responsive to the receipt of a start potential on conductor ST1 to apply potential to unit connect demand conductor UCD, which is common to all of the units and which extends to calling unit finder circuit 26. Unit 21 also functions at this time to apply potential to busy conductor busy 21 for the purpose of marking unit 21 busy to route selector 27.

Control counter 25, which comprises a sixteen stage ring counter driven from the output of a ten stage ring counter, is controlled to supply X and Y marking signals, which, in pairs, correspond to individual ones of the terminating units, to calling unit finder circuit 26 and to route selector 27. The tens stage ring in control counter 25 is driven by 20 kc. clock pulses, of the type shown in Fig. 34, and the sixteen stage ring is driven by the tenth stage of the ten stage ring. An output signal is taken from each stage of each ring and applied to an individual conductor. Thus, while a signal is appearing on conductor X1, ten successive pulses appear on conductors Y1–Y10, inclusive. The sixteen stage ring is then advanced to mark conductor X2 and conductors Y1–Y10 are again marked in turn. Calling unit finder circuit 26 functions to repeat the marking signals received over conductors X1–X16, inclusive, and Y1–Y10, inclusive, to marking conductors MX1–MX16, inclusive, and MY1–MY10, inclusive, respectively, only when potential is applied to the unit connect demand conductor UCD by one or more calling units, when a register has been assigned for use as denoted by the application of potential to register found conductor RF by the incoming register allotter 31, and when an idle channel is being marked on the control network as denoted by the application of potential to the time position found conductor TPF by channel allotter 33.

Since it was assumed that channel allotter 33 is applying marking signals corresponding to channel 1 on highway network 1 to the control network, that incoming register 34 is assigned for use, and that terminating unit 21 is applying potential to conductor UCD, the calling unit finder circuit 26 now functions to repeat the marking signals received over conductors X1–X16, inclusive, and Y1–Y10, inclusive, to conductors MX1–MX16, inclusive, and MY1–MY10, inclusive. When potential is applied simultaneously to conductors MX2 and MY1, the storage circuit in calling line terminating unit 21 is controlled to read in the highway and channel marking signals applied by channel allotter 33 to the highway and time position marking bus bars HWBB and TPBB, respectively. Also responsive to the receipt of potential on conductors MX2 and MY1, unit 21 serves to discontinue the application of potential to conductor UCD and serves to apply potential to common register start conductor RST. Conductor RST is gated with the individual register seize conductor, such as RS1 in register 34, in each of the incoming registers so that only the storage circuit in the assigned register is controlled to read in the highway and channel marking signals appearing on the control network when a potential is applied to conductor RST by one of the units.

When the storage circuit in register 34 has read in the highway and time position information, a signal is applied to time position read in conductor TPRI, which extends from the registers to channel allotter 33. The signal applied to conductor TPRI is effective in channel allotter 33 to mark channel 1 on highway 1 busy within the allotter so that that time position cannot be assigned to another call and the allotter 33 is further controlled to apply marking signals corresponding to the next idle channel to bus bars HWBB and TPBB.

Each of the line terminating units and each of the registers comprises a group of switches for connecting that unit or register to each of the transmission highway networks. In accordance with the channel and highway identifying information read into the storage circuit in any unit or register, the particular pulse on the one of the conductors TP1–TP10 corresponding to the assigned channel is gated to the group of switches corresponding to the assigned highway network and is there utilized to activate the switches. Thus in the assumed call, the switches associated with highway 1 in both line terminating unit 21 and in incoming register 34 are turned on by time position 1 pulse TP1 in each frame of the recurring time position pulses and unit 21 and register 34 are thereby connected to highway 1 during time position 1. The seize signal appearing on the receive conductors of the trunk line terminated by unit 21 is now detected by a multifrequency receiver in register 34 and, responsive thereto, incoming register 34 serves to transmit a seize acknowledge signal to highway 1 and thus to unit 21 and the send conductors of the trunk line terminated by unit 21. Since unit 21 terminates a trunk line from another long distance switching center, the call being described is set up under control of a key sender register in a preceding long distance switching center. The key sender register in the originating long distance switching center is controlled by the received seize acknowledge signal to transmit compounded voice frequency signals corresponding to the digit designation of the next long distance switching center to be utilized in establishing the connection. The multifrequency receiver in register 34 detects the transmitted voice frequency signals corresponding to a particular digit and a digit register in register 34 is set in accordance therewith. The incoming register 34 then transmits a digit acknowledge signal back over the trunk line to the originating office. The digit acknowledge signal also comprises compounded voice frequency signals which correspond to the particular setting of the digit register in incoming register 34, but at least one of the signals in the digit acknowledge signal is of a different frequency than the frequency used to set the digit register. The digit acknowledge signal enables the originating key sender register to compare the setting of the digit register in incoming register 34 with the digital information transmitted by the key sender. If the setting of the digit register in incoming register 34 is correct, the originating key sender transmits a second seize signal over the trunk line to incoming register 34.

The second seize signal received by incoming register 34 controls register 34 to apply potential to register connect demand conductor RCD1, which extends to register finder 32. When register finder 32 finds register 34, as denoted by the application of potential to register demand answer conductor RDA1, register 34 is controlled to read out the channel identification information stored in its storage circuit to the highway and time position marking bus bars HWBB and TPBB, respectively. Simultaneously therewith, register 34 serves to apply potential to one of the digit marking conductors, identified as DM, in accordance with the designation of the called unit registered in the digit register of register 34. Also simultaneously therewith, register finder 32 applies potential to found register conductor FR, which extends to channel allotter 33, to route selector 27, and to calling unit finder circuit 26. The potential applied to conductor FR controls channel allotter 33 to terminate the application of marking potentials to the highway and time position bus bars HWBB and TPBB. The potential applied to conductor FR also controls the calling unit finder circuit 26 to terminate the application of marking potentials to the MX1–MX16 and MY1–MY10 conductors if circuit 26 is in the process of finding a calling unit. Thus when a register is reading out channel identifying information to the bus bars, the channel allotter is disconnected from said bus bars and the calling unit finder is disabled so that the time position marked by the register cannot be seized by a calling unit.

Route selector 27 is controlled by the marking applied to one of the conductors DM by the incoming register to select the desired called group of units and is further controlled by the signals successively applied to conductors X1–X16 and Y1–Y10 by control counter 25 and by busy marking signals applied to the busy conductors, such as busy 21 and busy 22, to select an idle unit in the selected group of units. If, as was assumed, the call is to be routed to another long distance switching center, a line terminating unit identical to unit 21 is seized by the route selector by the application of potential to the unit marking conductor, such as UM21, corresponding to that unit. If there is no idle unit available, route selector 27 applies a potential to all trunks busy conductor ATB which controls the incoming register 34 to return a busy signal to the originating office and also controls channel allotter 33 to resume its operation. When an idle unit in the called group is seized, route selector 27 functions to apply potential to the unit found conductor UF, which extends to the channel allotter, the incoming registers, and to the key sender registers. Simultaneously therewith, route selector 27 applies potential to inhibitor conductor INH, which extends to the control counter 25 for the purpose of momentarily halting the stepping of the ring circuits in that circuit so that the X and Y conductors corresponding to the seized unit remain marked for a short period of time. When the seized unit applies ground to its individual busy conductor, such as busy 21, the route selector removes potential from conductors UF and INH. Incoming register 34 is controlled by the potential applied to conductor UF and by the next occurring 20 kc. clock pulse, of the type shown in Fig. 34, to restore to its normal unoperated condition. Channel allotter 33 is controlled by the potential applied to conductor UF and by the next occurring clock pulse to re-apply the marking potentials corresponding to the next idle channel to bus bars HWBB and TPBB.

The storage circuits in the calling and called units now control the connection of their respective units to highway 1 during time position 1 for the transmittal of speech and supervisory signals between the units for the duration of the call.

At the termination of the call, a voice frequency release signal is transmitted over either the calling trunk line or the called trunk line and is detected by the seize and release scan circuit associated with either the calling unit or called unit, respectively. If it be assumed that a release signal appears on the receive conductors of the trunk line associated with line terminating unit 21, the receive signal is detected on conductors TCA1 and TCB1 by seize and release scan circuit 23, and circuit 23 functions to apply potential to conductor R1 which extends to unit 21. When potential is applied to conductor R1, unit 21 functions to apply a voice frequency release acknowledge signal to the send conductors of its associated trunk line for a purpose which will become apparent as the description proceeds. The release signal received over the trunk line also appears in time position 1 on highway 1 and is detected by a multifrequency receiver in highway 1 monitor circuit 24, which circuit is controlled to continuously scan the ten time position channels on highway 1 for release and release acknowledge signals. Unit 21 is released and its storage circuit returned to its normally unoperated condition responsive to the receipt of potential on conductor R1 but only after a time delay of sufficient duration to allow the release signal to be detected by highway 1 monitor circuit 24. The received release signal is regenerated in highway 1 monitor circuit 24 and applied in time position 1 to highway 1. The regenerated release signal is demodulated in the called line terminating unit and applied to the send conductors of the trunk line associated with the called unit. The regenerated release signal transmitted over the called trunk line serves to release the incoming line terminating unit in the succeeding long distance switching center after that unit has functioned to return a release acknowledge signal over the called trunk line to the illustrated long distance switching center.

The release acknowledge signal returned over the called trunk line is detected by the seize and release scan circuit associated with the called unit and potential is applied to the release acknowledge conductor, such as RA1, which extends to the called unit. The release acknowledge signal received over the called trunk line also appears in time position 1 on highway 1 and is detected in highway 1 monitor circuit 24. Highway 1 monitor circuit 24 is controlled by the received release acknowledge signal to terminate the regeneration of the release signal and to apply a potential to time position busy 1 conductor TPB1, which extends in highway monitor 1 cable HM1 to channel allotter 33. In channel allotter 33, time position 1 on highway 1 is marked as idle responsive to the receipt of a potential on conductor TPP1 in cable HM1. The called line terminating unit is released and its storage circuit returned to its normally unoperated condition responsive to the receipt of potential on conductor RA1 but only after a delay of sufficient duration to allow the release acknowledge signal to be detected by highway 1 monitor circuit 24. Thus, it can be seen that the release signal is regenerated in each succeeding long distance switching center and that the regenerated release signal is transmitted until a release acknowledge signal is received from the next succeeding office. This feature is incorporated in the illustrated system for the purpose of offsetting the effects of fading when radio links are used in the system.

The operation of the long distance switching center, shown in Figs. 2 and 3, is somewhat different from the above when a call is originated at a local office having access to the illustrated long distance switching center. As previously explained, the line terminating units which terminate trunk lines from local offices are characterized as such by a local conductor which extends between those units and the incoming registers. When a local office terminating unit, such as unit 22, is seized on a call from a local office to the illustrated long distance switching center, a potential is applied in that unit to conductor local simultaneously with the application of potential to the register start conductor RST. Under these conditions, the assigned incoming register is controlled to automatically store the digit corresponding to the attendant's link circuits, which digit may be the digit "0," in its digit register. The incoming register immediately calls for the register finder and the route selector is controlled to seize an idle one of the attendant's link circuits at position 35. The time position and highway information stored in the incoming register is read out to bus bars HWBB and TPBB and read in by a storage circuit in the seized link in the exact same manner as previously described. Thus, responsive to seizure, the calling line terminating unit and an idle one of the attendant's link circuits are connected to an idle channel on one of the highway networks.

In accordance with oral instructions received over the trunk line and transmitted in the assigned time position on the assigned highway network to the link circuit, the operator at the attendant's position 35 keys the digits corresponding to the route required to reach the desired called party. The digits are stored in the key sender register and at the end of the keying operation, which may be indicated by the operation of an end of selection key, the illustrated key sender register applies potential to register connect demand conductor RCD11. When the key sender register is found by register finder 32, as denoted by the application of potential to register demand answer conductor RDA11, the key sender register applies potential to read out conductor RO, which extends to the assigned link circuit. The assigned link is controlled by the potential applied to conductor RO to control its storage circuit to read out the stored highway and channel marking information to bus bars HWBB and TPBB. Digit marking information corresponding to the first digit stored in the digit register in the key sender register is simultaneously applied to one of the digit marking conductors DM for the purpose of controlling route selector 27 to seize an idle unit in the group of line terminating units corresponding to said digit marking. The key sender register then applies a seize signal to the assigned channel on the assigned highway for the purpose of seizing an incoming unit in the succeeding long distance switching center over the trunk line terminated by the selected called unit in the illustrated long distance switching center. The remaining digits stored in the key sender register are transmitted to and through the succeeding long distance switching centers in the same manner as previously described. Circuit details of attendant's position 35 have not been shown in this application since these details are not necessary for the understanding of the present invention. Circuit details of an attendant's position suitable for use in the illustrated system are shown and described in copending application Serial No. 729,351, now Patent No. 2,897,283 and is assigned to the same assignee as the present invention.

The operation of the illustrated long distance switching center is slightly different from the above when the desired called line is associated with a local office associated with the illustrated long distance switching center. As previously described, an arbitrary digit "1" is prefixed to the digit identifying the terminating local office so that the incoming register, such as 34, is controlled to apply the digit marking corresponding to the designation of the desired local office to a local set of digit marking bus bars, such as LDM. This feature is included in the illustrated system so that the long distance switching center can serve more than ten groups of local and long distance trunk lines.

DETAILED DESCRIPTION

All of the transistors used in the system are of the junction type and all of the transistors have been given the conventional notation of an arrow superimposed on the emitter electrode. The direction of the arrow, of course, designates whether the particular transistor is of the NPN or PNP junction type. A NPN junction transistor is identified by an arrow which points away from the base electrode while a PNP junction transistor is identified by an arrow which points toward the base electrode. Insofar as the base and emitter of a transistor are concerned, the transistor is biased for conduction whenever the N-type material is negative with respect to the P-type material. Thus, a PNP junction transistor is biased for conduction whenever the base is negative with respect to the emitter, and a NPN junction transistor is biased for conduction whenever the base is positive with respect to the emitter.

*Line terminating unit*

Figure 10:
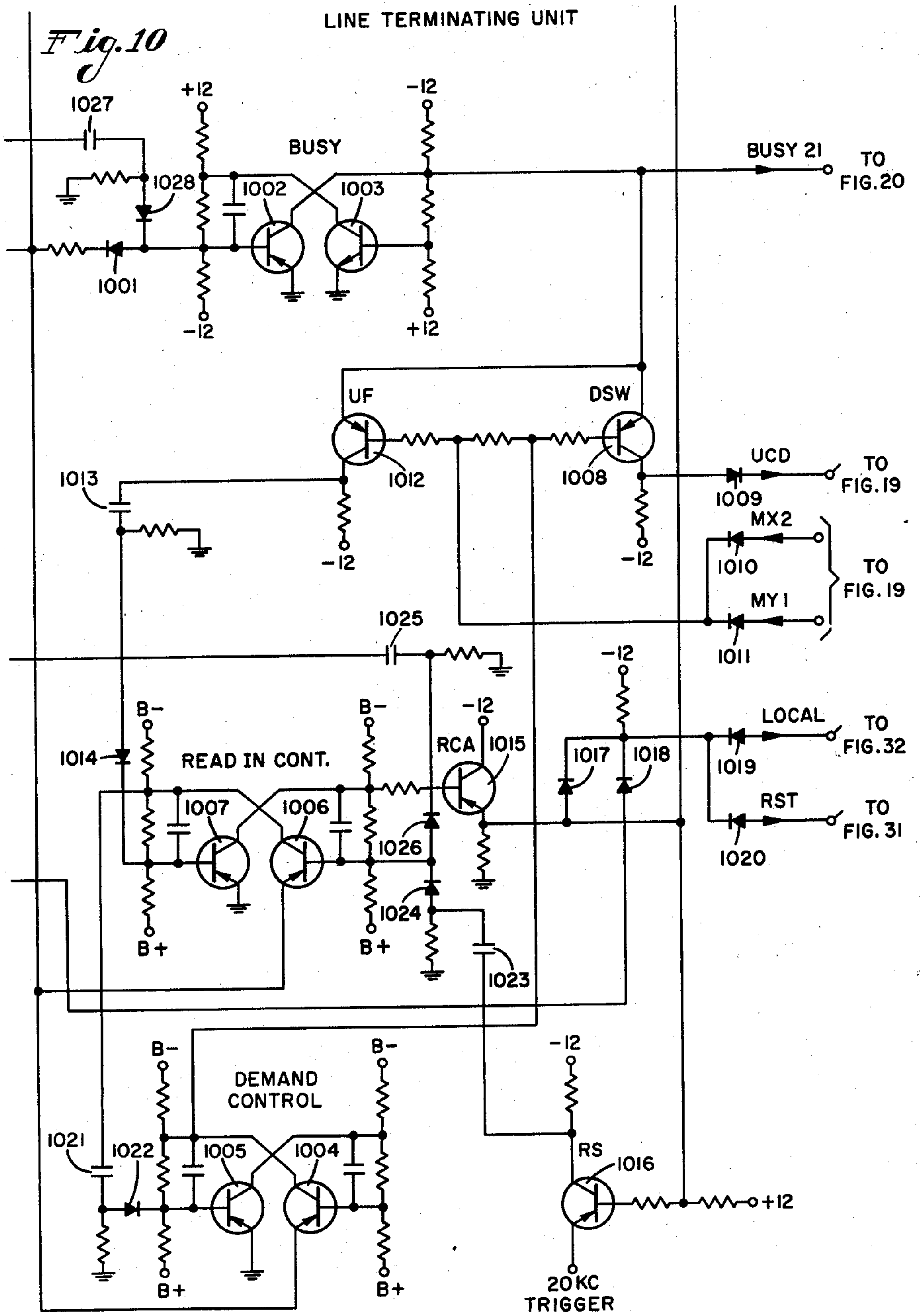

The line terminating unit is shown in detail in Figs. 4–10, inclusive. The line terminating units terminating trunk lines from other long distance switching centers are identical to units terminating trunk lines from local offices with the single exception that the conductor identified as local in Fig. 10 is omitted from the long distance terminating units. As explained in the general description, the assigned incoming register is controlled over conductor local to automatically route an incoming local call to the attendant's position.

The operation of the line terminating unit on a call incoming to the long distance switching center will first be described. When a call is initiated in the distant office, a voice frequency seize signal is transmitted over the receive conductors of the trunk line, coupled through repeat coil 401, amplified by the push-pull connected, emitter follower, buffer amplifier transistors 402 and 403 and applied to conductors TCA1 and TCB1, which extend to the seize and release scan circuit associated with the illustrated unit. When the seize signal appearing on conductors TCA1 and TCB1 is detected by the seize and release scan circuit, that circuit functions to replace the minus twelve volt potential normally appearing on conductor ST1 (Fig. 6) with ground potential. This waveform is differentiated by capacitor 601 and resistor 602 and the resulting positive pulse corresponding to the leading edge of the waveform is coupled through diode 603 to the base of transistor 604 in the incoming call control flip-flip circuit, comprising transistors 604 and 605. A flip-flip circuit is a bi-stable circuit in which both transistors are either non-conductive, or both transistors are conductive. The positive pulse coupled through diode 603 serves to render transistor 604 conductive and the resulting negative-going signal at the collector of transistor 604 renders transistor 605 conductive. When transistor 605 becomes conductive, the positive-going signal at its collector is coupled through capacitor 606 and diode 607 to the base of transistor 608 and renders normally conducting transistor 608 non-conductive. When transistor 608 becomes non-conductive, the resulting positive-going potential at its collector renders transistor 609, which forms the other stage of the calling and called control flip-flop circuit, conductive. Under these conditions, calling amplifier transistor 610 is biased for conduction and called amplifier transistor 611 is biased for non-conduction. Ground potential appearing at the collector of transistor 610 is coupled to the emitter electrode of a transistor, such as calling transistor 801, in each of the highway selector circuits in the channel identification storage circuit included in the line terminating unit, and minus twelve volt potential appearing at the collector of transistor 611 is coupled to the emitter of a transistor, such as called transistor 802, in each of the highway selectors. Thus, the highway selector transistors which control the calling send and receive gates of the terminating unit are enabled for operation, and the highway selecting transistors which control the called send and receive gates of the terminating unit are disabled.

When transistor 604 of the incoming call control flip-flip circuit becomes conductive, the negative-going signal appearing at its collector is coupled through capacitor 901 to the base of transistor 902. Transistors 902 and 903 form a conventional monostable circuit in which transistor 903 is normally conductive and transistor 902 is normally non-conductive. When a negative pulse is applied to the base of transistor 902 to render that transistor conductive, transistor 903 is rendered non-conductive for a period of approximately ten microseconds and the circuit then reverts to its normal condition. Thus, a negative-going ten microsecond pulse appears at the collector of transistor 903 responsive to seizure of the line terminating unit as marked by the operation of the incoming call control flip-flip circuit. The negative pulse appearing at the collector of transistor 903 is coupled through diode 1001 to the base of transistor 1002 and transistors 1002 and 1003 of the busy flip-flip circuit are rendered conductive. When transistor 1002 becomes conductive, its collector rises to ground potential and the illustrated line terminating unit is marked busy to the route selector over busy conductor busy 21.

The negative-going pulse appearing at the collector of transistor 903 is also coupled to the emitter electrode of transistor 904 in the voltage control flip-flip circuit, comprising transistors 904 and 905. Transistor 904 is made non-conductive by the negative pulse applied to its emitter and transistor 905 is rendered non-conductive when transistor 904 becomes non-conductive. When transistor 904 becomes non-conductive and the potential at its collector drops to a negative value, amplifier transistors 906, 907, and 908 are rendered conductive and minus twelve volt potential is applied to the bus bar B—, which extends to the highway selector and time position store circuits in the channel identifying storage circuit of the unit, and to the read in control and demand control flip-flop circuits of Fig. 10. Similarly, when transistor 905 becomes non-conductive and the potential at its collector rises to a positive value, the amplifier transistors 909 and 910 are rendered conductive and plus twelve volt potential is applied to bus bar B+, which also extends to the highway selector and time position store circuits in the channel identifying storage circuit of the unit, and to the read in control and demand control flip-flop circuits. Thus, voltage is supplied to the above-identified circuits and those circuits are now enabled for operation. Diodes 913, 914, and 915 are employed in the circuit to minimize hole storage in transistors 907, 908, and 910, respectively.

The negative-going pulse appearing at the collector of transistor 903 is also coupled to the emitter electrodes of transistor 1004 in the demand control flip-flop circuit, transistor 1006 in the read in control flip-flop circuit, a transistor corresponding to 701 in a flip-flop circuit in each highway selector, and a transistor corresponding to 703 in a flip-flip circuit in each time position store circuit. It is to be noted that the emitter electrodes of the above-identified transistors are made negative simultaneously with the application of B+ and B— potential to the circuits. Thus, the other transistor in each flip-flop circuit, namely, transistors 1005, 1007, and 702, is made conductive when power is applied to the circuits and the non-conductivity of the flip-flip circuit transistors 703 and 704 is assured. When transistor 903 again becomes conductive at the end of the ten microsecond period, the emitter electrodes of transistors 1004, 1006, 701, and 703 are again returned to ground potential. The positive-going pulse appearing at the collector of transistor 903 when that transistor again becomes conductive is coupled through capacitor 912 to the base of transistor 911 but has no effect on that transistor because of the unoperated condition of the outgoing call flip-flip circuit.

When transistor 1005 in the demand control flip-flop circuit becomes conductive, the negative potential appearing at the collector of non-conductive transistor 1004 renders demand switch transistor 1008 conductive since the emitter of that transistor is returned to ground potential at the collector of busy flip-flip circuit transistor 1002. When transistor 1008 becomes conductive, the ground potential appearing at its collector is coupled through diode 1009 to the units connect demand conductor UCD, which extends to the calling unit finder circuit 26. It will be recalled from the general description that calling unit finder circuit 26 is controlled by the potential applied to conductor UCD to search for the calling unit if an incoming register has been assigned for use and if an idle highway and channel are being marked on bus bars HWBB and TPBB, respectively. The calling unit finder circuit functions to apply a minus twelve volt potential to each of the MX conductors in turn and to each of the MY conductors in turn while each MX conductor is marked. It can be seen that conductors MX2 and MY1, which identify the illustrated unit, are coupled by diodes 1010 and 1011, respectively, to the base of units found transistor 1012. Diodes 1010 and 1011 form an "or" gate for positive signals and when conductors MX2 and MY1 are both returned to minus twelve volts, transistor 1012 is rendered conductive from the negative potential appearing at the collector of transistor 1004 in the demand control flip-flop circuit. It will be noted that the control counter 25 is stepped by the 20 kc. clock pulses of the type illustrated in Fig. 34. This pulse is a positive pulse of approximately ten microseconds duration and negative potential is applied to the X and Y conductors only when the positive pulse is not present. Therefore, conductors MX2 and MY1 will each have minus twelve volt potential applied thereto for a period of approximately forty microseconds. When transistor 1012 is rendered conductive, a positive-going pulse is coupled through capacitor 1013 and diode 1014 to the base of transistor 1007 in the read in flip-flop circuit. Transistor 1007 is thereby rendered non-conductive, transistor 1006 becomes conductive, and the emmitter of read in control emitter follower transistor 1015 drops to a negative potential. When transistor 1006 becomes conductive, the positive-going potential swing at its collector is coupled through capacitor 1021 and diode 1022 to the base of transistor 1005 to restore the demand control flip-flop circuit to the condition wherein transistor 1004 is conductive and transistor 1005 is non-conductive. The resulting ground potential at the collector of transistor 1004 renders transistors 1008 and 1012 non-conductive and ground potential is removed from conductor UCD. The negative potential appearing at the emitter of transistor 1015 is applied to the base of reset transistor 1016 but transistor 1016 does not become conductive since the 20 kc. trigger conductor has minus twelve volt potential applied thereto at this time. The emitter of transistor 1015 is also coupled to the anode terminal of diode 1017 which, with diode 1018, forms a two-input "and" gate for negative signals. The anode of diode 1018 is also returned to a negative potential at this time since transistor 916 in the outgoing call flip-flip circuit is non-conductive. Therefore, a negative signal appears at the common cathode terminals of diodes 1017 and 1018 and is coupled through diodes 1019 and 1020 to conductor local and to register start conductor RST, respectively. The application of negative potential to conductor RST enables the storage circuit in the assigned register to read in the highway and channel marking signals applied to bus bars HWBB and TPBB, respectively, by the channel allotter, as explained in the general description. The application of negative potential to conductor local, which is wired on local terminating units only, controls the assigned register to automatically route the call to the attendant's position, as explained in the general description.

When the emitter potential of transistor 101 drops to a negative value, the storage circuit in the illustrated unit is conrolled to read in the highway and channel marking signals applied to bus bars HWBB and TPBB, respectively, by the channel allotter. It can be seen that the base of a transistor corresponding to transistor 705 in each highway selector and the base of a transistor corresponding to transistor 706 in each time position store circuit are returned to the emitter electrode of transistor 1015, that the emitter of each transitor corresponding to 705 is returned to an individual one of the highway marking conductors, and that the emitter of each transistor corresponding to 706 is returned to an individual one of the time position marking conductors. If it be assumed that the channel allotter is applying ground potential to highway conductor HW1 and time position marking conductor TPM1, thus identifying channel 1 on highway 1, it can be seen that transistors 705 and 706 are now rendered conductive. The transistors corresponding to 705 and 706 in the other highway selectors and time position store circuits, respectively, are not rendered conductive since their emitter electrodes are returned to minus twelve volt potential appearing on their individually associated highway and time position marking conductors. Ground potential appearing at the collector of conducting transistor 705 is utilized to trigger the flip-flop circuit comprising transistors 701 and 702 to the condition wherein transistor 701 is conductive and transistor 702 is non-conductive. Similarly, the ground potential appearing at the collector of conducting transistor 706 is utilized to trigger the flip-flip circuit comprising transistors 703 and 704 to the condition wherein both transistors are conductive.

The next occurring positive-going pulse on conductor 20 kc. trigger serves to render reset transistor 1016 conductive and the resulting positive-going pulse at the collector of transistor 1016 is coupled through capacitor 1023 and diode 1024 to the base of transistor 1006 to reset the read in control flip-flop circuit to the condition wherein transistor 1007 is conductive and transistor 1006 is non-conductive. When transistor 1007 becomes conductive, the emitter of transistor 1015 rises to ground potential and conductor local, conductor RST, the base of transistor 1016, the base of each transistor 705, and the base of each transistor 706 are returned to ground potential. Thus, the storage circuit in the illustrated unit is controlled to read in the highway and channel marking signals appearing on bus bars HWBB and TPBB and the read in control circuits are then disabled so that further marking signals appearing on those bus bars have no effect on the illustrated unit.

Returning to the consideration of the highway No. 1 selector, it can be seen that when transistor 702 becomes non-conductive responsive to the reading in of marking for highway 1, negative potential is applied to the base electrodes of calling transistor 801 and called transistor 802 in that highway selector. It will be recalled that the emitter of transistor 801 is returned to ground potential at the collector of conducting transistor 610 and that the emitter of transistor 802 is returned to minus twelve volt potential at the collector of non-conducting transistor 611. Therefore, transistor 801 is rendered conductive and transistor 802 remains non-conductive when transistor 702 is triggered to its non-conductive condition.

Figure 7:
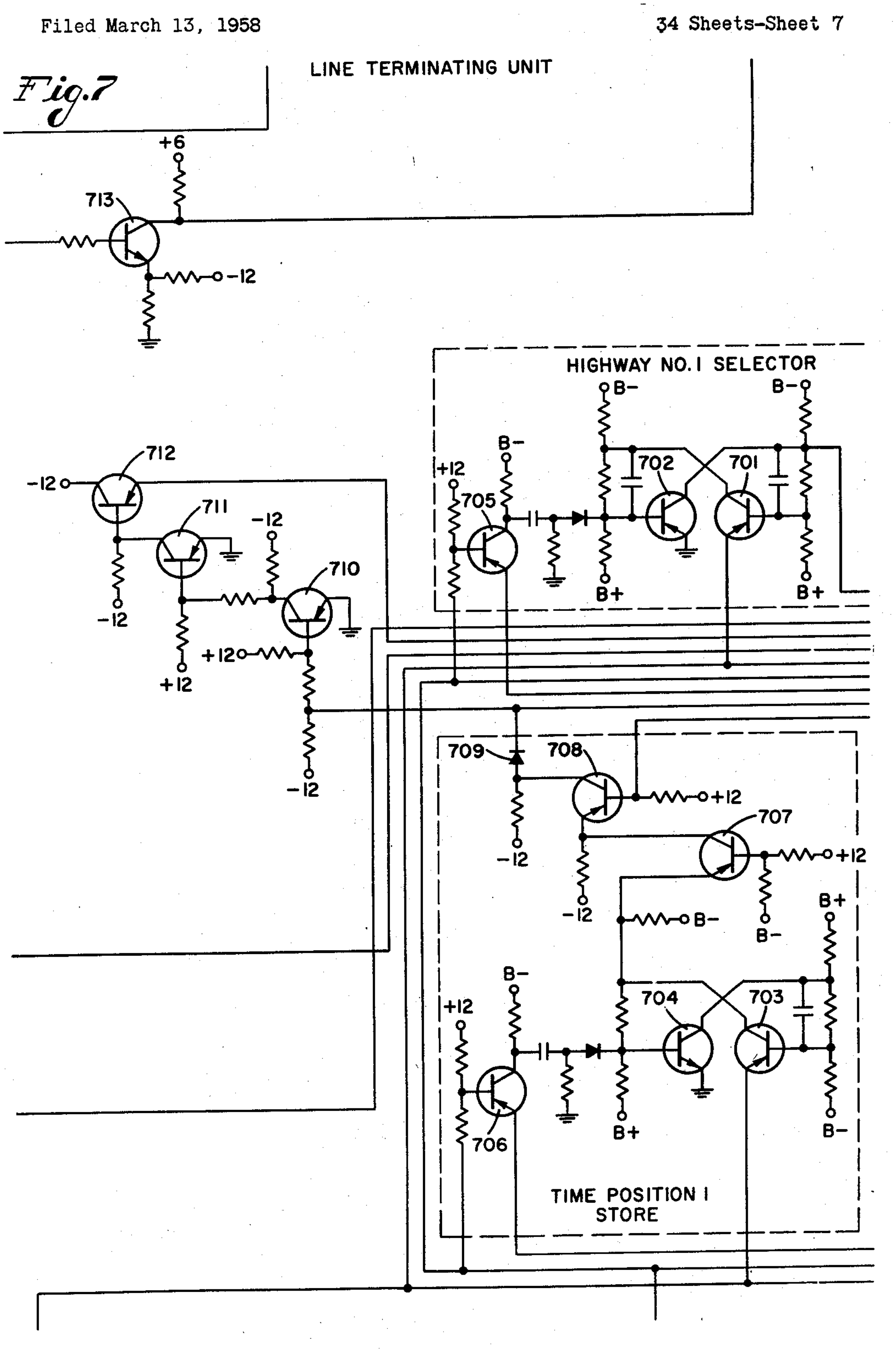
Figure 8:
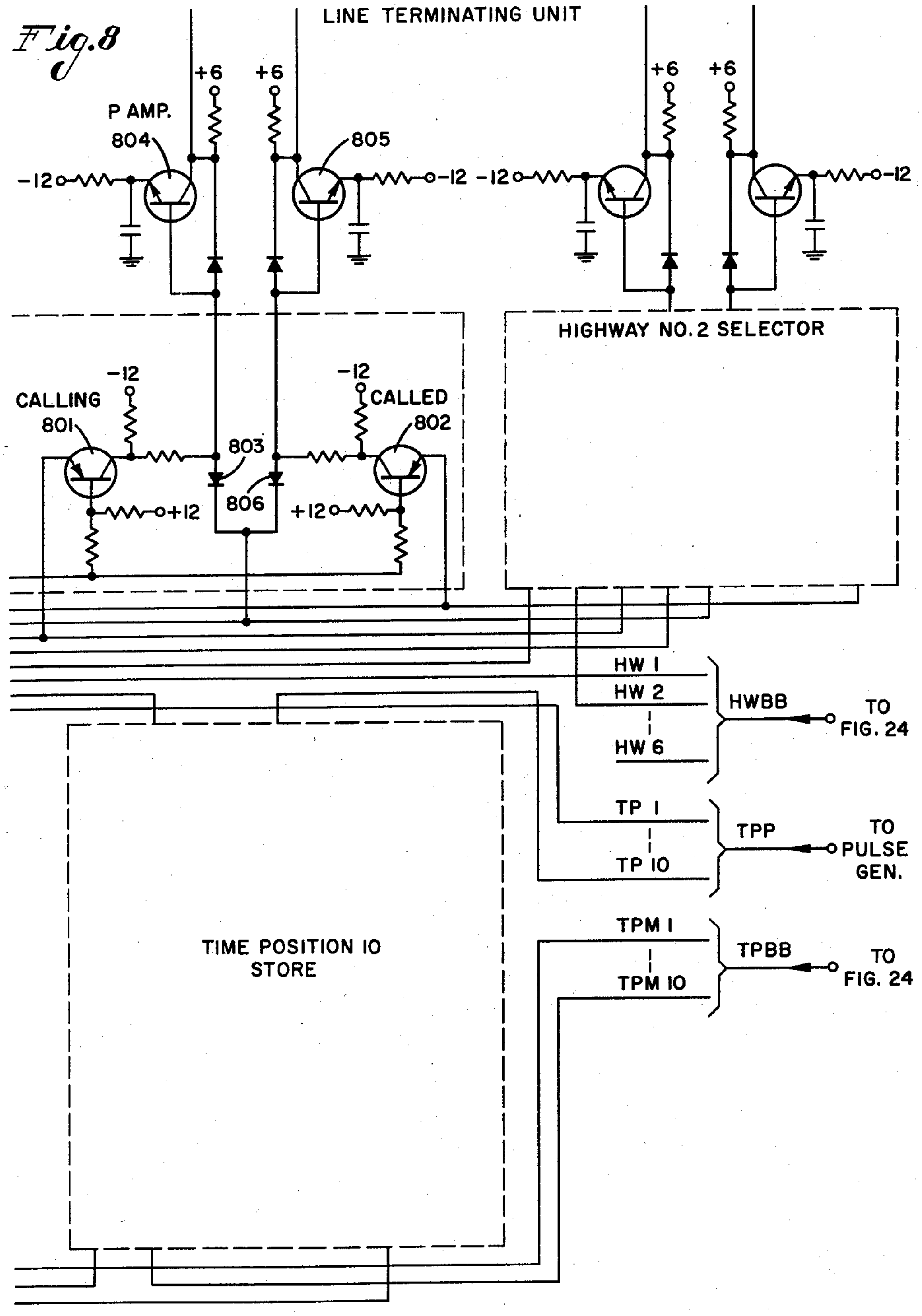
Figure 9:
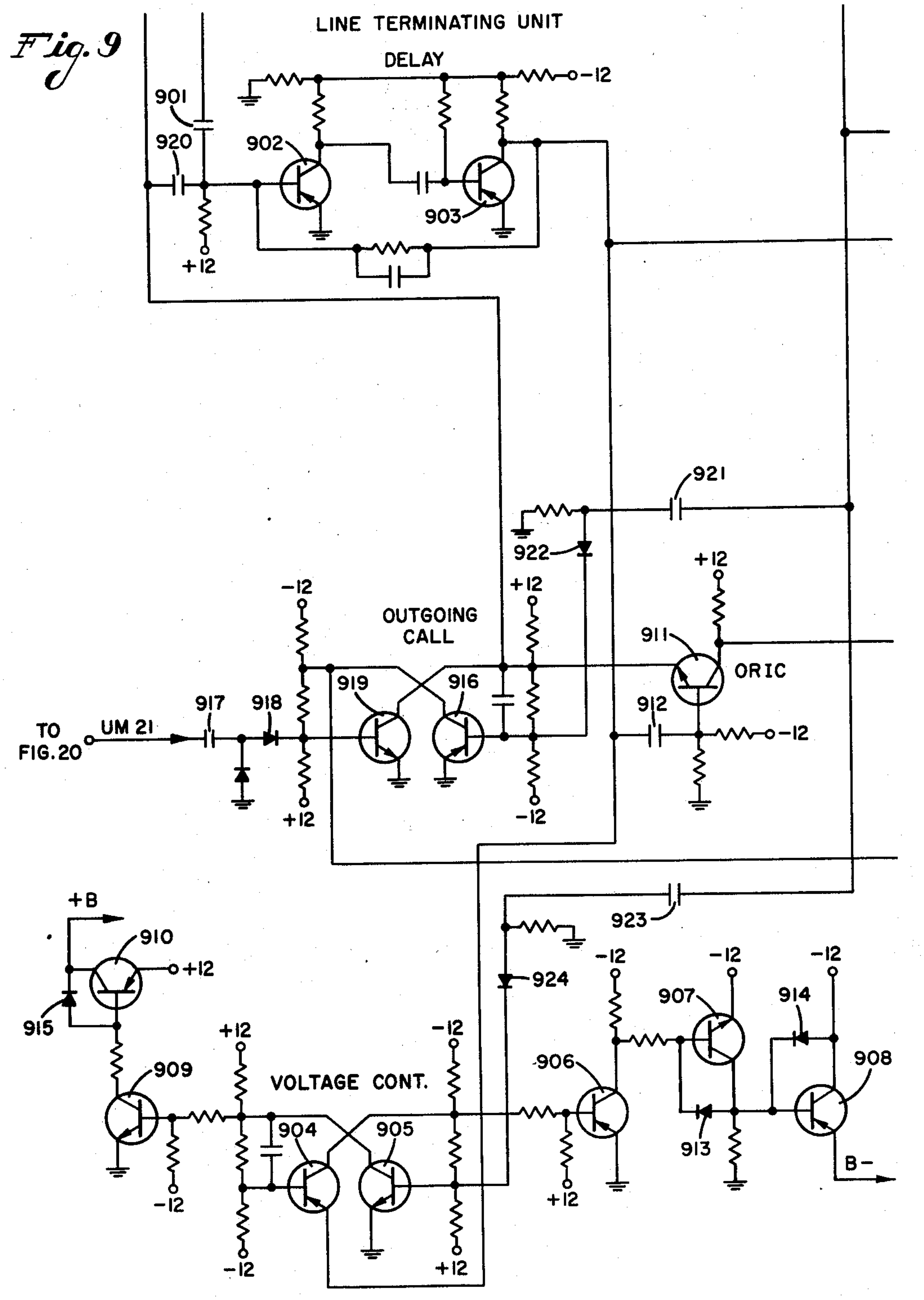

Referring to the time position 1 store circuit of Fig. 7, it can be seen that when transistors 703 and 704 are rendered conductive responsive to the reading in of marking for time position channel 1, ground potential is applied to the emitter of transistor 707 to render transistor 707 conductive and the ground potential is then switched through conducting transistor 707 and applied to the emitter of transistor 708 to enable transistor 708 for conduction. The base of transistor 708 is individually connected to time position 1 conductor TP1 and when a negative pulse is received on that conductor, transistor 708 is rendered conductive and a positive-going pulse is coupled through diode 709 to the base of transistor 710. Diode 709 forms one input of a ten-input "or" gate for positive pulses and the particular time position pulse coupled through the gate is determined by the setting of the time position store circuits. As just described, when the flip-flip circuit in time position 1 store circuit is operated, the pulse coupled through the "or" gate occurs in time position 1. As explained in the general description, the pulses appearing on conductors TP1–TP10, inclusive, occur at a frequency of 12 kc. and may be generated by any suitable pulse generator circuit. Pulses TP1–TP10 are graphically illustrated in Fig. 34.

The positive pulse in time position 1 coupled through diode 709 is utilized to render transistor 710 non-conductive and the resulting negative-going pulse at the collector of transistor 710 renders transistor 711 conductive. The positive-going pulse appearing at the collector of transistor 711 is coupled to the base of emitter follower transistor 712. The emitter of transistor 712 is returned to ground at the collector of conducting calling transistor 801 through diode 803. When transistor 711 is non-conductive, the emitter of transistor 712 stands at approximately minus twelve volts and pulse amplifier 804 is held non-conductive. Now, when the emitter potential of transistor 712 rises to ground during time position 1, pulse amplifier 804 is rendered conductive to transmit a negative pulse to the calling send and receive gates associated with highway 1. It is to be noted that the pulses appearing at the emitter of transistor 712 are blocked from the base of pulse amplifier transistor 805, which controls the called send and receive gates associated with highway 1, by diode 806 which is biased in the reverse direction because of the non-conductivity of called transistor 802. Thus, a negative pulse is applied to the send and receive calling gates associated with highway 1 in time position 1 in each frame of the recurring pulse frames for the duration of the call under consideration.

Figure 4:
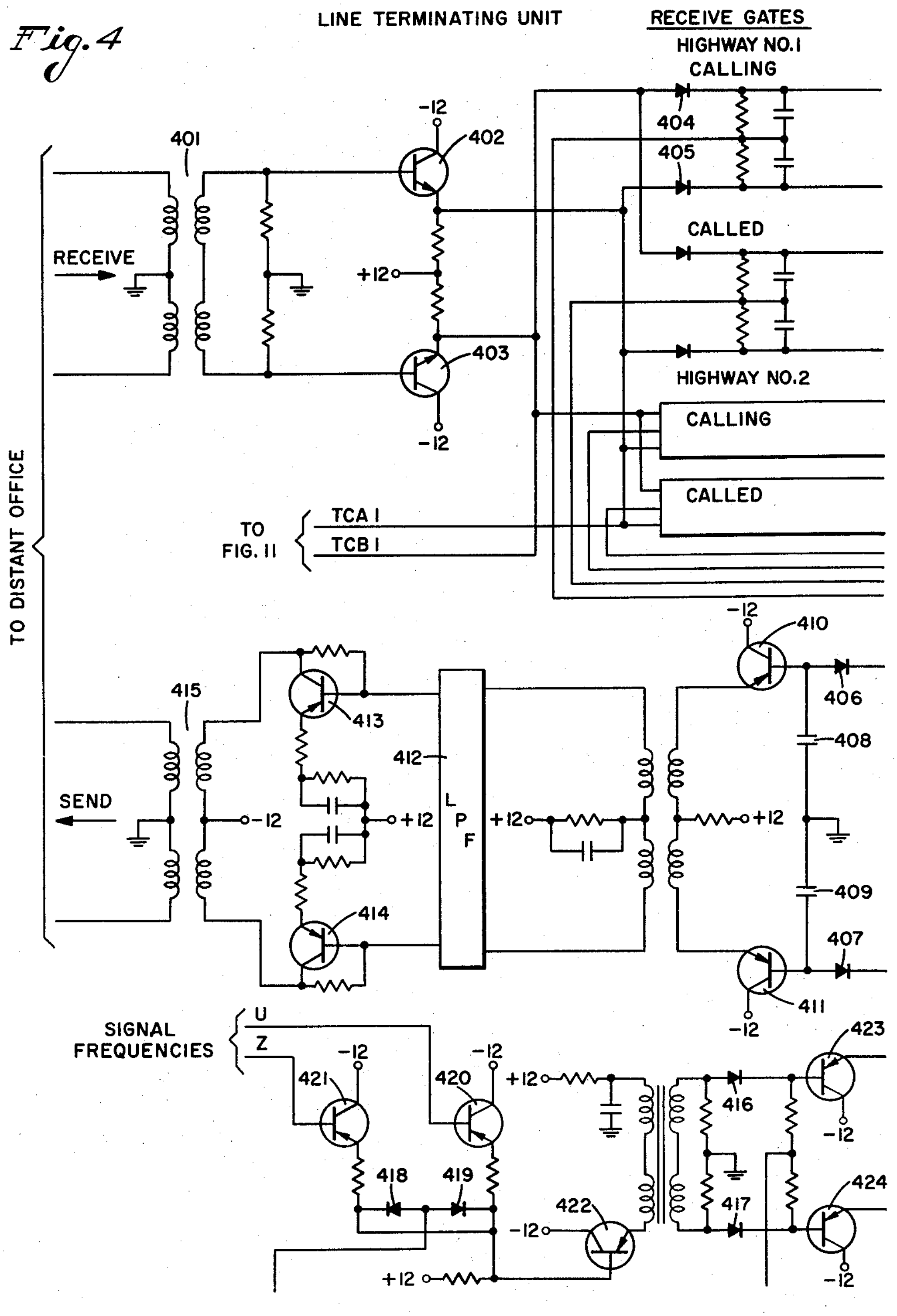
Figure 5:
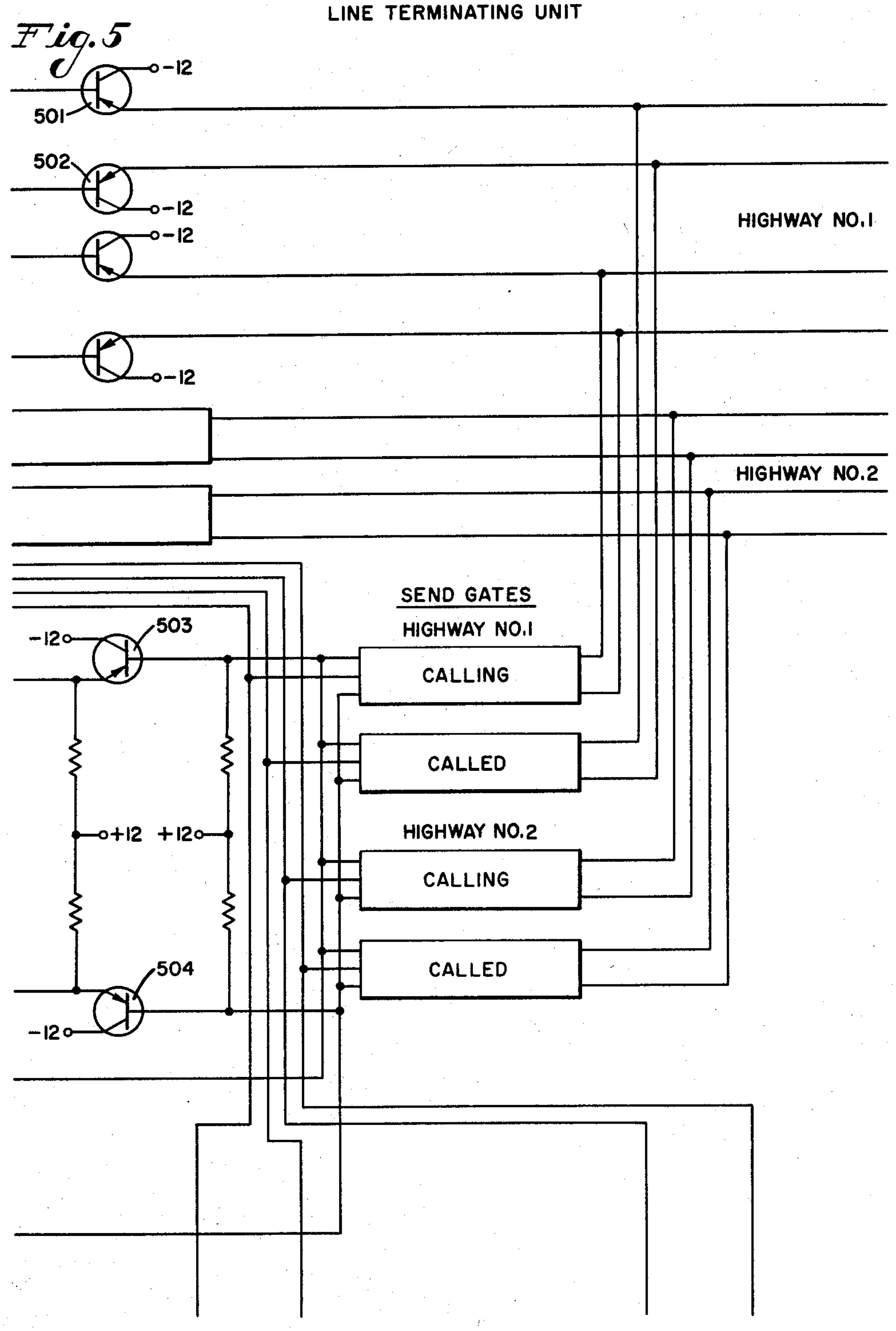
Figure 6:
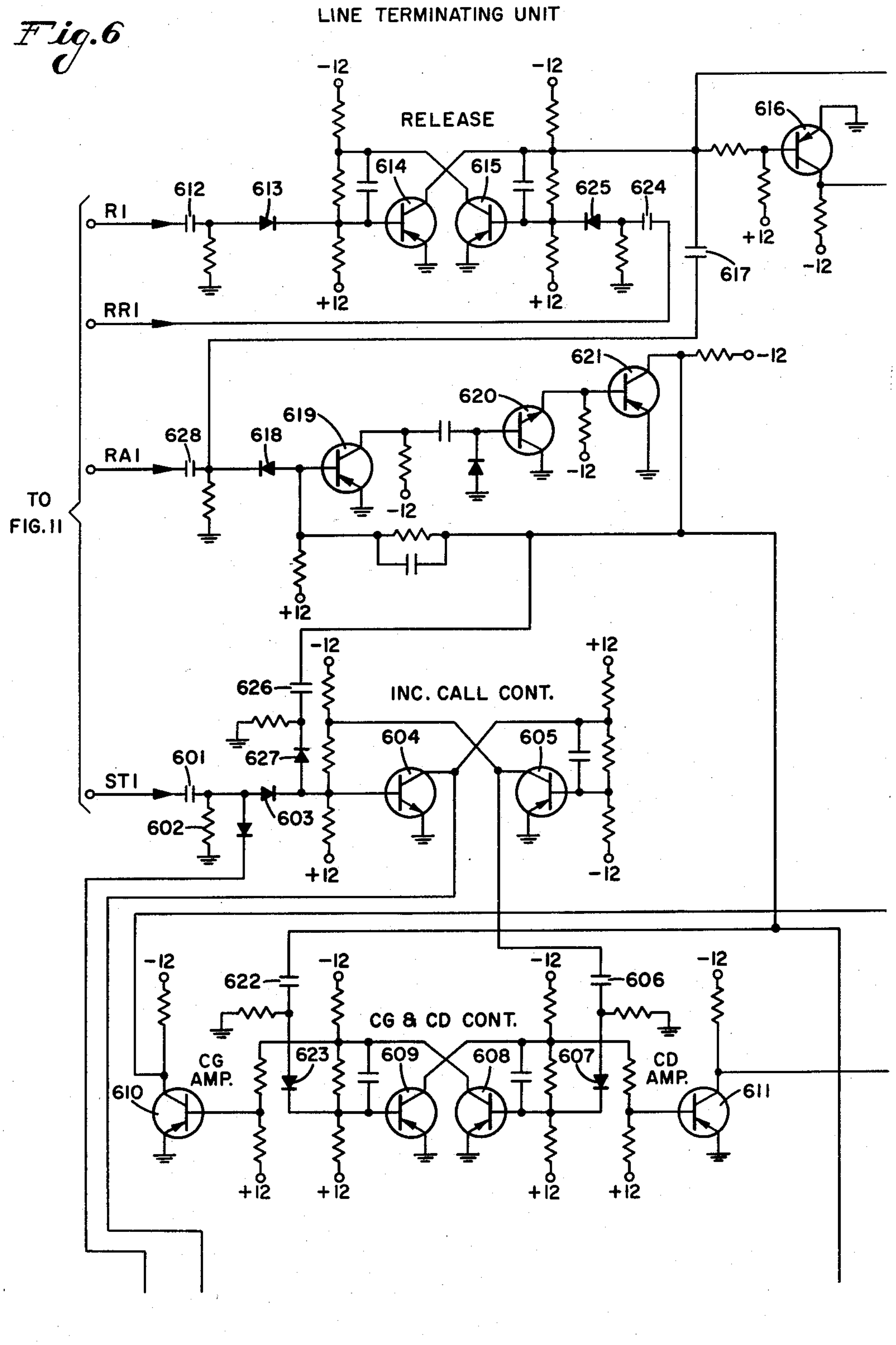

Examining the calling receive gate associated with highway 1 and shown in Fig. 4, it can be seen that the gate comprises diodes 404 and 405. The cathode terminals of diodes 404 and 405 are returned to the collector of pulse amplifier transistor 804, which collector stands at plus six volt potential except during time position 1. During time position 1, the collector of transistor 804 drops to approximately minus six volt potential and diodes 404 and 405 are biased for conduction and pass any signals appearing at the output of the buffer amplifier transistors 402 and 403. The signal samples passed by diodes 404 and 405 are amplified by emitter follower transistors 501 and 502 and applied to the upper pair of conductors of the four-wire highway No. 1 transmission network. Similarly, a pair of diodes in the calling send gate associated with highway No. 1 are controlled to pass signal samples appearing on the lower pair of conductors of the four-wire highway No. 1 transmission network in time position 1. The passed signal samples are applied to the base electrodes of push-pull connected, emitter follower transistors 503 and 504. As will be later described in detail, the incoming register assigned to handle the call being described is controlled by its channel identifying storage circuit to receive voice frequency seize and dialing signals in time position 1 appearing on the upper pair of conductors of highway 1 and to transmit voice frequency seize acknowledge and digit acknowledge signals in time position 1 to the lower pair of conductors of highway 1. Similarly, the called unit selected by the incoming register under control of the illustrated unit is controlled to receive voice and supervisory signals appearing in time position 1 on the upper pair of conductors of highway 1 and to transmit voice and supervisory signals in time position 1 to the lower pair of conductors of highway 1.

In the illustrated unit, the signal samples passed by the calling send gate associated with highway 1 and amplified by emitter follower transistors 503 and 504 are detected by diodes 406 and 407 and integrated by capacitors 408 and 409. The resulting demodulated signals are amplified by emitter follower transistors 410 and 411, passed through low-pass filter 412 to remove any 12 kc. signal, amplified in push-pull connected amplifier transistors 413 and 414, and coupled through repeat coil 415 to the send conductors of the trunk line extending to the distant office.

It is believed expedient to a more complete understanding of the invention to describe the operation of the illustrated unit when it is the called unit before proceeding to describe the release of the unit since the release operation is essentially the same whether the unit is calling or called. The illustrated unit is seized by the route selector over units marking conductor UM21 which is normally returned to minus twelve volt potential in the route selector. It will be recalled that the route selector functions to apply ground potential to conductor UM21 to seize the illustrated unit only if the unit is not marked busy by the application of ground potential to conductor busy 21. The positive-going signal applied to conductor UM21 is coupled through capacitor 917 and diode 918 to the base of transistor 919 in the outgoing call flip-flip circuit. The positive pulse renders transistors 919 and 916 conductive and the resulting negative-going signal at the collector of transistor 919 is coupled through capacitor 920 to trigger the monostable ten microsecond delay circuit comprising transistors 902 and 903. The negative-going pulse appearing at the collector of transistor 903 serve to trigger the voltage control and busy flip-flip circuits, and to set the read in control, demand control, highway selector, and time position store circuits, all as previously described in conjunction with an incoming call. Ground potential applied to unit connect demand conductor UCD has no effect at this time since the calling unit finder circuit is disabled by the route selector as described in the general description.

At the termination of the ten microsecond delay period, transistor 903 again becomes conductive and its collector rises to ground potential. This positive swing is coupled through capacitor 912 to the base of outgoing read in control transistor 911. Since the emitter electrode of transistor 911 is now returned to ground potential at the collector of transistor 919, transistor 911 is rendered conductive by the positive-going pulse. The resulting negative-going potential swing at the collector of transistor 911 is coupled through capacitor 1025 and diode 1026 to the base of transistor 1006 in the read in control flip-flop circuit and serves to operate that circuit to the condition wherein transistor 1006 is conductive and transistor 1007 is non-conductive. The resulting negative potential at the emitter of read in control amplifier transistor 1015 controls the highway selector and time position store circuits to read in the highway and time position channel information, applied to the bus bars by one of the registers, in the same manner as previously described. The "and" gate for negative signals, comprising diodes 1017 and 1018, is blocked at this time since the collector of transistor 916 stands at ground potential. Therefore, the negative pulse appearing at the emitter of transistor 1015 is not applied to conductors local and RST on an outgoing call. The next occurring positive-going pulse on conductor 20 kc. trigger renders transistor 1016 conductive to reset the read in control flip-flop circuit.

The only remaining difference between the operation on an incoming call and the operation on an outgoing call is that the calling and called control flip-flop circuit is not operated on an outgoing call. Therefore, called amplifier transistor 611 is conductive and serves to apply ground potential to the emitter electrode of a transistor corresponding to called transistor 802 in each of the highway selectors. Calling amplifier transistor 610 remains non-conductive on an outgoing call and thus serves to apply minus twelve volt potential to the emitter electrode of a transistor corresponding to calling transistor 801 in each of the highway selectors. Thus, assuming that highway 1 is the assigned highway and time position 1 is the assigned channel, the positive-going pulses in time position 1 which appear in the output circuit of transistor 712 are coupled to the base of pulse amplifier transistor 805 rather than to the base of pulse amplifier transistor 804. Therefore, the called receive and send gates associated with highway 1 are activated on an outgoing call.

It can be seen that the signals received over the trunk line and which appear at the output of the buffer amplifier transistors 402 and 403 are coupled through the called receive gate associated with highway 1 and applied to the lower pair of conductors of the four-wire highway 1 network. Similarly, the called send gate associated with highway 1 is connected to the upper pair of conductors of the highway 1 network. It should now be apparent that a calling unit transmits signals to the highway on the upper pair of conductors and receives signals from the highway on the lower pair of conductors while a called unit transmits signals to the highway on the lower pair of conductors and receives signals from the highway on the upper pair of conductors.

The release of an established call is initiated by the transmission of a voice frequency release signal over either the trunk line between the calling office and the illustrated long distance switching center or the trunk line between the called office and the illustrated long distance switching center. It will be recalled from the general description that the line terminating unit associated with the trunk line over which the release signal is received serves to transmit a release acknowledge signal back over that trunk line, the highway monitor circuit associated with the highway used to establish the call detects the release signal and is controlled to transmit a regenerated release signal to the other office, and that the line terminating unit associated with the trunk line over which the release signal is received is thereafter released from the connection. It will also be recalled that when a release acknowledge signal is received over the trunk line extending to the other office, the highway monitor circuit detects the release acknowledge signal and responsive thereto marks the channel used in the call as idle to the channel allotter, and the line terminating unit associated with the trunk line extending to the other office is thereafter released from the connection.

First assume that a voice frequency release signal is received over the receive conductors of the trunk line associated with the illustrated unit. The received release signal is amplified by transistors 402 and 403 and the amplified signal is passed through either the calling or called receive gates associated with highway 1 to highway 1, and is also applied to conductors TCA1 and TCB1, which extend to the seize and release scan circuit associated with the illustrated unit. When the seize and release scan circuit associated with the illustrated unit detects the voice frequency receive signal on conductors TCA1 and TCB1, it functions to apply a positive-going pulse to release conductor R1 which is individual to the illustrated unit. The positive-going pulse applied to conductor R1 is coupled through capacitor 612 and diode 613 to the base of transistor 614 in the release flip-flop circuit, comprising transistors 614 and 615, and serves to operate the release flip-flop circuit to the condition wherein transistor 615 is conductive and transistor 614 is non-conductive. The resulting negative potential at the collector of transistor 614 renders transistor 616 conductive and the resulting ground potential at the collector of conducting transistor 616 serves to make transistor 713 conductive. It can be seen that the cathode terminals of gating diodes 416 and 417 are returned to the collector of transistor 713. When transistor 713 is non-conductive and its collector stands at plus six volts, diodes 416 and 417 are biased for non-conduction. However, when transistor 713 is conductive and its collector potential drops to approximately minus six volts, diodes 416 and 417 are biased for conduction.

It can also be seen that the anode terminals of gating diodes 418 and 419 are returned to the collector terminal of transistor 614 in the release flip-flop circuit. Prior to the operation of the release flip-flop circuit, the release acknowledge signal frequencies U and Z amplified by emitter follower transistors 420 and 421, respectively, are shunted to ground potential at the collector of transistor 614 through diodes 418 and 419. However, when transistor 614 is rendered non-conductive responsive to the receipt of a release signal and its collector potential drops to a negative value, diodes 418 and 419 are biased for non-conduction. The release acknowledge signal frequencies appearing at the emitter electrodes of transistors 420 and 421 are now amplified by transistor 422, passed by diodes 416 and 417, and further amplified by emitter follower buffer amplifier transistors 423 and 424. The amplified signals appearing at the output of transistors 423 and 424 are applied to the base electrodes of transistors 503 and 504 and thus coupled to the send conductors of the trunk line terminated by the illustrated unit.

The negative-going potential swing at the collector of transistor 614, resulting from the receipt of a release signal, is also coupled through capacitor 617 and diode 618 to the base of transistor 619. Transistors 619, 620, and 621 comprise a monostable circuit in which transistor 621 is normally biased for conduction and transistors 619 and 620 are normally biased for non-conduction. When a negative signal is applied to the base of transistor 619, transistors 619 and 620 are rendered conductive and transistor 621 becomes non-conductive. The resulting negative potential swing at the collector of transistor 621 is coupled through capacitor 626 and diode 627 to the base of transistor 604 in the incoming call control flip-flop circuit and serves to restore that flip-flop, if operated, to the condition wherein both transistors are non-conductive. After a delay of approximately one second, which is sufficiently long to insure that the highway monitor circuit has detected the release signal, the delay circuit reverts to the condition in which transistors 619 and 620 are non-conductive and transistor 621 is conductive. The resulting positive-going swing at the collector of transistor 621 is coupled through capacitor 622 and diode 623 to the base of transistor 609 in the calling and called control flip-flop circuit, through capacitor 1027 and diode 1028 to the base of transistor 1002 in the busy flip-flip circuit, through capacitor 921 and diode 922 to the base of transistor 916 in the outgoing call flip-flip circuit, and through capacitor 923 and diode 924 to the base of transistor 905 in the voltage control flip-flip circuit. The positive pulse coupled to the just described base electrodes serves to return the respective circuits to their normal condition in which transistors 608, 904, and 905 are conductive and transistors 609, 1002, 1003, 916, and 919 are non-conductive. When transistors 904 and 905 in the voltage control flip-flip circuit again become conductive, minus twelve volt potential and plus twelve volt potential are removed from bus bars B— and B+, respectively, and the transistors in the highway selector and time position store circuits, as well as in the read in control and demand control flip-flop circuits, are rendered non-conductive.

When the release acknowledge signal transmitted over the send conductors of the trunk line by the illustrated unit is detected in the distant office, that office discontinues the transmission of the release signal over the receive conductors of the trunk line. The seize and release scan circuit associated with the illustrated unit is effective to transmit a positive-going pulse over conductor RR1 whenever a release signal is not detected on conductors TCA1 and TCB1. Therefore, when a release signal is no longer transmitted over the trunk line, the positive-going pulse appearing on conductor RR1 and coupled through capacitor 624 and diode 625 serves to reset the release flip-flop circuit to the condition wherein transistor 614 is conductive and transistor 615 is non-conductive. When transistor 614 again becomes conductive, gating diodes 416 and 417 are biased for non-conduction and gating diodes 418 and 419 are biased for conduction to thereby discontinue the transmission of a release acknowledge signal to the send conductors of the trunk line.

The operation of the illustrated unit differs slightly from the above when a release acknowledge signal rather than a release signal is received over the receive conductors of the trunk line associated with the illustrated unit. Under these conditions, the seize and release scan circuit is responsive to the detection of a release acknowledge signal on conductors TCA1 and TCB1 to apply a positive-going signal to conductor RA1. The positive-going pulse on conductor RA1 is coupled through capacitor 628 and diode 618 to trigger the one-second delay circuit comprising transistors 619, 620, and 621. As previously described, when transistor 621 becomes conductive at the termination of the one-second delay period, which is sufficiently long to permit the highway monitor circuit to detect the release acknowledge signal, the illustrated unit is released from the connection and reset for operation on another call.

*Scan and release scan circuit*

Figure 11:
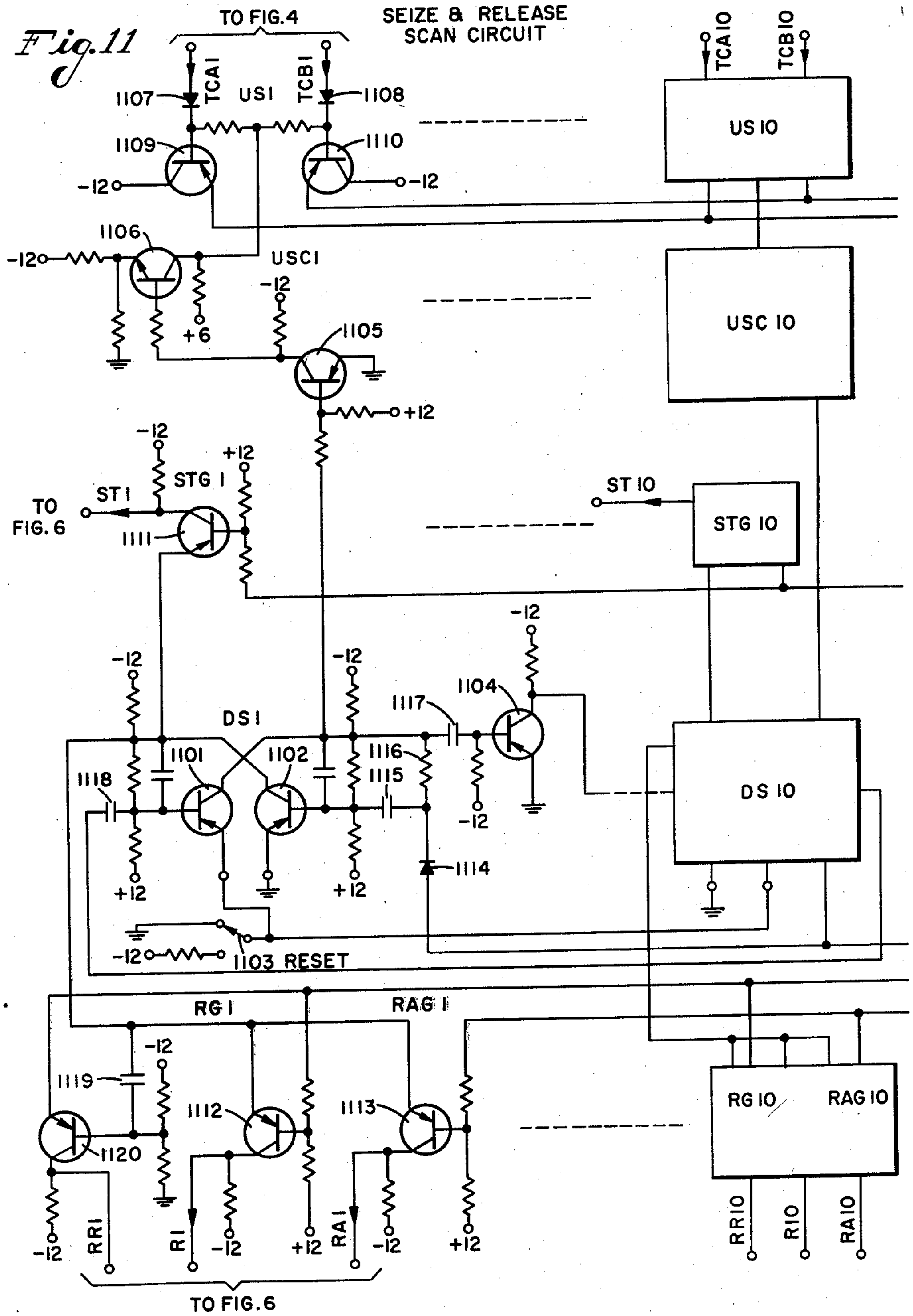
Figure 12:
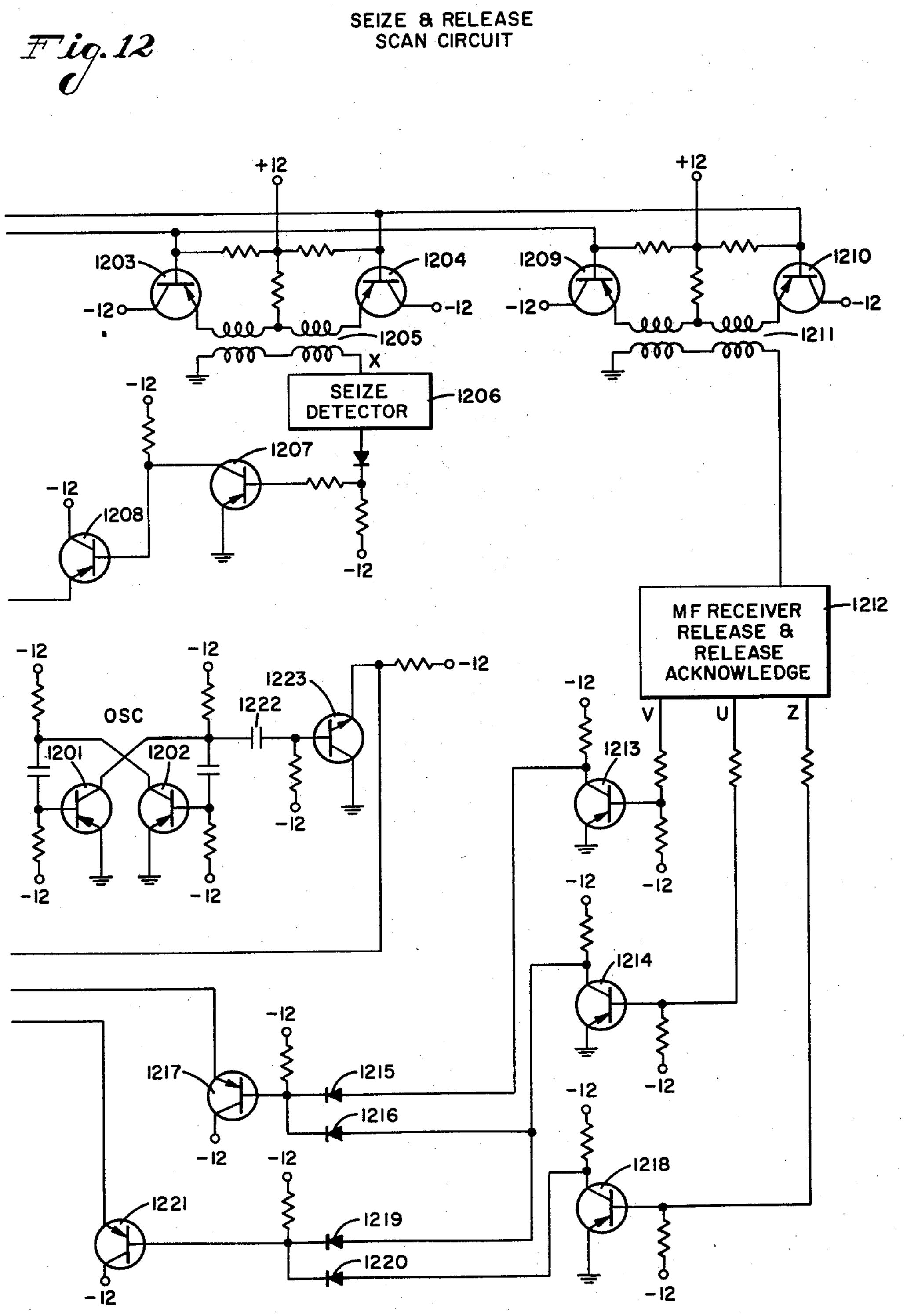
Figure 13:
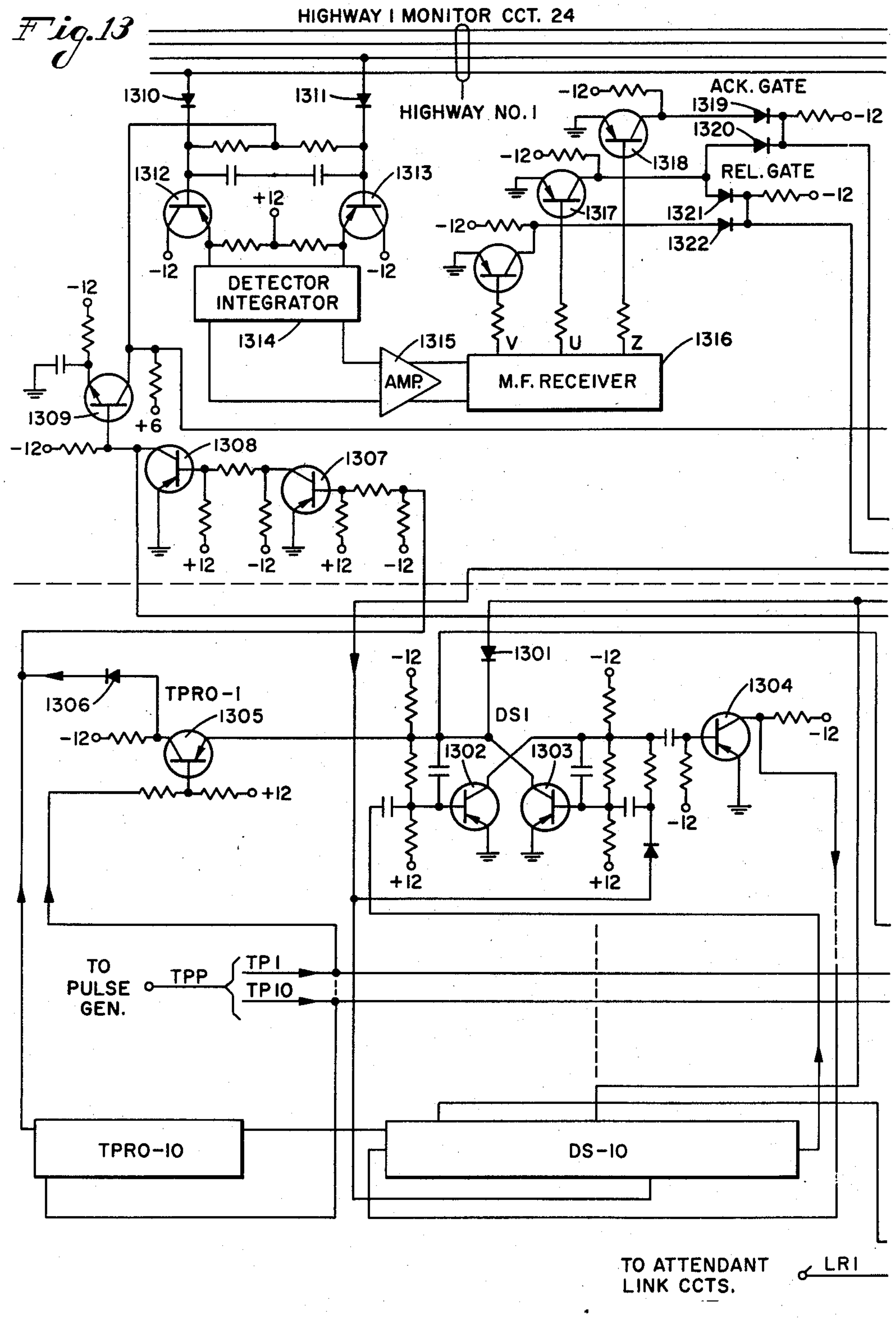
Figure 14:
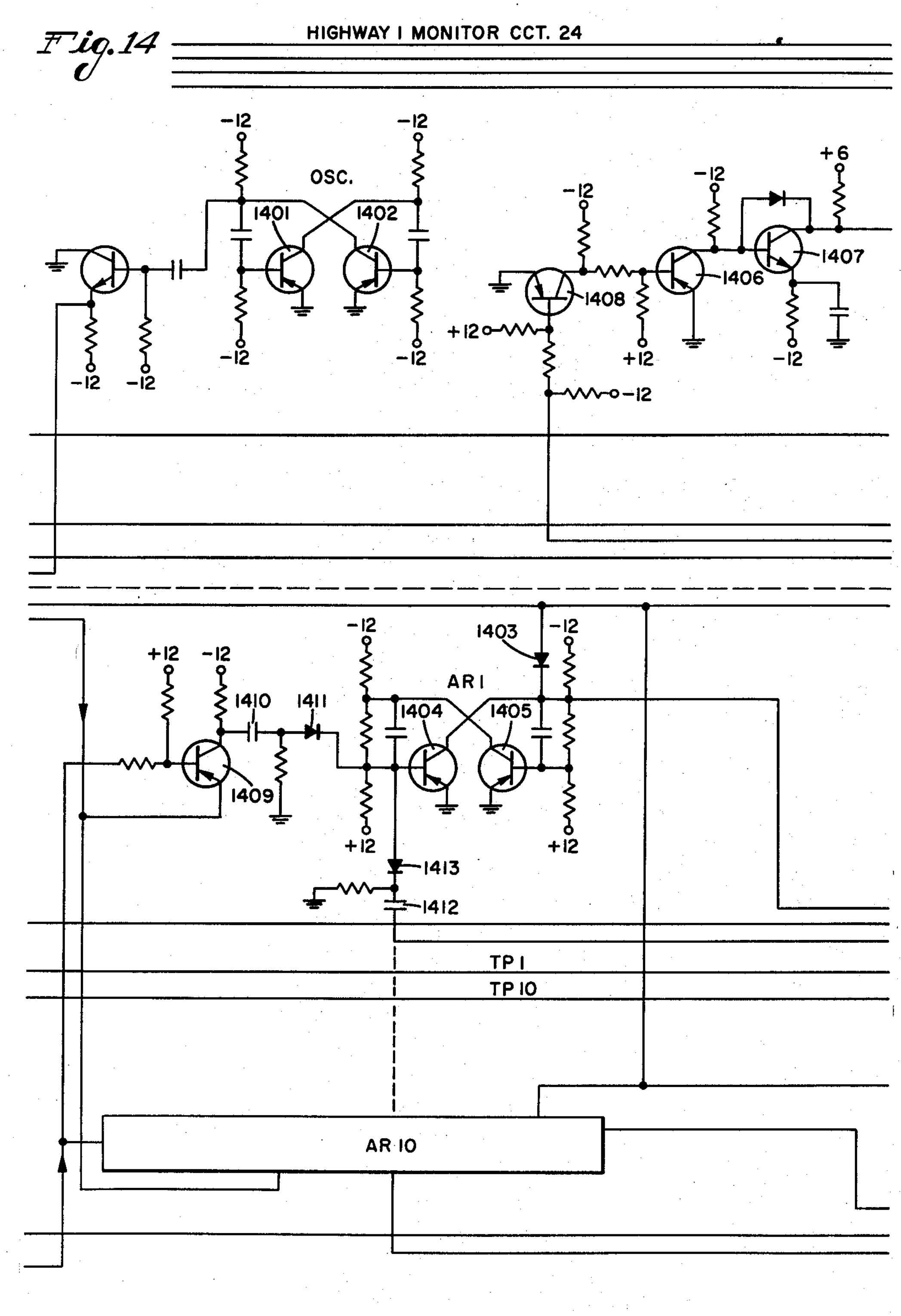
Figure 15:
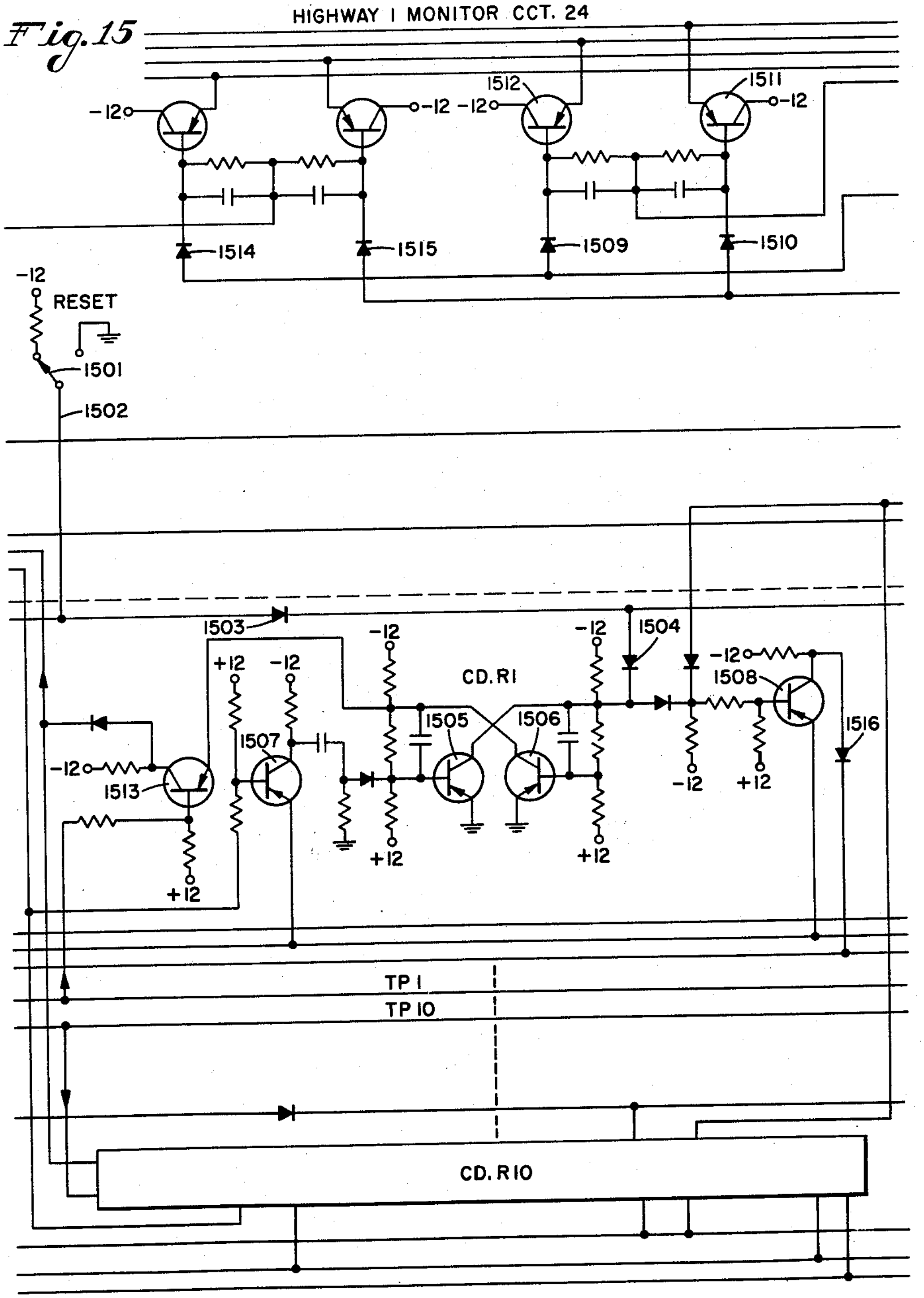
Figure 16:
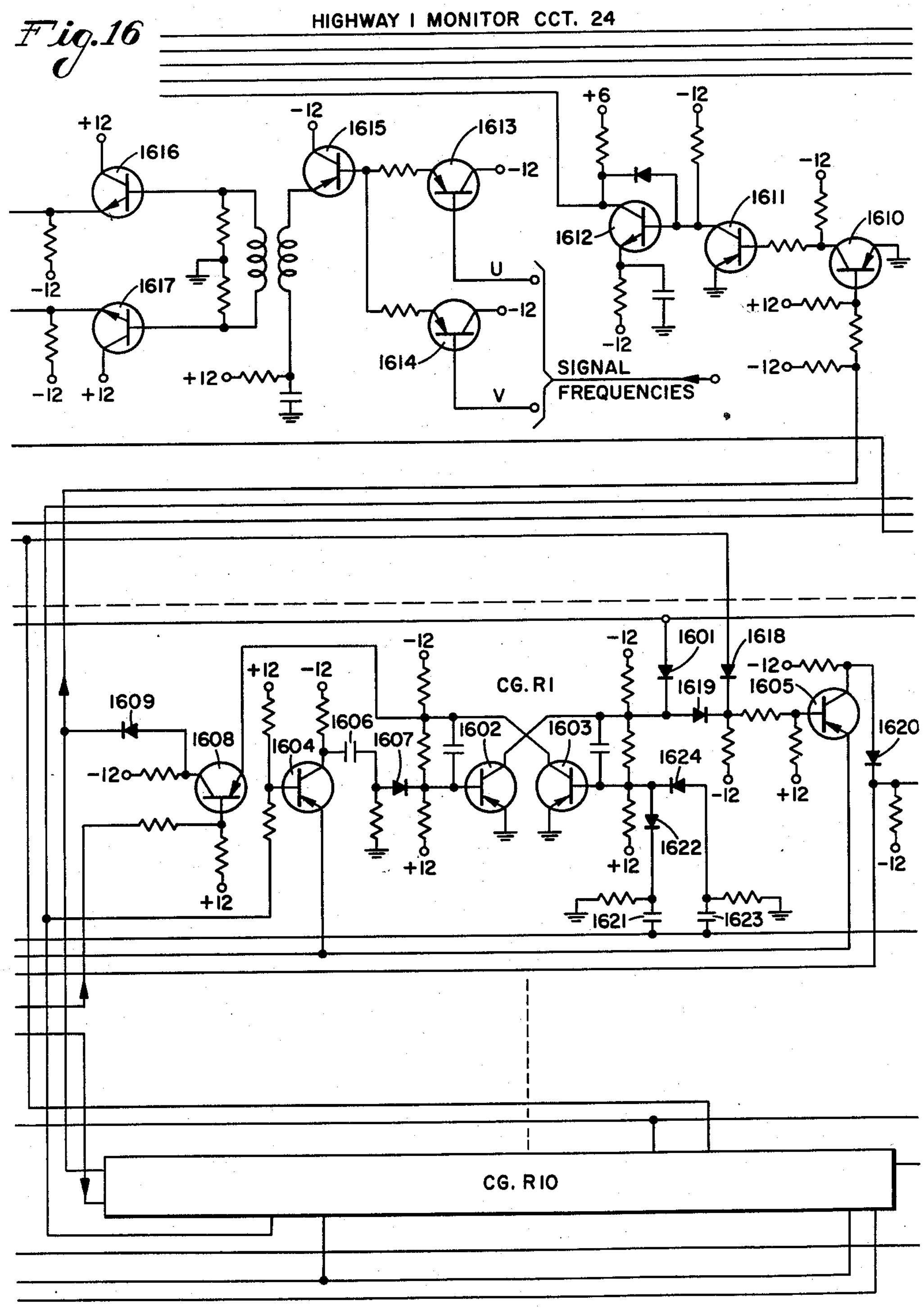
Figure 17:
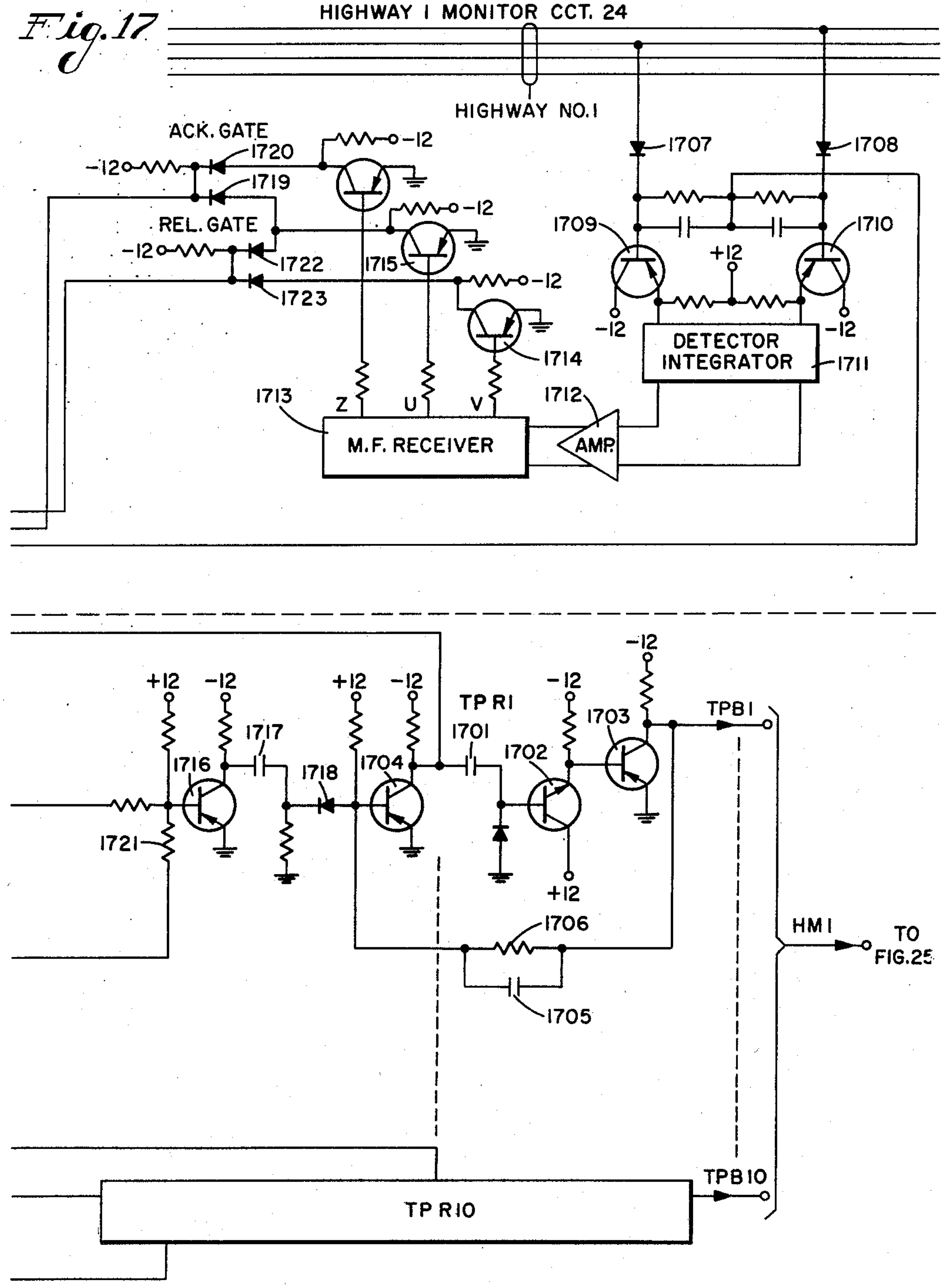

The seize and release scan circuit, shown in Figs. 11 and 12, is controlled to continuously scan a number of trunk line receive conductors for seize, release, and release acknowledge voice frequency signals. In practice, each seize and release scan circuit is associated with approximately ten trunk lines, which trunk lines are preferably in different groups so that the failure of a common seize and release scan circuit will not take out of service all of the trunk lines extending to a particular office.

The illustrated circuit comprises equipment common to the ten units terminating the ten trunk lines and ten groups of equipment individually corresponding to the units served by the circuit. The common equipment, which is shown in Fig. 12, comprises a seize signal detector, a multifrequency receiver for detecting release and release acknowledge signals, and a free running multivibrator oscillator. Each group of equipment individually corresponding to a unit served by the circuit comprises a unit scanning gate such as US1, a unit scanning control gate such as USC1, a start gate such as STG1, a distributor stage such as DS1, a release gate such as RG1, a release acknowledge gate such as RAG1, and a release reset gate such as RRG1.

The scanning operation is controlled by the distributor comprising stages DS1–DS10, inclusive, which is stepped under control of the free running multivibrator oscillator comprising transistors 1201 and 1202. When the circuit is first placed in operation, the reset switch 1103 is momentarily operated to the position in which minus twelve volt potential is applied to the emitter electrode of transistor 1101 in the first distributor stage DS1 and to the emitter electrode of the transistor corresponding to 1102 in all of the other distributor stages. Thus, responsive to the momentary operation of switch 1103, transistor 1102 in stage DS1 and the transistor corresponding to transistor 1101 in all of the other stages are rendered conductive. Also, it can be seen that the delay transistor 1104 in each of the stages is normally biased for conduction.

Referring to the first group of equipment, it can be seen that when transistor 1101 is non-conductive, transistor 1105 is biased for conduction and the ground potential appearing at the collector of transistor 1105 biases transistor 1106 for conduction. Under these conditions, the cathode terminals of diodes 1107 and 1108 in the units scanning gate 1 are returned to the approximately minus six volt potential appearing at the collector of transistor 1106 and the diodes are biased in the forward direction to couple any signals appearing on conductors TCA1 and TCB1 to the base electrodes of emitter follower transistors 1109 and 1110, respectively. Units scanning gate 1 is the only one of the units scanning gates open at this time since all of the other distributor stages are operated to the condition in which the transistor corresponding to 1101 is conductive.

Signals appearing at the outputs of transistors 1109 and 1110 are amplified by emitter follower transistors 1203 and 1204 and coupled by transformer 1205 to the input of the seize detector 1206. Seize detector 1206 and all of the other single or multiple frequency receivers found in the system may be of any conventional type and are equipped with suitable voice guard circuits so that an output is realized from each receiver only when the particular frequency or frequencies to which it is responsive are received. If a seize signal of frequency X is applied to the input of detector 1206, a ground potential appears at the output of detector 1206 and normally conductive transistor 1207 is thereby rendered non-conductive. Thus, the potential at the emitter of emitter follower transistor 1208 falls to a negative value. It can be seen that the emitter electrode of start gate 1 transistor 1111 is returned to ground potential at the collector of conducting transistor 1102 while the emitter electrodes of the remaining start gate transistors are returned to a negative potential. Therefore, only transistor 1111 is rendered conductive when a negative potential appears at the emitter of transistor 1208. When transistor 1111 is conductive, ground potential is applied to start conductor ST1 which is individual to the unit being scanned. As previously explained, the application of ground potential to conductor ST1 serves to control the associated unit to seize an idle channel in the illustrated long distance switching center.

The signals appearing at the outputs of transistors 1109 and 1110 are also amplified by emitter follower transistors 1209 and 1210 and coupled by transformer 1211 to the input of release and release acknowledge detector 1212. If a release signal of compounded frequencies V and U is applied to the input of detector 1212, ground potential appears on output conductors V and U and normally conducting transistors 1213 and 1214 are rendered non-conductive. The anodes of diodes 1215 and 1216, which form an "and" gate for negative signals, are connected to the collector electrodes of transistors 1213 and 1214, respectively. Thus, when either one or both of transistors 1213 and 1214 is or are conductive, the emitter of emitter follower transistor 1217 stands at ground potential. However, when a release signal is received and both transistors 1213 and 1214 become non-conductive, the emitter electrode of transistor 1217 drops to approximately minus twelve volt potential. The emitter electrode of transistor 1217 is connected to the base electrode of the transistor corresponding to transistor 1112 in each of the release gates, but since the emitter of transistor 1112 in release gate 1 is the only one returned to ground potential at this time, transistor 1112 in release gate 1 is the only transistor rendered conductive when the emitter of 1217 drops to a negative potential. Therefore, ground potential is applied to release conductor R1 whenever a release signal is received on conductors TAC1 and TCB1 while the receiver is connected thereto. Similarly, if a release acknowledge signal of compounded frequencies U and Z is applied to the input of detector 1212, ground potential appears on output conductors U and Z and normally conducting transistors 1214 and 1218 are rendered non-conductive. The anode terminals of diodes 1219 and 1220, which form an "and" gate for negative signals, are connected to the collector electrodes of transistors 1214 and 1218, respectively. Thus, when either one or both of transistors 1214 and 1218 is or are conductive, the emitter electrode of emitter follower transistor 1221 stands at ground potential. However, when a release acknowledge signal is received and both transistors 1214 and 1218 are non-conductive, the emitter electrode of transistor 1221 drops to approximately minus twelve volt potential. The emitter electrode of transistor 1221 is connected to the base electrode of the transistor corresponding to transistor 1113 in each of the release acknowledge gates but since the emitter of transistor 1113 in release acknowledge gate 1 is the only one returned to ground potential at this time, transistor 1113 in release acknowledge gate 1 is the only transistor rendered conductive when the emitter of transistor 1221 drops to a negative potential. Therefore, ground potential is applied to release acknowledge conductor RA1 whenever a release acknowledge signal is received on conductors TCA1 and TCB1 while the receiver is connected thereto.

As previously stated, the setting of the distributor stages is controlled by the free running multivibrator oscillator comprising transistors 1201 and 1202. Each time that transistor 1201 becomes conductive in the cycle of operation, the positive-going potential swing at its collector is coupled through capacitor 1222 to the base of emitter follower transistor 1223. The resulting positive-going pulse at the emitter of transistor 1223 is coupled through a diode corresponding to diode 1114 and a capacitor corresponding to capacitor 1115 to the base electrode of the transistor corresponding to transistor 1102 in each distributor stage. In distributor stage 1, the positive pulse applied to the base of transistor 1102 serves to reset that flip-flop circuit to the condition wherein transistor 1101 is conductive and transistor 1102 is non-conductive. The positive pulse applied to the base of the transistor corresponding to 1102 in each of the other distributor stages has no effect since transistor 1102 is non-conductive in those distributor stages. In distributor stage 1, the positive pulse coupled through diode 1114 is also coupled through resistor 1116 and capacitor 1117 to the base of transistor 1104 and thus renders that transistor non-conductive. It can be seen that the positive pulse coupled through the diode corresponding to diode 1114 in the other stages has no effect on the transistor corresponding to 1104 in those stages since the upper end of the resistor corresponding to 1116 is held at ground potential by virtue of the conduction of the transistor corresponding to 1101 in those stages.

When transistor 1104 in distributor stage 1 is rendered non-conductive, the resulting negative potential swing at its collector is coupled through a capacitor corresponding to capacitor 1118 to the base of the transistor corresponding to 1101 in the second distributor stage. Since the transistor corresponding to 1101 in the second distributor stage is already conductive, the negative pulse has no effect on that stage. Capacitor 1117 in distributor stage 1 now discharges to a point where the base of transistor 1104 is negative with respect to its emitter and transistor 1104 is again rendered conductive. The resulting positive-going pulse at the collector of transistor 1104 is coupled through a capacitor corresponding to capacitor 1118 in stage 2 and serves to set the second distributor stage to the condition wherein the transistor in that stage corresponding to 1102 is conductive and the transistor corresponding to 1101 is non-conductive. The delay introduced in the stepping of the distributor stages by transistor 1104 is sufficient to permit the detector outputs to decay to zero if a signal has been detected on the previously sampled trunk line. Thus, it can be seen that the frequency at which the free running multivibrator oscillator is designed to operate is controlled by the above-described requirements.

It will be recalled that distributor stage 1 is reset to the condition wherein transistor 1101 is conductive and transistor 1102 is non-conductive immediately upon the receipt of a positive pulse from the oscillator. When the collector of transistor 1101 returns to ground potential, transistors 1105 and 1106 become non-conductive and diodes 1107 and 1108 are biased in the reverse direction so that any signals appearing on conductors TCA1 and TCB1 are blocked from the detector circuits. Also, when the collector of transistor 1102 returns to a negative potential, transistors 1111, 1112, and 1113 are biased for non-conduction. The negative potential swing at the collector of transistor 1102 is also coupled through capacitor 1119 to the base of transistor 1120 in the release reset gate 1. Transistor 1120 is rendered conductive by the negative pulse only if the emitter electrode of transistor 1217 stands at ground potential, thus signifying that a release signal was not detected on conductors TCA1 and TCB1. If a release signal was not detected while receiver 1212 was connected to conductors TCA1 and TCB1, transistor 1120 applies a positive-going pulse to conductor RR1 to reset the release flip-flop circuit in the line terminating unit if that flip-flop circuit is in an operated condition.

It should be obvious from the above that the seize and release scan circuit is continuously operated to scan each of its associated trunk lines in turn for seize, release, and release acknowledge signals. If any one of those signals is detected, a signal is applied to a corresponding conductor individual to the line terminating unit which terminates that trunk line.

*Highway monitor circuit*

A highway monitor circuit, such as the one shown in Figs. 13–17, inclusive, is provided for each highway transmission network in the long distance switching center. Each highway monitor circuit is controlled to continuously scan the ten time position channels on its associated highway for release and release acknowledge voice frequency signals. It will be recalled from the description of the line terminating unit that a calling unit transmits signals to the upper pair of highway conductors and receives signals on the lower pair of highway conductors, while a called unit transmits signals to the lower pair of highway conductors and receives signals from the upper pair of highway conductors. Therefore, since release and release acknowledge signals may be transmitted over either the trunk line associated with the calling unit or the trunk line associated with the called unit, it is necessary for the highway monitor circuit to monitor both pairs of highway conductors for release and release acknowledge signals.

The illustrated circuit comprises equipment common to the ten time position channels and ten groups of equipment individually corresponding to the ten time position channels. The common equipment, which is shown above the dotted line in Figs. 13–17, inclusive, comprises two multifrequency receivers for monitoring the upper and lower pairs of conductors of the highway, respectively, a free runnning multivibrator oscillator, and the necessary equipment for applying locally generated release signals to either the upper or lower pairs of conductors of the highway. Each group of equipment individually corresponding to a time position channel comprises a time position read out gate such as TPRO1, a distributor stage such as DS1, an attendant's release circuit such as AR1, a called release gate such as CDR1, a calling release gate such as CGR1, and a time position reset gate such as TPR1.

The scanning operation is controlled by the distributor comprising stages DS1–DS10, inclusive, and which is stepped under control of the free running multivibrator oscillator comprising transistors 1401 and 1402. When the circuit is first placed in operation, the reset switch 1501 is momentarily operated to the position in which ground potential is applied to conductor 1502. The positive-going pulse applied to conductor 1502 is coupled through diode 1301 to the base of transistor 1302 in the first distributor stage and through a diode corresponding to diode 1301 to the base of a transistor corresponding to transistor 1303 in each of the other distributor stages. The distributor stages are thus set to the condition wherein transistor 1303 is conductive in the first stage and the transistor corresponding to transistor 1302 is conductive in all of the other distributor stages. The transistor corresponding to transistor 1304 is biased for conduction in each of the distributor stages. The positive-going pulse on conductor 1502 is also coupled through a diode corresponding to diode 1403 to the base of a transistor corresponding to transistor 1405 in each of the attendant's release gate circuits so that the flip-flop circuit in each gate is operated to the condition in which transistor 1404 is conductive and transistor 1405 is non-conductive. The positive-going pulse on conductor 1502 is also coupled through diodes corresponding to diodes 1503 and 1504 to the base of a transistor corresponding to transistor 1506 in each of the called release gates so that the flip-flop circuit in each gate is operated to the condition wherein transistor 1505 is conductive and transistor 1506 is non-conductive. The positive-going pulse on conductor 1502 is also coupled through diodes corresponding to diodes 1503 and 1601 to the base of a transistor corresponding to transistor 1603 in each of the calling release gates so that the flip-flop circuit in each gate is operated to the condition in which transistor 1602 is conductive and transistor 1603 is non-conductive. The positive-going pulse on conductor 1502 is also coupled through a diode corresponding to diode 1503 and a capacitor corresponding to capacitor 1701 to the base of a transistor corresponding to transistor 1702 in each time position reset circuit. Transistors 1702, 1703, and 1704 in each time position reset circuit comprise a monostable circuit in which transistor 1704 is normally non-conductive, the emitter of transistor 1702 is normally slightly negative, and transistor 1703 is normally conductive. A positive pulse coupled through capacitor 1701 serves to produce a positive pulse at the emitter of transistor 1702 and transistor 1703 is thereby rendered non-conductive. The negative potential swing at the collector of transistor 1703 is coupled through capacitor 1705 and resistor 1706 to the base of transistor 1704 and renders that transistor conductive. After approximately a one-second delay, the monostable circuit reverts to the condition wherein transistors 1702 and 1704 are non-conductive and transistor 1703 is conductive. Thus, a negative-going pulse of approximately one-second duration is applied to the individual time position busy conductor, such as TPB1, which extends to the channel allotter circuit. As will be explained more fully hereinafter, the trailing edge of the pulse applied to conductor TPP1 is utilized in the channel allotter circuit to mark the time position 1 channel on highway network 1 as idle to the channel allotter. Thus, responsive to the momentary operation of reset key 1501, the various gate circuits are set, distributor stage 1 is activated, and the ten time position channels are marked idle to the channel allotter.

Referring to distributor stage 1, it can be seen that the ground potential appearing at the collector of conducting transistor 1303 is applied to the emitter electrodes of transistors 1507 and 1508 in the called release 1 gate and to the emitter electrodes of transistors 1604 and 1605 in the calling release 1 gate. Thus, transistors 1507, 1508, 1604, and 1605 are enabled for operation while the corresponding transistors in the other called and calling release gates are not so enabled because of the non-conductivity of the transistor corresponding to 1303 in their associated distributor stages. The ground potential appearing at the collector of conducting transistor 1303 is also applied to the emitter of the time position read out 1 transistor 1305. Each negative-going four microsecond pulse appearing on conductor TP1 thus serves to render transistor 1305 conductive as long as transistor 1303 is conductive. It should be apparent that the other time position read out transistors corresponding to transistor 1305 are not rendered conductive by the negative pulses appearing on their individually associated time position pulse conductors since the emitter electrodes of those transistors are returned to a negative potential at the collector of the transistor corresponding to 1303 in their individually associated distributor stages.

The positive-going pulses in time position 1 appearing at the collector of transistor 1305 are coupled through diode 1306, which forms one input of a ten-input "or" gate for positive pulses, and each pulse serves to render normally conductive transistor 1307 non-conductive. Each negative-going pulse at the collector of transistor 1307 renders transistor 1308 conductive and each resulting positive-going pulse at the collector of transistor 1308 renders transistor 1309 conductive. Thus, as long as the first distributor stage is operated to the condition wherein transistor 1303 is conductive, a negative-going pulse in time position 1 periodically appears at the collector of transistor 1309. It can be seen that the cathode terminals of gating diodes 1310 and 1311, and the cathode terminals of gating diodes 1707 and 1708 are returned to the collector of transistor 1309. When transistor 1309 is non-conductive and its collector stands at plus six volt potential, these diodes are biased in the reverse direction. However, when transistor 1309 is conductive and its collector stands at approximately minus six volt potential, the above-mentioned diodes are biased in the forward direction. Signals transmitted to the highway by a called unit and appearing on the lower pair of highway conductors in time position 1 are passed through diodes 1310 and 1311, amplified by emitter follower transistors 1312 and 1313, detected and integrated by detector integrator 1314, amplified by amplifier 1315, and applied to the input of multifrequency receiver 1316. Similarly, signals transmitted by a calling unit and appearing on the upper pair of highway monitors in time position 1 are passed by diodes 1707 and 1708, amplified by emitter follower transistors 1709 and 1710, detected and integrated by detector integrator 1711, amplified by amplifier 1712, and applied to the input of multifrequency receiver 1713. Detector integrators 1314 and 1711 and amplifiers 1315 and 1712 may be identical to their previously described respective counterparts in the line terminating unit. As previously stated, the multifrequency receivers used throughout the system may be of any conventional type and are equipped with suitable voice guard circuits so that an output is realized from each receiver only when the particular frequencies to which it is responsive are received.

To illustrate the operation of the circuit, first assume that a voice frequency release signal of compounded frequencies U and V is transmitted over a trunk line associated with a calling unit and signal samples of said release signal appear on the upper pair of highway conductors in time position 1. When a release signal of frequencies U and V is applied to the input of multifrequency receiver 1713, ground potential appears on output conductors U and V and normally conductive transistors 1714 and 1715 are rendered nonconductive. The anodes of release gate diodes 1722 and 1723, which form an "and" gate for negative signals, are connected to the collector electrodes of transistors 1715 and 1714, respectively. Thus, when either one or both of transistors 1714 and 1715 is or are conductive, ground potential is applied to the base electrode of a transistor corresponding to transistor 1604 in each of the calling release gate circuits. However, when a release signal is received and both transistors 1714 and 1715 are nonconductive, the output of the release gate drops to a negative potential value and transistor 1604 in calling release gate 1 is rendered conductive since its emitter electrode is returned to ground potential at the collector of conducting transistor 1313. The resulting positive-going potential swing at the collector of transistor 1604 is coupled through capacitor 1606 and diode 1607, and serves to set the calling release flip-flop circuit to the condition in which transistor 1603 is conductive and transistor 1602 is non-conductive. When transistor 1603 becomes conductive, the emitter of transistor 1608 is returned to ground potential and each negative pulse thereafter occurring on time position conductor TP1 serves to render transistor 1608 conductive.

The positive-going pulses in time position 1 appearing at the collector of transistor 1608 are coupled through diode 1609, which forms one input of a ten-input "or" gate for positive pulses, and applied to the base of normally conductive transistor 1610 to make that transistor non-conductive. Each negative-going pulse appearing at the collector of transistor 1610 is reproduced as a positive-going pulse at the collector of transistor 1611 and transistor 1612 is thereby rendered conductive to apply a minus six volt pulse to the cathode terminals of gating diodes 1509 and 1510. When gating diodes 1509 and 1510 are biased for conduction during time position 1, the locally generated release signal frequencies U and V, which are amplified and modulated by transistors 1613 and 1614, amplified by transistor 1615, and amplified by emitter follower transistors 1616 and 1617, are passed by the diodes and applied through emitter follower transistors 1511 and 1512 to the upper pair of conductors of the transmission highway network. Thus, it can be seen that when a release signal is detected by the highway monitor circuit on the upper pair of highway conductors in any particular time position, the monitor circuit functions to apply a locally generated release signal to the upper pair of conductors in the same time position. It will be recalled that the calling unit which terminates the trunk line over which the release signal is received, is released from the connection after a time delay of sufficient duration to allow the monitor circuit to detect the release signal. The highway monitor circuit continues to apply the release signal to the upper pair of conductors in time position 1 and thus to the called unit and the send conductors of the trunk line terminated by that unit until a release acknowledge signal is returned over the receive conductors of that trunk line to the illustrated long distance switching center.

When a release acknowledge signal is returned over the receive conductors of the trunk line terminated by the called unit, release acknowledge signal samples appear on the lower pair of highway conductors in time position 1. When a release acknowledge signal of frequencies U and Z is applied to the input of multifrequency receiver 1316, ground potential appears on output conductors U and Z, normally conductive transistors 1317 and 1318 are rendered non-conductive, and a negative signal appears at the output of the acknowledge gate comprising diodes 1319 and 1320. The negative potential signal appearing at the output of the acknowledge gate is applied to the anode of diode 1618, which with diode 1619 forms an "and" gate for negative signals. Since the anode terminal of diode 1619 is also returned to a negative potential at the collector of non-conducting transistor 1602, the output of the gate goes negative and transistor 1605 becomes conductive. When transistor 1605 becomes conductive and its collector rises to ground potential, normally conductive transistor 1716 is rendered non-conductive through diode 1620. The resulting negative potential swing at the collector of transistor 1716 is coupled through capacitor 1717 and diode 1718 to the base of transistor 1704. As previously described, transistors 1704, 1702, and 1703 comprise a monostable circuit. The negative pulse applied to the base of transistor 1704 triggers transistor 1704 conductive and the resulting positive pulse at the emitter of transistor 1702 renders transistor 1703 non-conductive for approximately one second. Also as previously described, time position 1 channel on highway 1 is marked idle to the channel allotter over conductor TPB1 when transistor 1703 again becomes conductive at the end of the one-second period. When transistor 1704 is triggered conductive and its collector rises to ground potential, the flip-flop circuit in the calling release 1 gate is reset through diode 1601 to the condition wherein transistor 1602 is conductive and transistor 1603 is non-conductive.

In the above description of operation it was assumed that the release and release acknowledge signals were both received during a single activation of distributor stage DS1. It will often happen in practice that a release signal is received near the end of the period in which a particular stage is activated. Under these conditions, the flip-flop circuit in calling release gate 1 remains in the condition wherein transistor 1603 is conductive to thereby gate release signals to the highway in time position 1 even during the period when the other distributor stages are successively activated. A release acknowledge signal received in time position 1 is, of course, not coupled to the input of multifrequency receiver 1316 until distributor stage DS1 is again activated. At that time, the time position reset 1 monostable circuit is triggered to mark time position 1 idle and the flip-flop circuit in calling release 1 gate is reset to the condition wherein transistor 1602 is conductive.

Next assume that a release signal is transmitted over the trunk line terminated by the called unit, and signal samples of that release signal appear on the lower pair of highway conductors in time position 1. Under these conditions, transistor 1507 in the called release 1 gate is triggered conductive through the action of the release gate diodes 1321 and 1322 and the flip-flop circuit in the called release 1 gate is thereby operated to the condition in which transistor 1506 is conductive and transistor 1505 is non-conductive. Transistors 1513, 1408, 1406, and 1407 then function in the exact same manner as did the previously described transistors 1608, 1610, 1611, and 1612 to apply negative pulses in time position 1 to the cathode terminals of gating diodes 1514 and 1515. Thus, the release signal frequencies U and V are applied to the lower pair of highway conductors in time position 1.

When a release acknowledge signal is received on the upper pair of highway conductors in time position 1, the output of the acknowledge gate comprising diodes 1719 and 1720 goes negative and transistor 1508 in the called release 1 gate is rendered conductive. When transistor 1508 becomes conductive, the positive-going signal at its collector is coupled through diode 1516 and serves to trigger the time position reset 1 monostable circuit to mark time position 1 idle to the channel allotter, all as previously described. The positive-going pulse appearing at the collector of transistor 1704 is coupled through diode 1504 to reset the called release 1 gate flip-flop circuit to the condition wherein transistor 1505 is conductive and transistor 1506 is non-conductive.

Although the attendant's position circuits have not been shown in detail in this application, the attendant's release gate circuits are shown in the illustrated highway monitor circuit. It will be recalled from the general description that a call from a local office is automatically routed to the attendant's position in the illustrated long distance switching center and in accordance with oral instructions received from the calling party, the attendant keys the digits required to route the call to the desired destination. When the number is completely keyed, the attendant operates an end of selection key and the common equipment in the illustrated long distance switching center is controlled in accordance with the first digit registered in the key sender register to select an idle terminating unit in the group of terminating units associated with trunk lines extending to the next succeeding long distance switching center. The remaining digits are then transmitted to and through the succeeding switching centers until the desired called party is selected in a terminating local office. It may happen that the attendant at the attendant's position incorrectly keys the number and, therefore, wishes to re-key. If the error is realized before the end of selection key is operated, the operation of a cancel key provided at the position is effective to reset the key sender register. However, if the sender is transmitting digits to the succeeding offices or has completed the transmission of same, it is, of course, necessary to release the established connection in the forward direction. For this purpose, a release key is provided at the attendant's position. When the release key is operated, negative pulses in the time position of the channel assigned to the attendant's link handling the particular call are applied to conductor LR1 and thus to the base electrode of a transistor corresponding to transistor 1409 in each of the attendant's release gates. If it is assumed that the pulses applied to conductor LR1 occur in time position 1, transistor 1409 in attendant's release gate 1 will be rendered conductive by each pulse during the period when the first distributor stage DS1 is activated. This is because the emitter of each transistor corresponding to transistor 1409 is returned to the collector of transistor 1308 and positive pulses in time position 1 appear at the collector of transistor 1308 only when distributor stage 1 is activated, as previously described. When transistor 1409 becomes conductive, the positive-going potential swing at its collector is coupled through capacitor 1410 and diode 1411 to trigger the flip-flop circuit in the attendant's release 1 gate to the condition in which transistor 1405 is conductive and transistor 1404 is non-conductive.

When transistor 1404 becomes non-conductive, the negative potential swing at its collector is coupled through capacitor 1621 and diode 1622 to trigger the flip-flop circuit in the calling release 1 gate to the condition wherein transistor 1603 is conductive and transistor 1602 is non-conductive. The calling release 1 gate then controls transistors 1608, 1610, 1611, and 1612 to enable diodes 1509 and 1510 to gate a release signal in time position 1 to the upper pair of highway conductors, all as previously described. When a release acknowledge signal is returned over the lower pair of highway conductors, transistor 1605 is triggered conductive to apply ground potential through diode 1620 to the time position reset 1 monostable circuit, all as previously described. The monostable circuit is prevented from operating at this time, however, by the negative potential appearing at the collector of transistor 1404 and coupled through resistor 1721 to the base of transistor 1716. Thus, time position 1 on highway 1 is not marked idle to the channel allotter since channel 1 is still being used by the calling line terminating unit and the attendant's link circuit handling the call.

When the distributor is advanced to the next stage, the flip-flop circuit in distributor stage 1 is operated to the condition in which transistor 1303 is non-conductive and transistor 1302 is conductive. When transistor 1303 becomes non-conductive and its collector potential returns to a negative value, the emitter of transistor 1605 is made negative and transistor 1605 becomes non-conductive. When the collector of transistor 1605 falls to a negative potential, diode 1620 is biased for non-conduction and a negative pulse is coupled through capacitor 1412 and diode 1413 to reset the attendant's release 1 flip-flop circuit to the condition in which transistor 1404 is conductive and transistor 1405 is non-conductive. When transistor 1404 becomes conductive, the positive potential swing at its collector is coupled through capacitor 1623 and diode 1624 to reset the calling release 1 flip-flop to the condition wherein transistor 1602 is conductive and transistor 1603 is non-conductive. Thus, the circuits are all reset to their normal condition.

The distributor comprising stages DS1–DS10, inclusive, is identical to the seize and release scan circuit distributor which was previously described. The distributor is stepped under control of free running multivibrator transistors 1401 and 1402, and the transistor corresponding to transistor 1304 in each stage delays the activation of the next succeeding stage by a period of time long enough to allow the output of the multifrequency receivers to decay to zero if any signals were detected during the activation of the preceding stage.

*Control counter 15*

Figure 18:
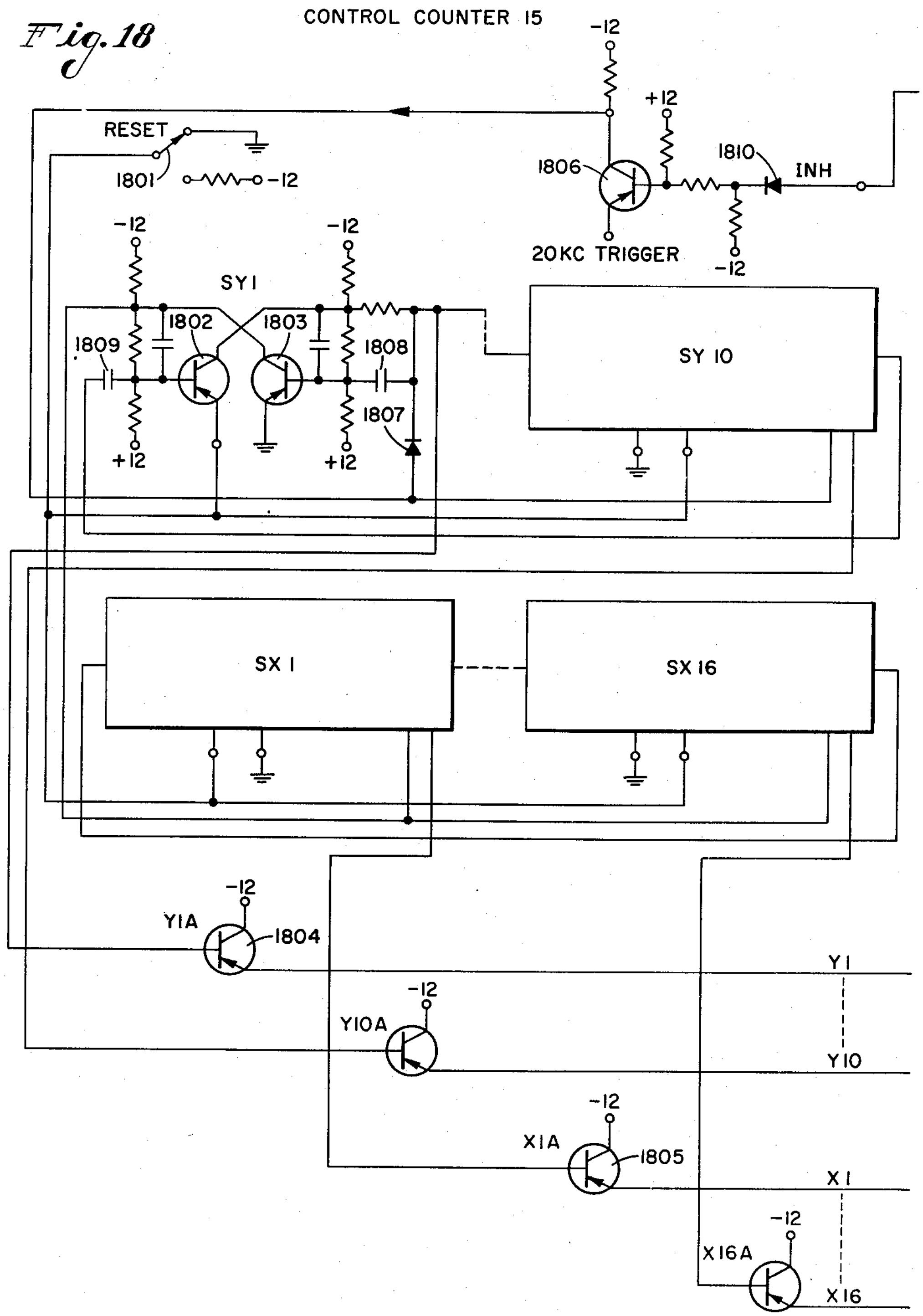

Control counter 15, which is shown in Fig. 18, has been illustrated as comprising a sixteen-stage ring counter driven by a ten-stage ring counter and is thus capable of supplying marking signals individually identifying as many as one hundred and sixty line terminating units. Each stage of both ring counters comprises a flip-flop circuit identical to the one shown in stage SY1 of the ten-stage ring counter.

When the circuit is first placed in operation, reset switch 1801 is momentarily operated to the position in which minus twelve volt potential is applied to the emitter electrode of a transistor corresponding to transistor 1802 in the first stage SY1 of the ten-stage ring counter and in the first stage SX1 of the sixteen-stage ring counter. The minus twelve volt potential is also applied to the emitter electrode of a transistor corresponding to transistor 1803 in the remaining stages of both the ten- and sixteen-stage ring counters. Thus, responsive to momentary operation of switch 1801, stages SY1 and SX1 are operated to the condition wherein transistor 1803 is conductive and transister 1802 is non-conductive, and stages SY2–SY10 and SX2–SX16 are operated to the condition wherein transistor 1802 is conductive and transistor 1803 is non-conductive. Under these conditions, a negative potential is applied to the base electrode of the Y1 amplifier transistor 1804 and to the base electrode of the X1 amplifier transistor 1805 and a negative potential appears on conductors Y1 and X1. All of the other marking conductors, namely, conductors Y2–Y10 and X2–X16, are returned to ground potential since the transistor corresponding to transistor 1802 is conductive in each respective stage, and ground potential is applied to the base electrode of the respective emitter follower amplifier transistor.

The ten-stage stage ring counter is stepped under control of transistor 1806 each time that a positive-going pulse appears on conductor 20 kc. trigger. It will be recalled that the potential applied to conductor 20 kc. trigger rises from minus twelve volts to ground potential for ten microseconds in each fifty microsecond period, as shown in Fig. 34 of the drawings. Thus, a ten microsecond positive-going pulse appears at the collector of transistor 1806 and is applied to the anode terminal of a diode corresponding to diode 1807 in each of the stages SY1–SY10. In stage SY1, a positive-going pulse is coupled through diode 1807 and capacitor 1808 to the base of transistor 1803 and serves to trigger transistor 1803 non-conductive and transistor 1802 conductive. The positive-going pulse coupled through diode 1807 in stage SY1 is also coupled through a capacitor corresponding to capacitor 1809 to the base of the transistor corresponding to 1802 in stage SY2 and serves to trigger that stage to the condition wherein transistor 1803 is conductive and transistor 1802 is non-conductive. A positive-going pulse applied to the anode terminal of the diode corresponding to 1807 in each of the remaining stages has no effect on those stages since the cathode terminal of diode 1807 in each stage is returned to ground potential at the collector of conducting transistor 1802. It can be seen that the base electrode of transistor amplifier 1804 is held at ground potential for the duration of the trigger pulse and that the base of the second stage amplifier transistor corresponding to 1804 is also held at ground potential for the duration of the trigger pulse even though transistor 1802 in that stage is triggered non-conductive. Thus, all of the Y marking conductors are held at ground potential during the transition period and conductor Y2 goes to a negative potential at the termination of the trigger pulse. The next succeeding positive-going trigger pulse triggers transistor 1803 in stage SY2 non-conductive and transistor 1803 in stage SY3 conductive. Each succeeding stage is triggered in successive order and the stepping operation is continuous except when a ground potential is received over the inhibit conductor INH from route selector 17. When ground potential is applied to conductor INH, it is coupled through diode 1809 to the base of transistor 1806 and transistor 1806 is, of course, inhibited from operating.

Each time that the tenth stage SY10 is reset and a positive-going pulse is therefore coupled through capacitor 1809 to trigger transistor 1802 non-conductive and transistor 1803 conductive in stage SY1, the resulting positive-going potential swing at the collector of transistor 1803 in stage SY1 is applied to the anode terminal of a diode corresponding to 1807 in each of the stages SX1–SX16. Thus, the sixteen-stage ring counter, comprising stages SX1–SX16, is stepped at one-tenth the frequency of the ten-stage ring counter comprising stages SY1–SY10. It should now be apparent that a negative potential is applied to the X marking conductors in successive order and that while said negative potential is applied to any one of the X marking conductors, a negative potential is applied to each of the Y marking conductors in successive order.

*Calling unit finder circuit 26*

Figure 19:
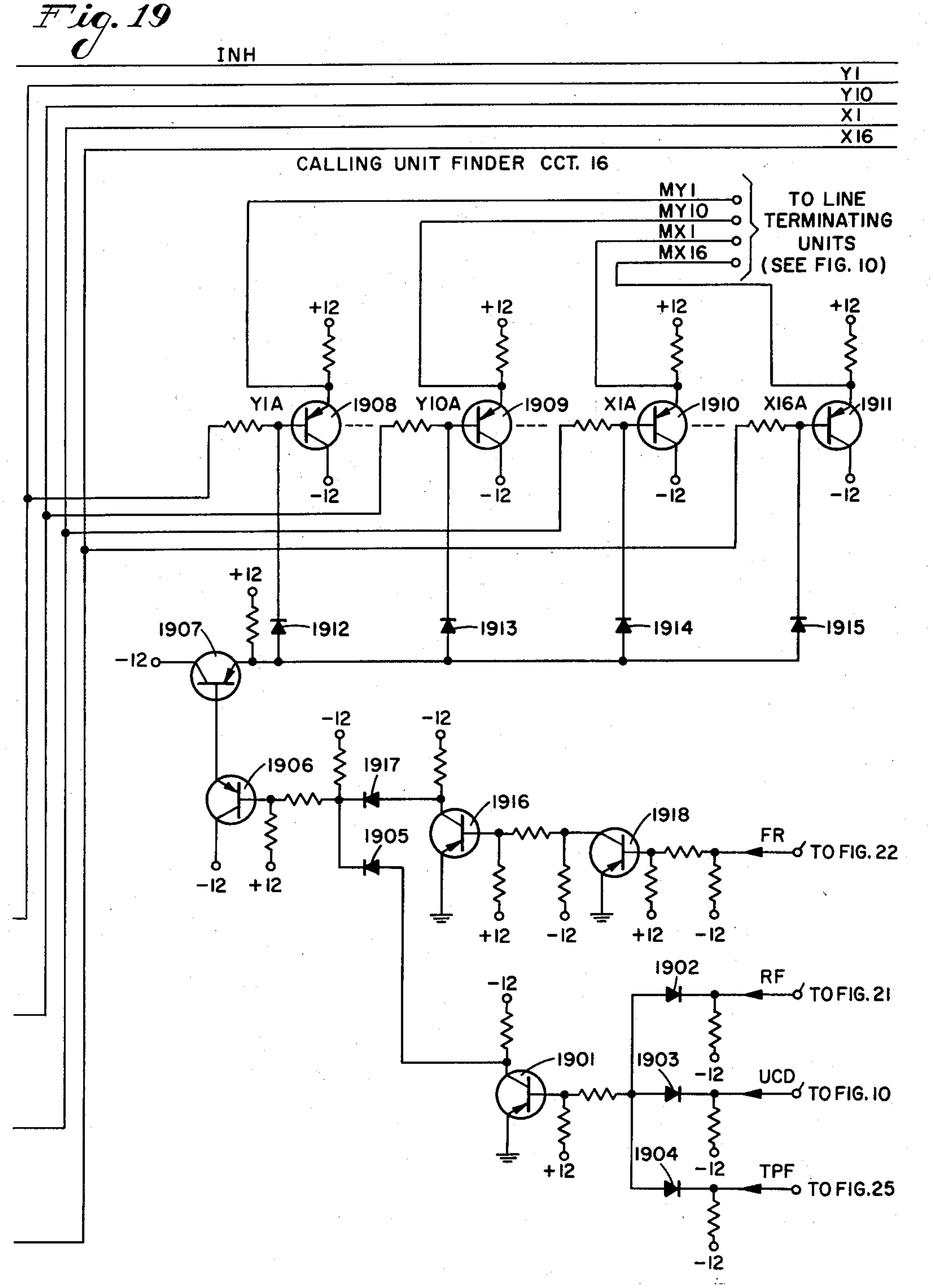

It will be recalled that the purpose of the calling unit finder circuit, which is shown in Fig. 19, is to transmit an enabling signal to each of the line terminating units in turn when one or more of the units are in a calling condition and that a calling line terminating unit and the assigned register are controlled to seize the marked idle time position channel responsive to the receipt of an enabling signal. It will also be recalled from the general description that the calling unit finder serves to repeat the signals received over conductors Y1–Y10 and X1–X16 from the control counter to the marking conductors MY1–MY10 and MX1–MX16, respectively, if a register has been assigned for use, an idle channel is being marked by the channel allotter, a call is initiated on the trunk line terminated by one of the units, and if channel identifying information is not being read out of one of the registers to the channel and highway marking bus bars.

It can be seen that the register found conductor RF, the unit connect demand conductor UCD, and the time position found conductor TPF are coupled to the base of transistor 1901 through diodes 1902, 1903, and 1904, respectively. The incoming register allotter functions to apply ground potential to conductor RF only when an idle register has been assigned for use, each line terminating unit functions to apply ground potential to common conductor UCD when a call is initiated on the trunk line terminated by that unit, and the channel allotter functions to apply ground potential to conductor TPF only when the channel allotter is marking an idle channel and highway to the units and incoming registers. If any one of the above-mentioned conductors has a negative potential applied thereto, transistor 1901 is conductive and ground potential is applied to the anode terminal of diode 1905. Under these conditions, the output potential appearing at the emitter electrodes of emitter followers transistors 1906 and 1907 has a positive value and the base electrodes of amplifier transistors 1908–1911 are held at said positive potential value through diodes 1912–1915, respectively. Therefore, the negative signal appearing on one of the Y1–Y10 conductors and the negative signal appearing on one of the X1–X16 conductors have no effect on the corresponding Y and X amplifier transistors, and conductors MY1–MY10, inclusive, and conductors MX1–MX16, inclusive, have a positive potential applied thereto.

When an incoming register has been assigned for use, when a call is initiated on the trunk line terminated by one of the units, and when the channel allotter is marking an idle channel and highway, ground potential appears on conductors RF, UCD, and TPF, respectively, and transistor 1901 is rendered non-conductive. When transistor 1901 becomes non-conductive, minus twelve volt potential is applied to the anode terminal of diode 1905. If it be assumed that an incoming register is not reading out channel information to the bus bars at this time, transistor 1916 is also non-conductive, as will be described hereinafter, and minus twelve volt potential is also applied to the anode of diode 1917. Under these conditions, diodes 1905 and 1917, which form an "and" gate for negative signals, are biased for non-conduction and the output potential appearing at the emitter electrodes of emitter follower transistors 1906 and 1907 has a negative value. Diodes 1912–1915 are now biased in the reverse direction and the signals applied to conductors Y1–Y10 and X1–X16 by the control counter are amplified by emitter follower transistors 1908–1911 and applied to marking conductors MY1–MY10 and MX1–MX16, respectively.

When the X and Y marking conductors corresponding to the calling line terminating unit are simultaneously marked with negative potential, that unit and the assigned register read in the time position channel identifying information, the incoming register allotter is then controlled to assign the next idle register for use, and the channel allotter is controlled to mark the next idle channel for use. When another register and time position have been assigned, the calling unit finder transistor 1901 is again rendered non-conductive if another call is awaiting attention as signified by the application of ground potential to conductor UCD.

It will be recalled from the general description that incoming registers having the designation of a called unit registered therein are controlled by the incoming register finder to read out channel and highway identifying information to the bus bars on a one-at-a-time basis. When a register has been seized by the register finder for reading out purposes, ground potential is applied to conductor FR by the register finder. Ground potential on conductor FR serves to render normally conductive transistor 1918 non-conductive and the resulting negative potential at the collector of transistor 1918 renders transistor 1916 conductive. Ground potential appearing at the collector of transistor 1916 is coupled through diode 1917 and sreves to hold the emitter electrodes of transistors 1906 and 1907 at a positive potential value regardless of the condition of conductors RF, UCD, and TPF. Thus, when a register is reading out information to the bus bars, the calling unit finder is prevented from transmitting enabling signals to the line terminating units so that the time position channel read out by a register cannot be seized by a calling unit.

*Route selector 17*

Figure 20:
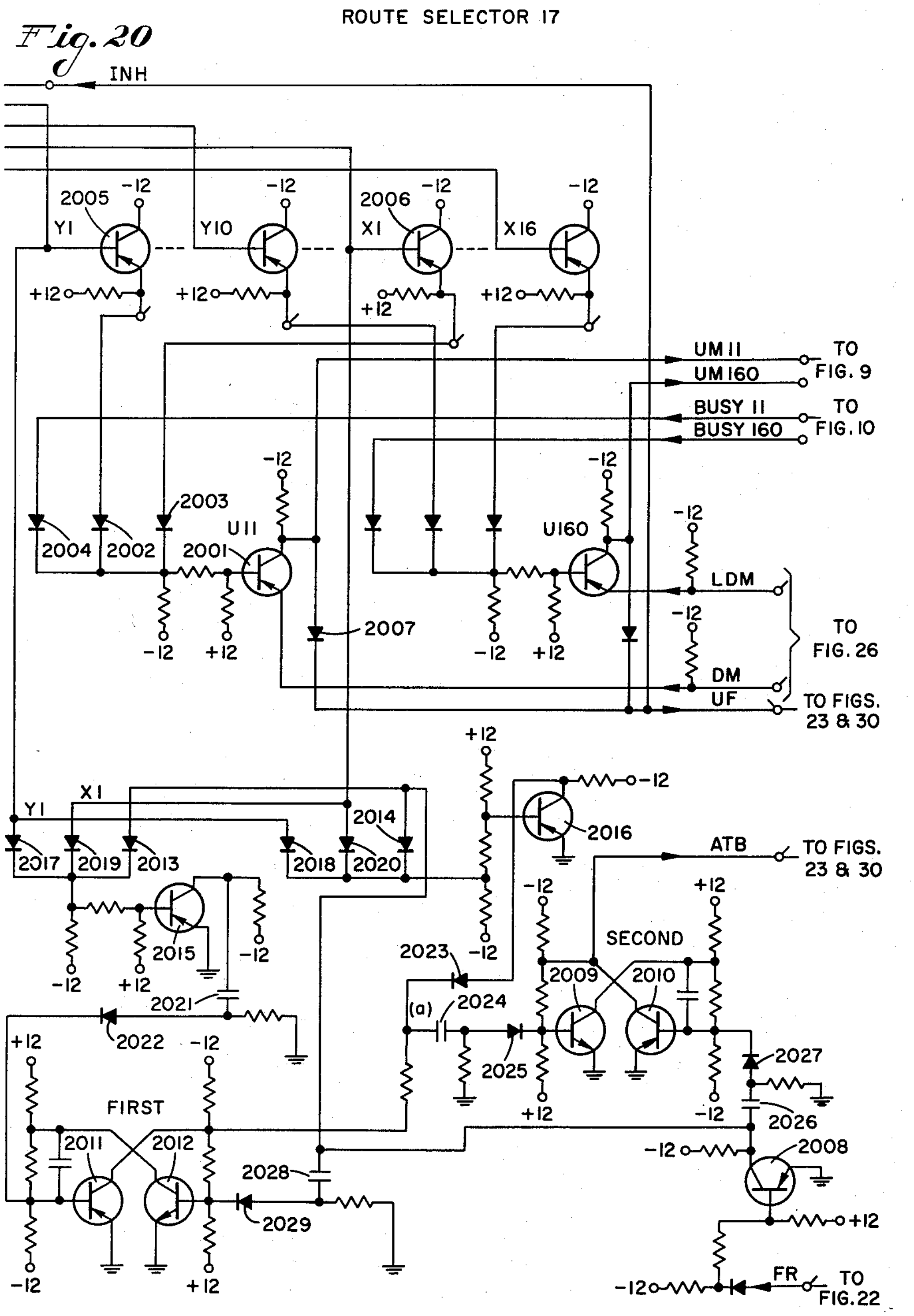

The route selector, which is shown in Fig. 20, comprises an individual gate for each of the line terminating units provided in the long distance switching center. For example, the gate corresponding to line terminating unit 11 comprises transistor 2001 and diodes 2002, 2003, and 2004. The anode terminals of diodes 2002, 2003, and 2004, which form an "and" gate for negative pulses, are returned to the emitter electrode of Y1 transistor 2005, the emitter electrode of X1 transistor 2006, and to conductor busy 11, respectively. The emitter electrode of transistor 2001 is connected to one of the digit marking conductors DM, which extends from the incoming and key sender registers. It will be recalled from the general description that when a register is controlled to read out channel identifying information, it is also controlled to apply ground potential to the one of the digit marking conductors DM which corresponds to the particular digit stored in that register. In the route selector, the conductor DM which corresponds to a particular group of units terminating trunk lines to a particular long distance switching center is connected to the emitter electrodes of the transistors in the gate circuits corresponding to those units. Similarly, local digit marking conductors, such as LDM, are connected in the route selector to the emitter electrodes of the transistors in the gate circuits corresponding to units terminating trunk lines extending to particular local offices.

If it is assumed that a register is applying ground potential to conductor DM, transistor 2001 and all of the other transistors corresponding to units in that particular group are enabled for operation. As the control counter advances, the X and Y conductors are marked with negative potential, as previously described. When the control counter advances to the setting wherein negative potential is applied to conductors X1 and Y1, a negative potential appears at the emitter electrodes of transistors 2006 and 2005 and is applied to the anode terminals of diodes 2003 and 2002, respectively. If unit 11 is not already busy handling a call, negative potential is also applied in unit 11 to conductor busy 11 and appears at the anode terminal of diode 2004. Under these conditions, transistor 2001 is rendered conductive and ground potential is applied to unit marking conductor UM11 to seize unit 11 and control that unit to read in the channel and highway information applied to the bus bars by a register. Ground potential appearing at the collector of transistor 2001 is also coupled through diode 2007 to the inhibit conductor INH and to the units found conductor UF. As previously described, ground potential applied to conductor INH serves to block the control counter from further stepping so that conductors X1 and Y1 continue to be marked with negative potential. Ground potential applied to conductor UF serves to release the register and to control the channel allotter to mark the next idle channel on the bus bars when the next 20 kc. trigger pulse is received by those circuits. When unit 11 is seized over conductor UM11, that unit functions to apply ground potential to conductor busy 11 and transistor 2001 is made non-conductive to thereby remove ground potential from conductors UM11, INH, and UF.

If unit 11 is already busy on another call when negative potential is simultaneously applied to conductors X1 and Y1, the ground potential on conductor busy 11 prevents transistor 2001 from becoming conductive. The control counter continues to advance until an idle unit in the group of units marked by conductor DM is found. If no idle unit is found in the group of units marked by ground potential on conductor DM, an all trunks busy circuit provided in the route selector operates to inform the register of this condition.

When no register is being read out as signified by negative potential on conductor FR, transistor 2008 is biased for conduction, transistors 2011 and 2012 in the first flip-flip circuit are conductive, and transistors 2009 and 2010 in the second flip-flip circuit are non-conductive. Ground potential at the collector of conducting transistor 2008 is coupled through diodes 2013 and 2014 to the base electrodes of transistors 2015 and 2016, respectively, and holds those transitsors non-conductive. The anodes of diodes 2017 and 2018 are connected to conductor Y1, which extends to the control counter, and the anodes of diodes 2019 and 2020 are connected to conductor X1, which extends to the control counter.

When a register is found by the register finder and ground potential is applied to conductor FR, transistor 2008 is rendered non-conductive and the anode terminals of diodes 2013 and 2014 are returned to minus twelve volt potential. When the control counter advances to the setting wherein conductors X1 and Y1 are simultaneously returned to minus twelve volt potential, the output signals from both the "and" gate for negative signals comprising diodes 2013, 2017, and 2019 and the "and" gate for negative signals comprising diodes 2014, 2018, and 2020 go negative and transistors 2015 and 2016 are rendered conductive. The resulting positive potential swing at the collector of transistor 2015 is coupled through capacitor 2021 and diode 2022 to the base of transistor 2011 and serves to trigger flip-flip transistors 2011 and 2012 non-conductive. It can be seen that prior to the triggering of transistor 2011 to a non-conductive condition, point (*a*) is returned to ground potential at the collector of transistor 2011 and diode 2023 is biased for non-conduction. When transistor 2016 is triggered conductive, diode 2023 is no longer biased in the reverse direction but point (*a*) remains at ground potential. Now, when transistor 2011 is triggered conductive and its collector goes negative, point (*a*) becomes slightly negative and the second flip-flip circuit transistors 2009 and 2010 remain non-conductive.

If the control counter advances through a complete cycle while ground potential remains on conductor FR, thus signifying that all units in the selected group are busy, negative potential is again simultaneously applied to conductors X1 and Y1 and transistors 2015 and 2016 are rendered conductive. The positive-going potential swing at the collector of transistor 2015 has no effect on the first flip-flip circuit since transistors 2011 and 2012 are already non-conductive. The positive-going potential swing at the collector of transistor 2016 is coupled through diode 2023, capacitor 2024, and diode 2025 to the base of transistor 2009 and serves to trigger flip-flip circuit transistors 2009 and 2010 conductive. When transistor 2010 becomes conductive, ground potential is applied to conductor ATB and controls the register to transmit a busy signal to the calling unit and thus to the calling trunk line. The register then releases and ground is removed from conductor FR by the register finder when ground potential is removed from conductor FR. Transistor 2008 becomes conductive and the resulting ground potential at its collector blocks the previously described "and" gates for negative signals. The positive potential swings at the collector of 2008 is coupled through capacitor 2026 and diode 2027 to reset flip-flip transistors 2009 and 2010 to the non-conductive condition and is also coupled through capacitor 2028 and diode 2029 to reset flip-flip transistors 2011 and 2012 to the conductive condition.

*Incoming register allotter 31*

Figure 21:
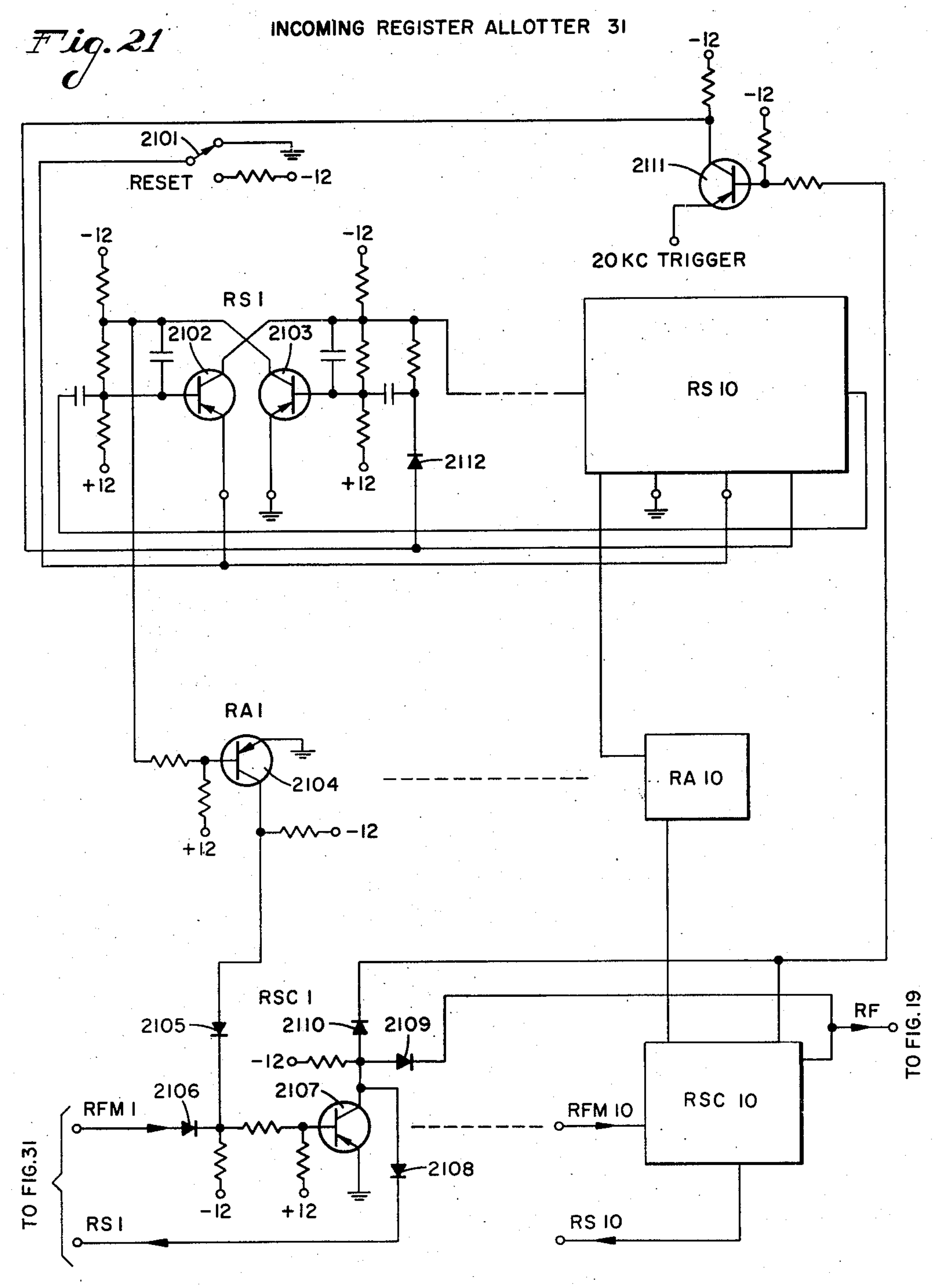
Fig. 21 shows circuit details of an incoming register allotter for use in a long distance switching center.

The incoming register allotter, which is shown in Fig. 21, comprises a group of equipment for each incoming register provided in the long distance switching center. Each group of equipment comprises a ring counter distributor stage such as RS1, an amplifier such as RA1, and a register seize control gate such as RSC1. The incoming register allotter has been illustrated as comprising ten groups of equipment and is thus capable of allotting ten incoming registers for use in turn.

When the circuit is first placed in operation, reset key 2101 is momentarily operated to the position wherein minus twelve volt potential is applied to the emitter electrode of transistor 2102 in distributor stage RS1 and to the emitter electrode of a transistor corresponding to transistor 2103 in each of the remaining distributor stages. Thus, responsive to the momentary operation of reset key 2101, the first distributor stage is set to the condition wherein transistor 2103 is conductive and transistor 2102 is non-conductive, and the remaining distributor stages are each set to the condition wherein transistor 2102 is conductive and transistor 2103 is non-conductive. The base of amplifier transistor 2104 in the first group of equipment is returned to the collector of transistor 2103 in the first distributor stage and since transistor 2103 is conductive, the ground potential at its collector holds transistor 2104 non-conductive. The collector of transistor 2104 thus stands at minus twelve volt potential and said minus twelve volt potential is applied to the anode terminal of diode 2105, which with diode 2106, forms an "and" gate for negative signals. If it is assumed that the first incoming register is not busy handling a call, the anode terminal of diode 2106 is also returned to minus twelve volt potential in the first incoming register over the individual register free marking conductor RFM1. Thus, with both inputs to the "and" gate negative, the output of the "and" gate is negative, and transistor 2107 is conductive.

When transistor 2107 is conductive, the ground potential appearing at its collector is applied through diode 2108 to the register seize conductor RS1 to enable the first incoming register to read in time position channel and highway information applied to the bus bars by the channel allotter when a calling line terminating unit is enabled by the calling unit finder, all as previously described. Ground potential appearing at the collector of transistor 2107 is also coupled through diode 2109 to the register free conductor RF which extends to the calling unit finder circuit. As previously described, the calling unit finder circuit functions to transmit enabling signals to each line terminating unit in turn only when an incoming register has been assigned for use as signified by ground potential on conductor RF. It is to be noted that conductor RF is connected to stages RSC1–RSC10 and that ground potential can be applied to said conductor by any one of the stages. Ground potential appearing at the collector of transistor 2107 is also coupled through diode 2110 to the base of transistor 2111. Ground potential applied to the base of transistor 2111 through a diode corresponding to 2110 in any one of the register seize control stages is effective to prevent transistor 2111 from being rendered conductive by the positive clock pulses appearing on conductor 20 kc. trigger.

The incoming register allotter remains in the just described condition until the first incoming register is controlled to read in time position and highway information by a calling unit, as previously described. At that time, conductor RFM1 returns to ground potential and transistor 2107 becomes non-conductive to remove ground potential from conductors RS1 and RF and from the base of drive transistor 2111. The next occurring positive-going clock pulse on conductor 20 kc. trigger renders transistor 2111 conductive and the resulting ground potential appearing at its collector is applied to the anode terminal of a diode corresponding to 2112 in each distributor stage. The distributor in the incoming register allotter, which is identical to the previously described distributor in control counter 25, is controlled by the positive pulse to advance to the setting wherein the transistor corresponding to 2103 in the second stage is conductive and the transistor corresponding to 2103 in all of the other distributor stages is non-conductive. If the second incoming register is not marked as busy by ground potential on conductor RFM2, the transistor corresponding to 2107 in stage RSC2 becomes conductive and ground potential is applied to conductors RS2 and RF and to the base of transistor 2111. If the second incoming register is busy, the transistor corresponding to 2107 in RSC2 remains non-conductive and transistor 2111 becomes conductive during the next occurring 20 kc. clock pulse to advance the distributor to the third stage. If all of the incoming registers are busy, the distributor is controlled to advance at a 20 kc. rate and the calling unit finder circuit is prevented from transmitting enabling signals to the line terminating units since ground potential is not applied to conductor RF by the incoming register allotter.

When a distributor stage, such as RS1, is in the condition wherein transistor 2103 is non-conductive and transistor 2102 is conductive, the amplifier transistor corresponding to 2104 is held conductive by the negative potential appearing at the collector of the transistor corresponding to 2103. When the amplifier transistor corresponding to 2104 is conductive, ground potential is coupled through the diode corresponding to 2105 so that the control transistor corresponding to 2107 is prevented from becoming conductive regardless of the condition of the individual register free marking conductor, such as RFM1.

*Register finder 32*

Figure 22:
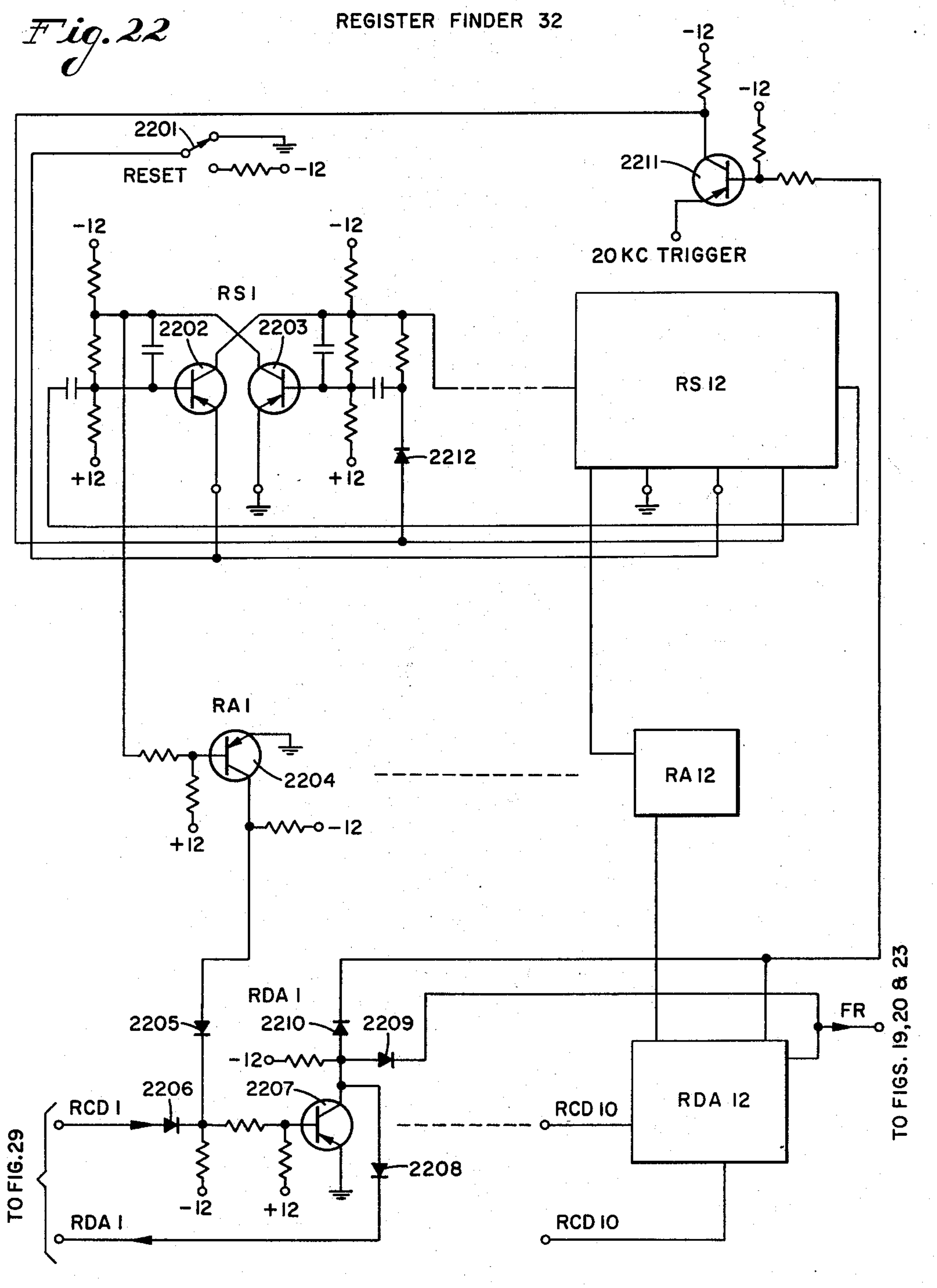
Fig. 22 shows circuit details of an incoming register finder for use in a long distance switching center.

The register finder, which is shown in Fig. 22, comprises a group of equipment for each incoming register and for each key sender register provided in the long distance switching center. Each group of equipment comprises a ring counter distributor stage such as RS1, an amplifier such as RA1, and a register demand answer gate such as RDA1. The register finder has been illustrated as comprising twelve groups of equipment and is thus capable of serving twelve registers.

When the circuit is first placed in operation, reset key 2201 is momentarily operated to a position wherein minus twelve volt potential is applied to the emitter electrode of transistor 2202 in distributor stage RS1 and to the emitter electrode of a transistor corresponding to 2203 in each of the other distributor stages. Thus, responsive to the momentary operation of the reset key 2201, transistor 2203 in the first distributor stage is made conductive and transistor 2202 in each of the other distributor stages is made conductive. The base of amplifier transistor 2204 in the first group of equipment is returned to the collector of transistor 2203 in the first distributor stage and since 2203 is conductive, the ground potential at its collector holds transistor 2204 non-conductive. The minus twelve volt potential appearing at the collector of non-conducting transistor 2204 is applied to the anode terminal of diode 2205, which with diode 2206, forms an "and" gate for negative signals. The register connect demand conductor RCD1, which is connected to the anode of diode 2206, is normally returned to ground potential in the first register and drops to minus twelve volt potential only when the first register has a digit stored therein and is in readiness to read out channel and highway information to the bus bars and digit marking information to the digit marking conductors.

If it is assumed that the first register is applying minus twelve volt potential to conductor RCD1 at the time that the first stage of the distributor is activated, the output signal from the gate comprising diodes 2205 and 2206 is negative and transistor 2207 becomes conductive. When transistor 2207 is conductive, the ground potential appearing at its collector is coupled through diode 2208 to the register demand answer conductor RDA1 to enable the first register to read out channel and highway information to the bus bars and to read out digit marking information to the digit marking conductors. Ground potential at the collector of transistor 2207 is also coupled through diode 2209 to conductor FR, which extends to the channel allotter, the route selector, and to the calling unit finder circuit. As previously described, ground potential on conductor FR controls the channel allotter to discontinue the application of marking signals to the channel and highway bus bars, controls the route selector to initiate the measurement of an all trunks busy period, and controls the calling unit finder circuit to discontinue the transmittal of enabling signals to the terminating units so that a calling terminating unit cannot seize the channel identified on the bus bars by the first register. Ground potential at the collector of conducting transistor 2207 is also coupled through diode 2210 to the base of drive transistor 2211. Ground potential applied to the base of transistor 2211 through a diode corresponding to 2210 in any one of the register demand answer stages is effective to prevent transistor 2211 from becoming conductive if a positive-going clock pulse appears on conductor 20 kc. trigger during the interval in which transistor 2207 is conductive.

The register finder remains in the just described condition until the route selector seizes a terminating unit in the group of terminating units identified by the marking applied to the digit marking conductors by the first register, as previously described. At that time, conductor RCD1 returns to ground potential and transistor 2207 becomes non-conductive to remove ground from conductors RDA1 and FR and from the base of transistor 2211. The next occurring positive-going clock pulse on conductor 20 kc. trigger renders transistor 2211 conductive and the resulting ground potential appearing at its collector is applied to the anode terminal of a diode corresponding to 2212 in each distributor stage. The distributor in the register finder, which is identical to the previously described distributor in control counter 25, is controlled by the positive-going pulse to advance to the setting wherein the transistor corresponding to 2203 in the second distributor stage is conductive and the transistor corresponding to 2203 in all of the other distributor stages is non-conductive. If the second register is in readiness to read out, the transistor corresponding to 2207 in RDA2 becomes conductive and ground potential is applied to conductors RDA2 and FR and to the base of transistor 2211. If the second register is not in readiness to read out and ground potential therefore appears on conductor RCD1, the transistor corresponding to 2207 in RDA2 remains non-conductive and drive transistor 2211 becomes conductive during the next occurring 20 kc. clock pulse to advance the distributor so that the third stage is activated. If none of the registers are demanding attention for read out purposes, the distributor is controlled to continuously advance at a 20 kc. rate.

When a distributor stage, such as RS1, is in the condition wherein transistor 2202 is conductive and transistor 2203 is non-conductive, amplifier transistor 2204 is held conductive by the negative potential appearing at the collector of transistor 2203. When transistor 2204 is conductive, ground potential is coupled through diode 2205 so that transistor 2207 is prevented from becoming conductive regardless of the condition of the individual connect demand conductor, such as RCD1.

*Channel allotter 33*

The channel allotter, which is shown in detail in Figs. 23–25, comprises a highway ring counter distributor and a channel ring counter distributor. As illustrated, the highway distributor comprises two stages, namely, stages HDS1 and HDS2, and the channel distributor comprises ten stages, namely, stages CDS1–CDS10. More highway networks and more channels per highway network can be served by the channel allotter by the addition of stages to the highway and channel distributors, respectively. The channel allotter also comprises an individual gate for each time position on each highway. Gates 1—1 through 1—10 correspond to the ten time position channels on the first highway, and gates 2—1 through 2—10 correspond to the ten time position channels on highway 2. Similarly, an individual flip-flop circuit is provided for each time position on each highway for the purpose of recording the idle or busy condition of that time position. Thus, flip-flops busy 1—1 through busy 1—10 correspond to the time position channels on highway 1 and flip-flops busy 2—1 through busy 2—10 individually correspond to the ten time position channels on highway 2.

When the circuit is first placed in operation, reset key 2301 is momentarily operated to the position in which minus twelve volt potential is applied to the emitter electrode of transistor 2302 in the first channel distributor stage CDS1 and to the emitter electrode of a transistor corresponding to 2302 in the first highway distributor stage HDS1. The minus twelve volt potential is also applied to the emitter electrode of a transistor corresponding to 2303 in each of the channel distributor stages CDS2–CDS10 and to the emitter electrode of a transistor corresponding to 2303 in the second highway distributor stage HDS2. Thus, responsive to the momentary operation of reset key 2301, the first channel stage CDS1 and the first highway distributor stage HDS1 are set in the condition in which transistor 2303 is conductive and the remaining channel and highway distributor stages are set in the condition in which transistor 2302 is conductive.

Since the transistors 2302 in stages HDS1 and CDS1 are non-conductive, the output signals appearing at the emitter electrodes of emitter follower transistors 2304 and 2305 have a negative potential value. The negative potential signal appearing at the emitter of transistor 2304 is applied to the base of the highway 1 gating transistor 2401 and since transistor 2325 is non-conductive at this time, as will be described later, transistor 2401 is made conductive to apply ground potential to conductor HW1 of the highway bus bar HWBB. The negative potential signal at the emitter of transistor 2304 is also applied to the anode terminal of a diode corresponding to 2402 in each of the gate circuits gate 1—1 through gate 1—10, inclusive. The negative potential signal at the emitter of transistor 2304 is also applied to the anode terminal of diode 2501. The negative potential signal at the emitter of transistor 2305 is coupled through resistor 2403 to the cathode terminals of diodes 2402 and 2404 in gate 1—1 and through a corresponding resistor to the cathode terminals of corresponding diodes in gate 2—1. If it be assumed that time position 1 channel on highway 1 is not in use on another call and that busy 1—1 flip-flip transistors 2502 and 2503 are therefore non-conductive, the anode terminal of diode 2404 in gate 1—1 is also returned to a negative potential. Since the anode terminals of diodes 2402 and 2404 are both returned to a negative potential, the negative potential at the emitter of transistor 2305 and coupled through resistor 2403 is further coupled through resistor 2405 to the base of transistor 2406 in gate 1—1 to render transistor 2406 conductive.

When transistor 2406 is conductive, ground potential at its collector is coupled through diode 2407 to render normally conductive transistor 2408 non-conductive. The negative potential signal at the emitter of transistor 2305 is also coupled to the base of time position 1 gate transistor 2409 and since the anode terminal of diode 2410 is also returned to a negative potential at the collector of non-conducting transistor 2408, transistor 2409 becomes conductive to apply ground potential to the time position 1 bus bar conductor TPM1. Thus, time position 1 on highway network 1 is marked on the highway and time position marking bus bars HWBB and TPBB, respectively, as the time position to be assigned to the next call initiated in the long distance switching center.

The negative potential appearing at the collector of non-conducting transistor 2408 is also coupled through diode 2504 to the base electrodes of transistors 2506 and 2507 to render those transistors conductive. The resulting ground potential at the collector of conducting transistor 2506 is applied to conductor TPF and serves as an indication to the calling unit finder circuit that a time position channel is being marked on the bus bars by the channel allotter. The ground potential appearing at the collector of conducting transistor 2507 serves to prevent the pulse drive transistor 2508 from becoming conductive when the next occurring 20 kc. clock pulse appears on conductor 20 kc. trigger. It will be noted that the negative potential at the collector of non-conducting transistor 2408 is also applied to the anode terminal of diode 2509 but the marking 1 transistor 2510 is prevented from becoming conductive at this time since its emitter is returned to a negative potential at the emitter of emitter follower transistor 2518. The emitter of transistor 2518 stands at a negative potential at this time since the time position read in conductor TPR1, which extends to all of the incoming registers, stands at minus twelve volt potential at all times except when a time position is being read in by one of the registers.

The channel allotter remains in the just described condition in which ground potential is applied to conductors HW1 and TMP1 of the highway bus bars HWBB and the time position bus bars TPBB, respectively, until such time as the time position 1 channel on highway 1 is seized by a calling unit and the assigned register. The remaining highway and time position marking conductors stand at minus twelve volt potential at this time. It can be seen that highway 2 gating transistor 2411 is biased for non-conduction and its collector stands at minus twelve volt potential since the transistor corresponding to 2302 in the second highway distributor stage HDS2 is conductive and the emitter electrode of emitter follower transistor 2306 therefore stands at ground potential. The remaining time position gating transistors, such as time position 10 gating transistor 2412, are biased for non-conduction and their collector electrodes stand at minus twelve volt potential since the transistor corresponding to 2413 individually associated with each gate is conductive. It can be seen that when transistor 2413 is conductive, the ground potential appearing at its collector is coupled through diode 2414 to hold transistor 2412 non-conductive. In addition to the above, the base electrodes of the gating transistors, such as 2412, are also returned to ground potential at the emitters of the emitter follower transistors corresponding to 2326.

When the channel and highway identifying information placed on the bus bars by the channel allotter is read in by a calling line terminating unit and the assigned one of the registers, ground potential is momentarily applied to conductor TPRI by the assigned register and the emitter electrode of transistor 2518 rises to ground potential. When the emitter electrode of transistor 2518 rises to ground potential, each of the marking transistors M1–M10 is enabled for conduction. Marking transistor 2510 becomes conductive since the anode terminal of diode 2509 is returned to minus twelve volt potential at the collector of non-conducting transistor 2408, as previously described. The other marking transistors remain non-conductive since the anode terminal of the diodes corresponding to 2505 are returned to ground potential at the collectors of conducting transistors corresponding to 2413. Ground potential appearing at the collector of conducting transistor 2510 is applied to the anode terminals of diodes 2511 and 2512 in the busy 1—1 and busy 2—1 circuits, respectively. The busy 2—1 flip-flip circuit is not triggered since the anode terminal of diode 2513 is returned to ground potential at the emitter of transistor 2306. Since the anode terminal of diode 2501 is returned to negative potential at the emitter of transistor 2304, the positive-going potential swing at the collector of transistor 2510 is coupled through diode 2511, capacitor 2514, and diode 2515 to set the busy 1—1 flip-flip circuit to the condition wherein transistors 2502 and 2503 are conductive.

When transistor 2503 in the flip-flip circuit busy 1—1 becomes conductive, ground potential is applied to the anode terminal of diode 2404 and transistor 2406 is thereby made non-conductive, transistor 2408 becomes conductive, and transistor 2409 is rendered non-conductive to remove ground potential from time position marking conductor TPM1. When transistor 2408 becomes conductive and its collector rises to ground potential, transistors 2510, 2506, and 2507 become non-conductive. When transistor 2507 becomes non-conductive and its collector drops to minus twelve volt potential, pulse drive transistor 2508 is enabled for conduction during the next occurring positive-going pulse on conductor 20 kc. trigger. The positive-going pulse at the collector of transistor 2508 is applied to the anode terminal of a diode corresponding to 2307 in each of the channel distributor stages. The channel distributor, which is identical to the previously described distributor in control counter 25, is controlled by the positive-going pulse to advance to the setting wherein the second stage CDS2 is activated. If the transistors of the busy 1—2 flip-flip circuit are not conductive, thus signifying that time position 2 on highway 1 is idle, the gate 1—2 transistor corresponding to 2406 becomes conductive and ground potential is applied to bus bar conductor TPM2. However, if the transistors in busy 1—2 flip-flip circuit are conductive, thus signifying that time position 2 on highway 1 is busy, the gate 1—2 transistor corresponding to 2406 is prevented from becoming conductive by ground potential coupled through the diode corresponding to 2404 and the pulse drive transistor 2508 is controlled by the next occurring clock pulse on conductor 20 kc. trigger to advance the channel distributor to the setting wherein the third stage CDS3 is activated. As the marked channels are taken into use, the channel distributor is advanced from stage to stage under control of pulse drive transistor 2508. Each time that the first stage CDS1 is activated and transistor 2303 in that stage becomes conductive, the positive-going potential swing at the collector of that transistor is utilized to advance the highway distributor.

As previously described, the busy flip-flip circuit individually corresponding to a particular one of the channels on one of the highways is triggered to the condition wherein the transistors forming that flip-flip circuit are conductive when that channel is seized. It will be recalled that a highway monitor circuit is provided for each highway network in the long distance switching center and each monitor circuit functions to continuously scan the time positions on its associated highway network for release and release acknowledge signals. It will also be recalled that when a release and a release acknowledge signal have been detected by the highway monitor circuit in a particular time position channel, the highway monitor circuit functions to apply a negative-going one-second pulse to the individual time position busy conductor corresponding to that channel. It can be seen that when the negative-going pulse is applied to conductor TPB1 by the highway monitor circuit associated with the first transmission highway network, the pulse is differentiated by capacitor 2516 and the positive pulse corresponding to the trailing edge of said one-second pulse is coupled through diode 2517 to the base of transistor 2503 and serves to render transistors 2502 and 2503 of the busy 1—1 flip-flip circuit non-conductive. When transistor 2503 becomes non-conductive, a negative potential is again applied to the anode terminal of diode 2404 in gate 1—1 to thus mark time position 1 on highway 1 idle so that time position can be assigned for use again when the highway and channel distributors advance to the setting wherein stages HDS1 and CDS1 are activated.

It will be recalled from the general description that the channel allotter is controlled to discontinue the application of channel and highway marking signals to the bus bar conductors whenever a register is being controlled to read out channel and highway marking signals to those bus bars. When the register finder seizes an incoming or key sender register for the purpose of controlling that register to read out, ground potential is applied to conductor FR by the register finder. The positive potential swing on conductor FR is coupled through capacitor 2308 and diode 2309 and serves to operate the flip-flop circuit comprising transistors 2310 and 2311 to the condition wherein 2311 is conductive and 2310 is non-conductive. When transistor 2310 becomes non-conductive, the emitter electrode of emitter follower transistor 2312 goes negative and transistor 2325 becomes conductive. When transistor 2325 is conductive, the ground potential appearing at its collector is coupled through diodes 2313–2316 to the base electrodes of transistors 2401, 2411, 2409, and 2412, respectively, and through corresponding diodes to the base electrodes of the time position 2 gating-time position 9 gating transistors. Thus, all of the above-mentioned gating transistors are prevented from becoming conductive regardless of the setting of the highway and channel distributors and the channel allotter is effectively disconnected from the highway and time position bus bars HWBB and TPBB, respectively.

When a line terminating unit is seized by the route selector and ground potential is applied by the route selector to conductor UF, the ground potential is coupled through diode 2317 so that the output of the "or" gate for positive signals formed by diodes 2317 and 2318 goes positive. The positive-going potential at the output of the "or" gate is coupled through capacitor 2319 and serves to trigger the flip-flop circuit comprising transistors 2320 and 2321 to the condition in which 2321 is conductive and 2320 is non-conductive. When transistor 2321 becomes conductive, the upper terminal of capacitor 2322 is returned to ground potential. The next occurring positive-going clock pulse on conductor 20 kc. trigger is coupled through capacitor 2322 and diode 2323 to reset the flip-flop circuit comprising transistors 2310 and 2311 to the condition wherein transistor 2310 is again conductive. When transistor 2310 becomes conductive, the output signal from emitter follower transistor 2312 goes to ground potential, transistor 2325 becomes non-conductive, and the channel allotter is again effectively connected to the highway and channel bus bars. The positive potential swing at the emitter of emitter follower transistor 2312 is also coupled through capacitor 2324 to reset the flip-flop circuit comprising transistors 2320 and 2321 to the condition wherein transistor 2320 is conductive.

In the event that the route selector does not find an idle line terminating unit in the group of units marked by the register being read out, the route selector functions to apply ground potential to the all trunks busy conductor ATB. The ground potential appearing on conductor ATB is coupled through diode 2318 and is utilized to reset the flip-flop circuit comprising transistors 2310 and 2311 in the exact same manner as just described.

*Incoming register 34*

The purpose of the incoming register, which is shown in Figs. 26–33, is to register the digital information received from a calling line terminating unit, to then control the route selector to select an idle line terminating unit in the group of units corresponding to the registered digit information, and to then control the selected line terminating unit to seize the time position channel seized by the calling line terminating unit and the register. The register then releases from the connection and is free to handle another call.

Before proceeding to describe the operation of the incoming register in detail, it is believed expedient to the understanding of the operation of the system to tabulate the various frequencies used for the transmission of supervisory and dialing information in the illustrated system. The frequencies assigned for the various purposes are as follows:

| Digits (received by inc. reg.): | Digit acknowledgment |
|---|---|
| 1—VW | YZ |
| 2—VX | XZ |
| 3—WX | WZ |
| 4—VY | VZ |
| 5—WY | XY |
| 6—XY | WY |
| 7—VZ | VY |
| 8—WZ | WX |
| 9—XZ | VX |
| 0—YZ | VW |
| Supervisory: | Acknowledgment |
| Seizure X | X |
| Release UV | UZ |
| Cancel UY | None |

In the tested embodiment of the invention, the various letter designated frequencies have the following values: U=900 c.p.s., V=1100 c.p.s., W=1300 c.p.s., X=1500 c.p.s., Y=1700 c.p.s., and Z=1900 c.p.s.

Figure 28:
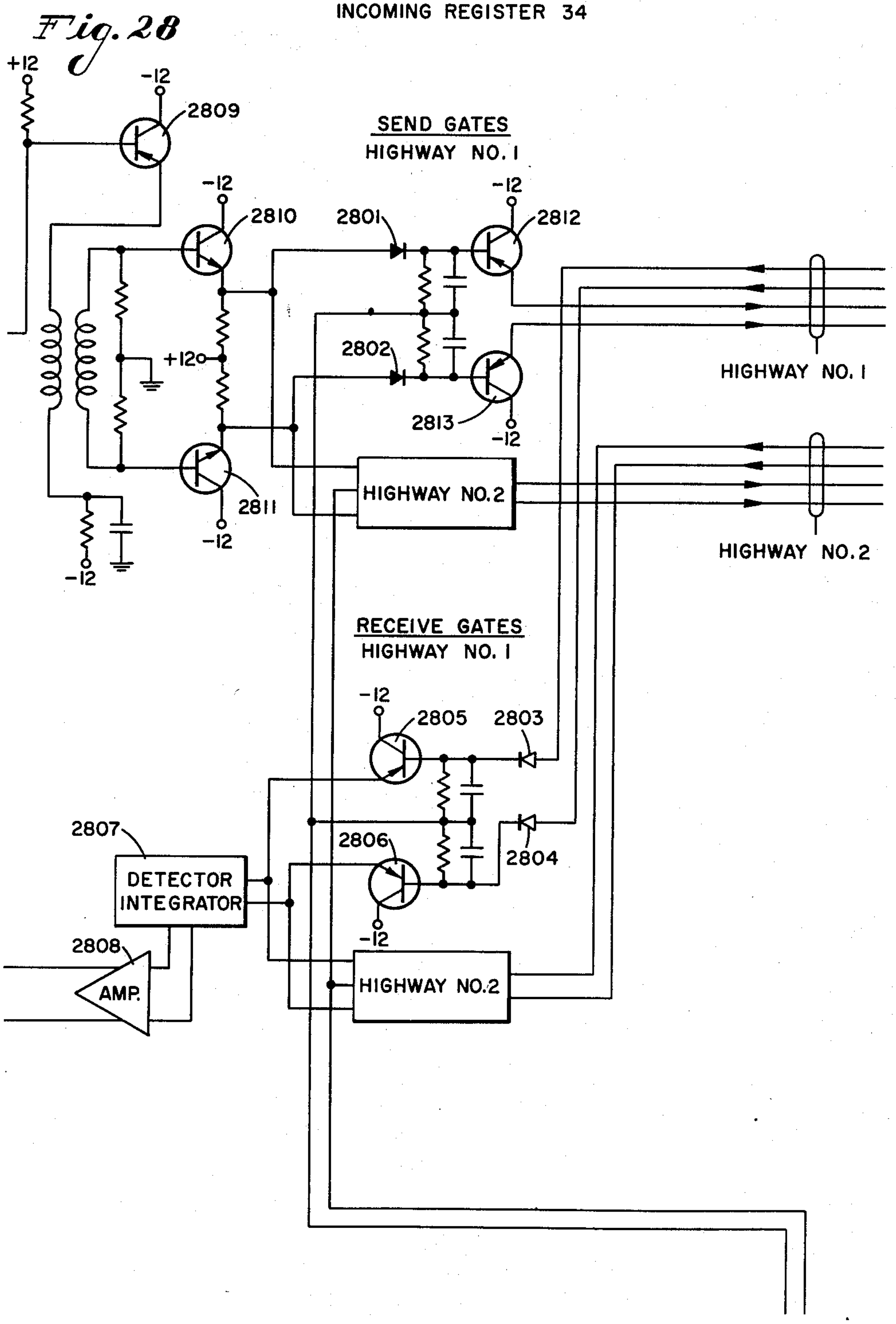
Figure 29:
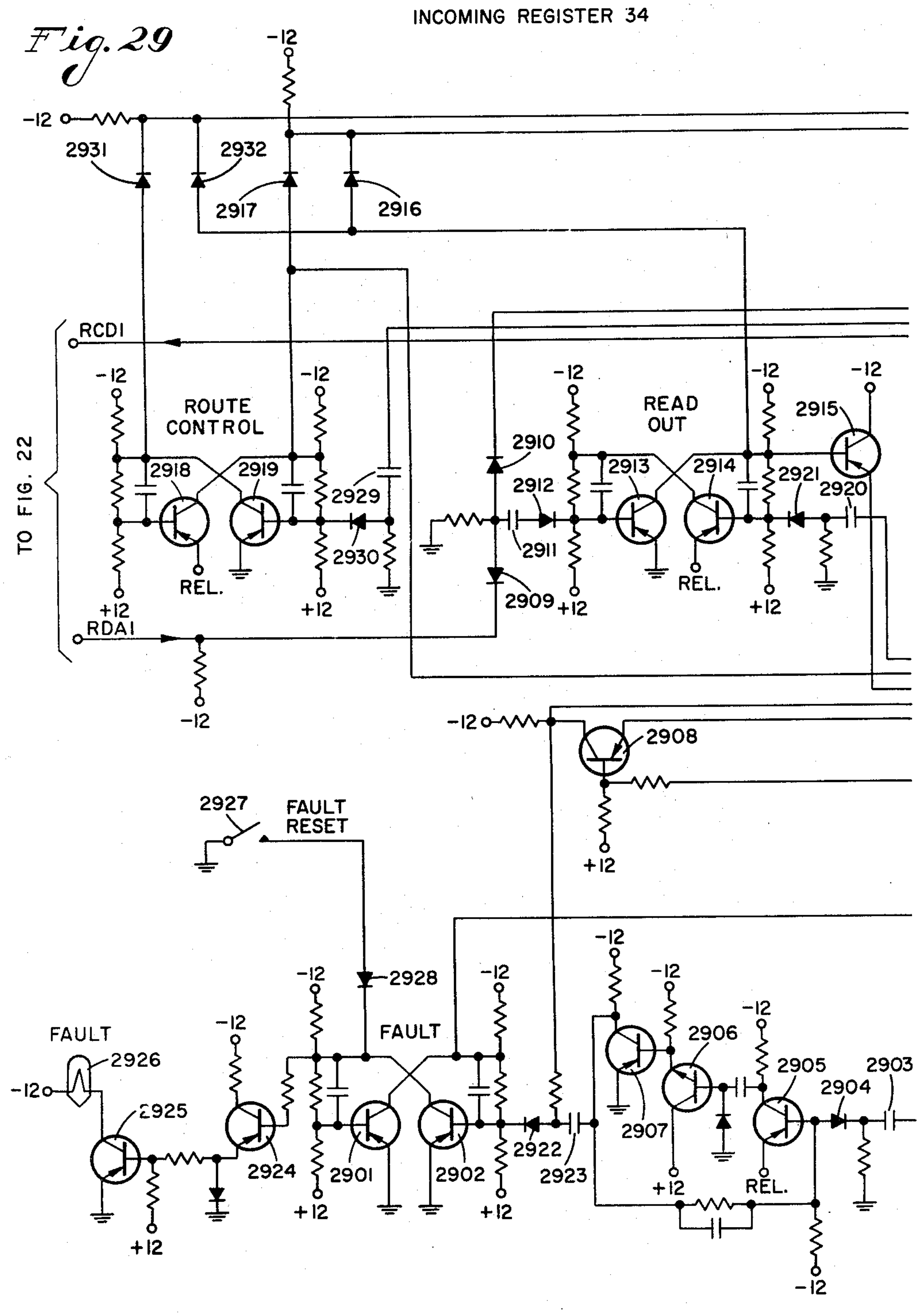
Figure 30:
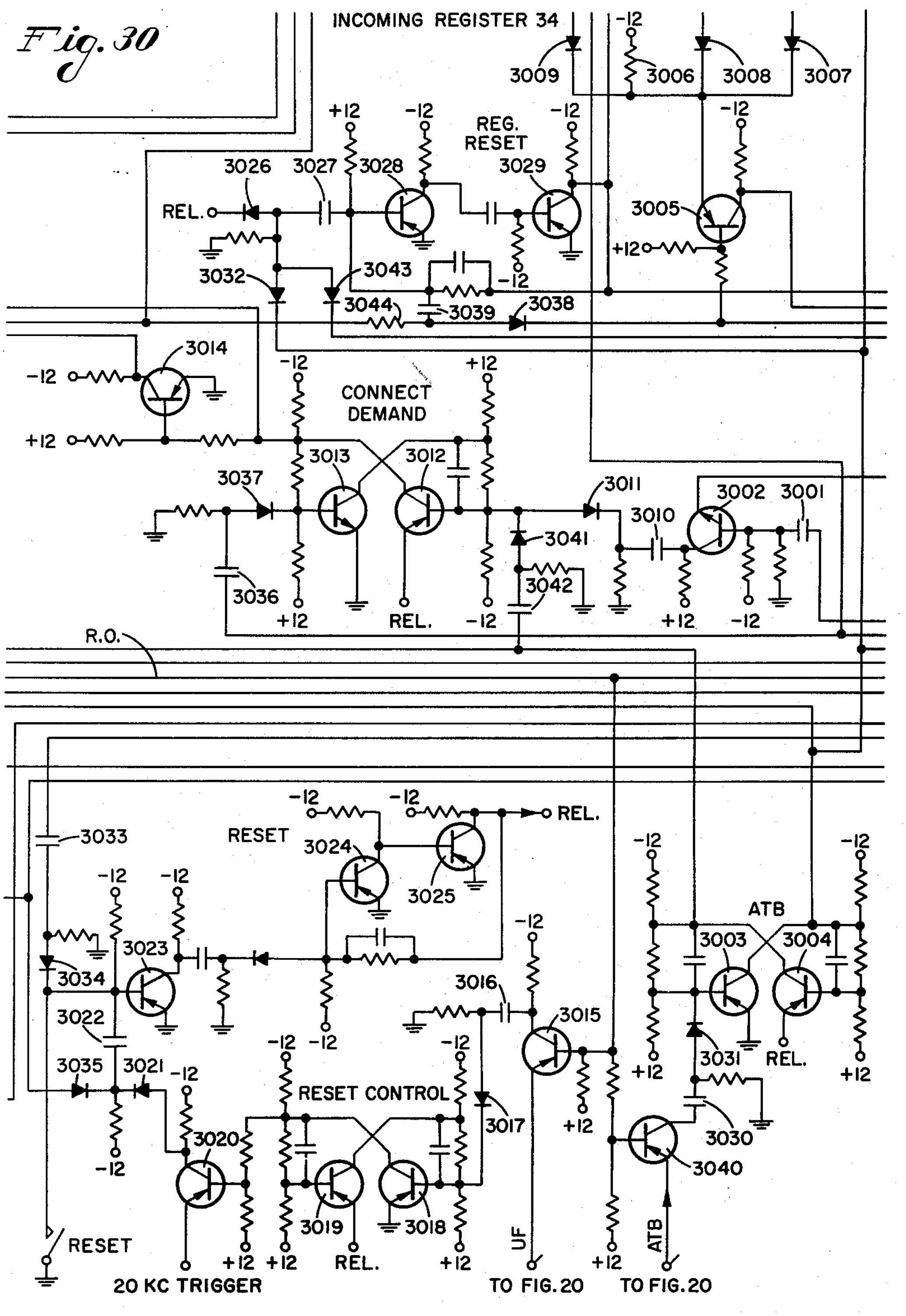
Figure 31:
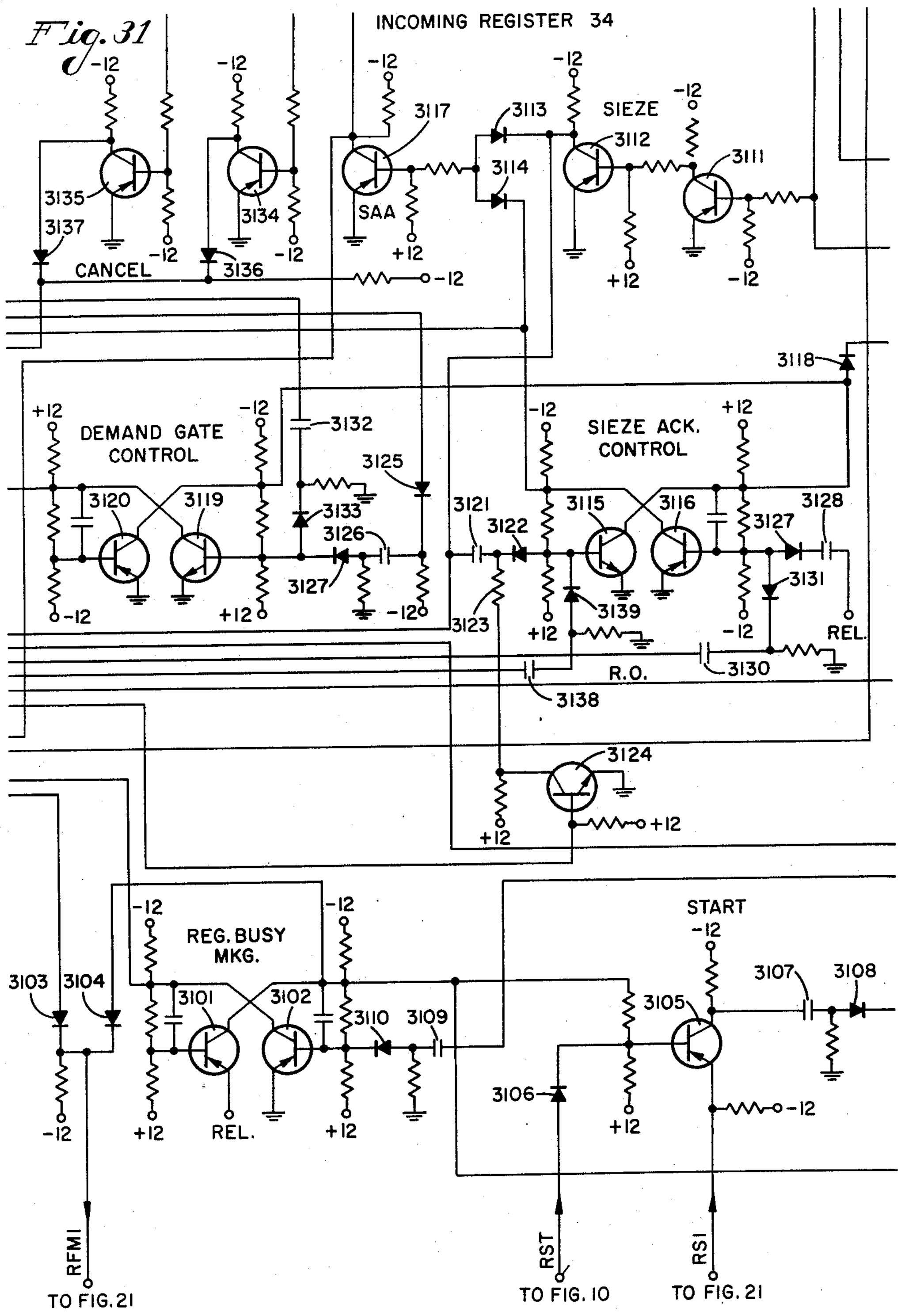
Figure 32:
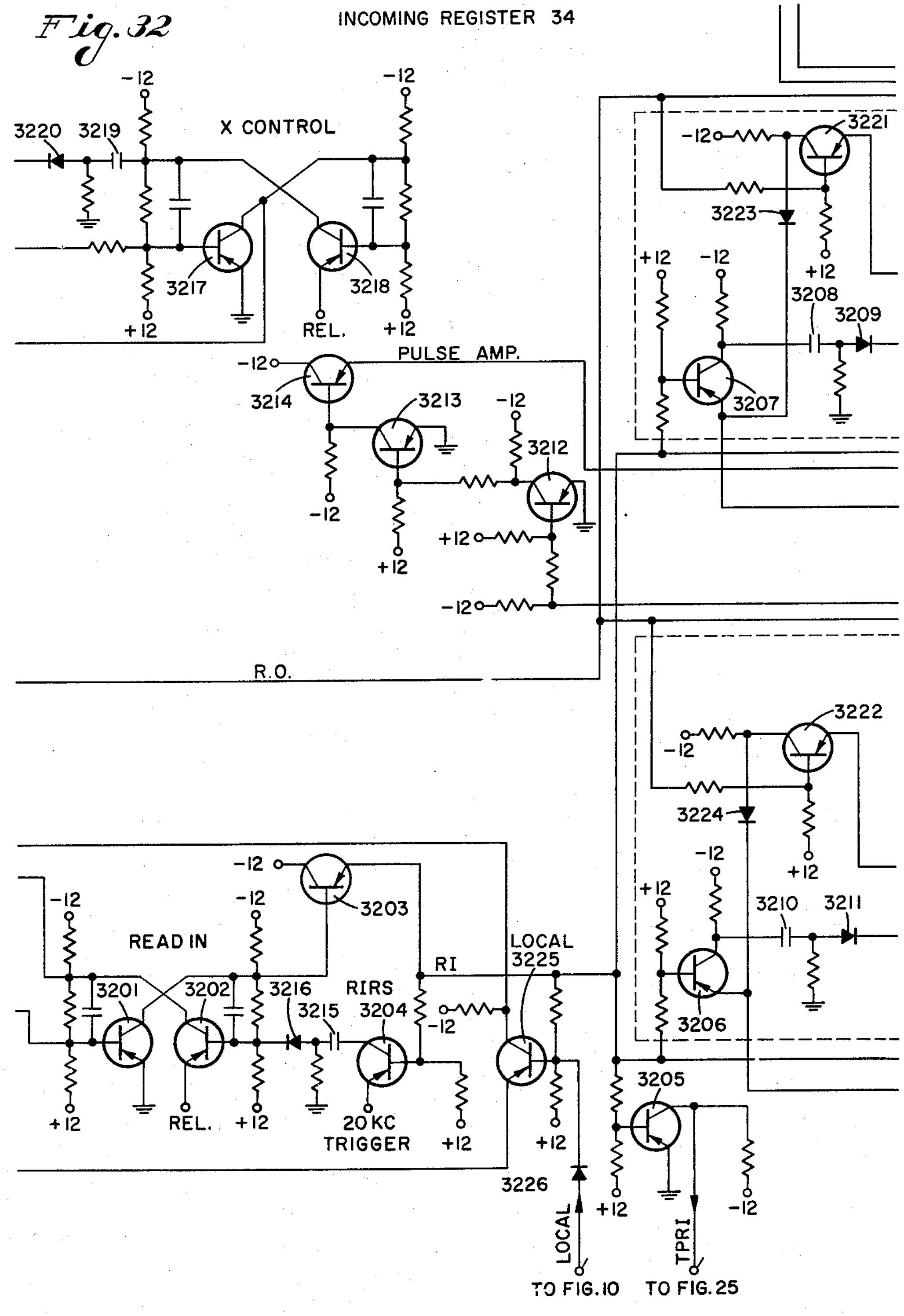
Figure 33:
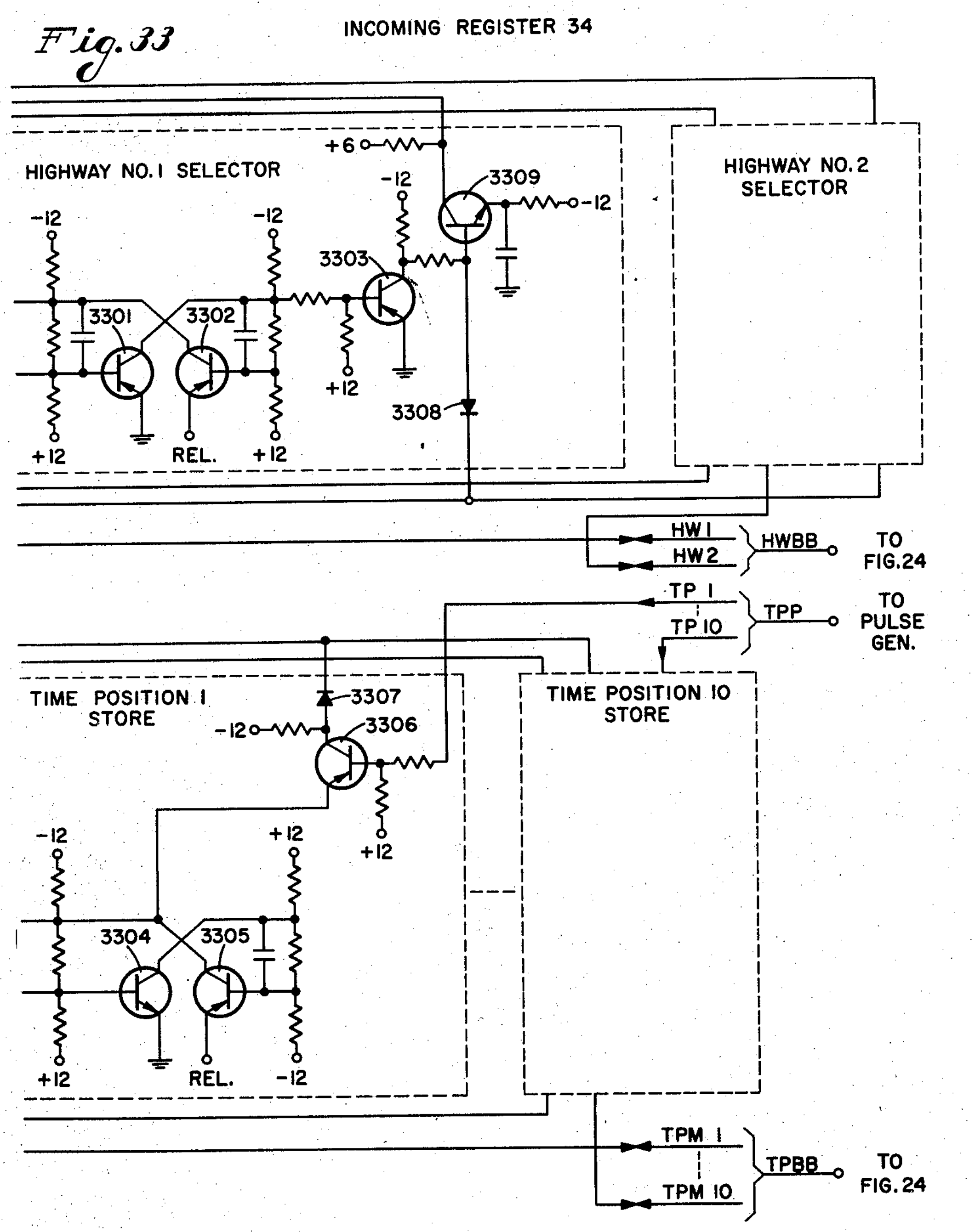

In the reset condition of the incoming register, the send and receive gates of Fig. 28 are closed, each flip-flop circuit in which the emitter of one transistor is returned to reset conductor RS1 is in the condition wherein the other transistor in that flip-flop is conductive, the seize acknowledge control flip-flip circuit of Fig. 31 is in the condition in which both transistors are conductive, the demand gate control flip-flip circuit of Fig. 31 is in the condition in which both transistors are non-conductive, the flip-flip circuit in each of the ten time position store circuits (Fig. 33) is in the condition in which both transistors are non-conductive, and the fault control flip-flop circuit comprising transistors 2901 and 2902 is in the condition wherein transistor 2902 is conductive. Under these conditions, the anode terminals of diodes 3103 and 3104, which form an "and" gate for negative signals, are returned to negative potential and register free marking conductor RFM1, which extends to the incoming register allotter, is marked at a negative potential to indicate to the incoming register allotter that the illustrated incoming register is in readiness to handle a call. The anode terminal of diode 3103 is returned to negative potential at the collector of non-conducting transistor 2901 in the fault control flip-flop circuit, and the anode terminal of diode 3104 is returned to the collector of non-conducting transistor 3101 in the register busy marking flip-flop circuit. When the illustrated incoming register is assigned for use by the incoming register allotter, ground potential is applied to the register seize conductor RS1 and start transistor 3105 is enabled for conduction.

To illustrate the operation of the register, first assume that the calling line terminating unit found by the calling unit finder circuit terminates a trunk line extending to another long distance switching center. When the calling line terminating unit is enabled by the calling unit finder circuit, the calling unit functions to apply negative potential to register start conductor RST, which is common to all of the incoming register circuits. Thus, the base of transistor 3105 goes negative and since its emitter is returned to ground potential on conductor RS1, transistor 3105 is rendered conductive. The resulting positive-going potential swing at the collector of transistor 3105 is coupled through capacitor 3107 and diode 3108 to the base of transistor 3201 to set the read in flip-flop circuit to the condition in which transistor 3202 is conductive and transistor 3201 is non-conductive. The positive-going potential swing at the collector of transistor 3202 is coupled through capacitor 3109 and diode 3110 to set the register busy marking flip-flop circuit to the condition in which transistor 3101 is conductive. When transistor 3101 becomes conductive, ground potential at its collector is coupled through diode 3104 to conductor RFM1 and the incoming register allotter is thereby enabled to assign the next idle incoming register for use when the next 20 kc. clock pulse is received.

Returning to the consideration of the read in flip-flop circuit, it can be seen that when transistor 3201 becomes non-conductive, and its collector falls to a negative potential, a negative potential is applied to read in conductor RI at the emitter electrode of emitter follower transistor 3203. The negative potential on conductor RI is applied to the base of read in reset transistor 3204 to enable said transistor to become conductive when the next occurring positive-going clock pulse is received on conductor 20 kc. trigger. It will be recalled that the calling unit functions to transmit the start signal to register start conductor RST at the termination of a ten microsecond clock pulse. Therefore, another clock pulse does not occur on conductor 20 kc. trigger until approximately forty microseconds after the base of transistor 3204 is made negative. The negative potential on conductor RI is also applied to the base of transistor 3205 to render transistor 3205 conductive. When transistor 3205 becomes conductive, ground potential is applied to time position read in conductor TPRI to enable the channel allotter to mark the next idle time position channel on the bus bars when the next 20 kc. clock pulse is received.

The negative potential on conductor RI is also applied to the base of a transistor corresponding to 3206 in each of the ten time position store circuits and to the base of a transistor corresponding to 3207 in both of the highway selectors. If it is assumed that the channel allotter is applying ground potential to highway bus bar conductor HW1 and to time position bus bar conductor TPM1, thus identifying time position channel 1 on highway 1, transistor 3207 in highway No. 1 selector and transistor 3206 in time position 1 store circuit are rendered conductive. When transistor 3207 becomes conductive, the positive-going potential swing at its collector is coupled through capacitor 3208 and diode 3209 to the base of transistor 3301 to thereby set the flip-flop circuit in the highway 1 selector to the condition wherein transistor 3302 is conductive and transistor 3301 is non-conductive. When transistor 3301 becomes non-conductive, transistor 3303 becomes conductive. When transistor 3206 in the time position 1 store circuit becomes conductive, the positive-going potential swing at its collector is coupled through capacitor 3210 and diode 3211 to the base of transistor 3304 and the flip-flip transistors 3304 and 3305 are thereby rendered conductive. When transistor 3305 becomes conductive and its collector rises to ground potential, transistor 3306 is enabled for conduction. Thus, the highway and channel identifying information is read into and stored in the highway selector and time position store circuits of the incoming register. It will be recalled that the same information is simultaneously read into and stored in corresponding circuits in the calling line terminating unit so that the incoming register and the calling line terminating unit have now effectively seized the channel assigned for use by the channel allotter.

The next occurring clock pulse on conductor 20 kc. trigger renders previously enabled read in reset transistor 3204 conductive and the positive potential swing at the collector of transistor 3204 is coupled through capacitor 3215 and diode 3216 to reset the read in flip-flop circuit to the condition wherein transistor 3201 is conductive and transistor 3202 is non-conductive. When transistor 3201 again becomes conductive, the emitter of emitter follower transistor 3203, and thus conductor RI, rise to ground potential and the highway selector and time position store circuits in the illustrated incoming register are prevented from reading in marking signals thereafter appearing on the highway and channel marking bus bars.

It can be seen that the base of transistor 3306 in the time position 1 store circuit is individually connected to conductor TP1, which, as previously explained, has negative-going recurring pulses in time position 1 applied thereto by a suitable time position pulse generator. Each negative pulse in time position 1 occurring on conductor TP1 renders transistor 3306 conductive and a positive pulse in time position 1 is coupled through diode 3307 to the base of normally conductive transistor 3212. It should be obvious that the transistor corresponding to 3306 in each of the other time position store circuits is not rendered conductive by the negative pulses occurring on its individually associated time pulse conductor since the emitter electrode of the transistor is returned to negative potential at the collector of the flip-flop transistor corresponding to 3505 in each of those circuits. Therefore, only positive-going pulses in time position 1 are applied to the base of transistor 3212. Each pulse renders transistor 3212 non-conductive, transistor 3213 conductive, and a corresponding positive-going pulse appears at the emitter of transistor 3214. The positive-going pulses in time position 1 appearing at the emitter of emitter follower transistor 3214 are applied to the cathode terminal of diode 3308 in highway 1 selector and to the cathode terminal of a diode corresponding to 3308 in the highway 2 selector circuit. In highway No. 1 selector, the positive-going pulses are coupled through diode 3308 to the base of transistor 3309 and each pulse renders transistor 3309 conductive. The positive-going pulses applied to the cathode terminal of the diode corresponding to 3308 in the highway 2 selector have no effect on the transistor corresponding to 3309 in that selector since the transistor corresponding to 3303 is non-conductive and the anode terminal of the diode corresponding to 3308 is therefore returned to negative potential and the diode is biased in the reverse direction.

The incoming register comprises a send gate and a receive gate for each highway transmission network, which gates are identical to the previously described gates in the line terminating unit. It can be seen that the cathode terminals of diodes 2801 and 2802 in the send gate associated with highway 1 and the cathode terminals of diodes 2803 and 2804 in the receive gate associated with highway 1 are returned to the collector of transistor 3309. When transistor 3309 is non-conductive, the plus six volt potential appearing at its collector is applied to the cathode terminals of the diodes and the diodes serve to block the transmission of any signals between the incoming register and the highway transmission network. However, when transistor 3309 becomes conductive in time position 1 in each frame of time position pulses and its collector potential falls to approximately minus six volt potential, the gating diodes are biased in the forward direction and pass signals between the highway and the incoming register. It will be recalled that the calling line terminating unit is controlled to transmit signal samples in time position 1 to the upper pair of highway conductors and to receive signal samples appearing on the lower pair of highway conductors. As shown, the incoming register is controlled to transmit signal samples to the lower pair of highway conductors and to receive signal samples from the upper pair of highway conductors. Therefore, signal samples in time position 1 transmitted to highway 1 by the calling line terminating unit are passed by diodes 2803 and 2804, amplified by emitter follower transistors 2805 and 2806, and detected and integrated by detector-integrator 2807. The detected signal is amplified by amplifier 2808 and applied to the input of multifrequency receiver 2701. Detector-integrator 2807 and amplifier 2808 may be identical to their previously described respective counterparts in the line terminating units. As previously stated, the multifrequency receivers used throughout the system may be of any conventional type and are equipped with suitable voice guard circuits so that an output is realized from each receiver only when the particular frequencies to which it is responsive are received.

The seize signal of frequency X, which activated the calling line terminating unit and which is still present on the receive conductors of the trunk line terminated by that unit, is detected by the multifrequency receiver 2701 and a positive potential appears on the X output conductor from receiver 2701. The positive potential on conductor X renders normally conductive seize transistor 3111 non-conductive and normally non-conductive seize transistor 3112 conductive. The cathode terminals of diodes 3113 and 3114, which form an "or" gate for negative signals, are returned to the collector of seize transistor 3112 and to the collector of the seize acknowledge control flip-flip circuit transistor 3116, respectively. As previously described, flip-flip transistors 3115 and 3116 are conductive at this time so that the cathode of diode 3114 is returned to ground. When transistor 3112 becomes conductive and its collector rises to ground potential, seize acknowledge amplifier transistor 3117 becomes non-conductive and its collector potential drops to minus twelve volts. Prior to the time when transistor 3117 is rendered non-conductive, the seize acknowledge signal frequency X amplified by emitter follower transistor 2702 is shunted to ground at the collector of transistor 3117 through diode 2703. When transistor 3117 becomes non-conductive, diode 2703 is biased in the reverse direction and frequency X appearing at the emitter of transistor 2702 is passed through diode 2704 and applied to the base of emitter follower transistor 2809. The amplified signal appearing at the output of transistor 2809 is further amplified by emitter follower transistors 2810 and 2811, sampled in time position 1 by diodes 2801 and 2802, and the resulting signal samples are amplified by emitter follower transistors 2812 and 2813 and transmitted over the lower pair of highway conductors to the calling unit. The negative potential swing at the collector of transistor 3117 is also coupled through capacitor 2903 and diode 2904 to the base of transistor 2905. Transistors 2905, 2906, and 2907 form a monostable circuit having a one-second delay and which is utilized to illuminate the fault lamp if the call is not processed within the measured period. The detailed operation of this portion of the circuit will be described later.

The positive potential appearing on output conductor X from receiver 2701, as a result of the detection of a seize signal by receiver 2701, is also applied to the base of transistor 3217 in the X control flip-flop circuit. The X control flip-flop circuit is prevented from being triggered to the condition wherein transistor 3218 is conductive because of the application of ground potential from the collector of conducting transistor 3115 in the seize acknowledge control flip-flip circuit through diode 3118 to the collector of transistor 3217 and thus to the base of cross-coupled transistor 3218. The X control flip-flop circuit is provided in the register to prevent the X stage of the digit register from being activated by a seize signal of frequency X, which same frequency is used as one of the compounded frequencies comprising digits "2," "3," "6," and "9."

The positive-going potential swing occurring at the collector of seize transistor 3112, as a result of the application of positive potential to the X output conductor of receiver 2701, is also coupled through capacitor 3001 to the base of transistor 3002 but transistor 3002 cannot become conductive at this time since its emitter electrode is returned to a positive potential at the collector of non-conducting transistor 3119 in the demand gate control flip-flip circuit. The positive-going pulse at the collector of transistor 3112 is also coupled through capacitor 3121 but is blocked by diode 3122 from the base of transistor 3115 in the seize acknowledge control flip-flip circuit. It might be well to mention at this time that resistor 3123, associated with the input to the seize acknowledge control flip-flip circuit, is returned to ground potential at this time at the collector of conducting transistor 3124. Transistor 3124 is held conductive by ground potential appearing at the collector of conducting transistor 2908 which, in turn, is held conductive by ground potential applied to its emitter from normally conductive transistor 3003 in the all trunks busy flip-flop circuit and by negative potential applied to its base from the collector of non-conductive transistor 3102 in the register busy marking flip-flop circuit. Thus, as long as the register is busy and an all trunks busy condition is not encountered by the route selector, resistor 3123 is returned to ground potential for a purpose which will be later described.

When the seize acknowledge signal transmitted by the illustrated incoming register is received by the originating key sender register, the key sender register terminates the transmission of a seize signal and the output conductor X from multifrequency receiver 2701 goes negative. When output conductor X goes negative, seize transistor 3111 becomes conductive and seize transistor 3112 becomes non-conductive. When transistor 3112 becomes non-conductive, seize acknowledge amplifier transistor 3117 becomes conductive from the negative potential at the collector of transistor 3112 coupled through diode 3113 and a seize acknowledge signal is no longer applied to the highway. The negative potential swing at the collector of transistor 3112 is coupled through capacitor 3121 and diode 3122 to the base of transistor 3115 and thereby sets the seize acknowledge control flip-flip circuit to the condition wherein transistors 3115 and 3116 are non-conductive. The resulting negative potential at the collector of transistor 3116 is coupled through diode 3114 to the base of seize acknowledge amplifier transistor 3117 for the purpose of assuring the continued conduction of that transistor regardless of the further operation of the seize transistor 3112. The negative potential at the collector of transistor 3116 is also coupled to the base of transistor 3005 but transistor 3005 does not become conductive at this time since its emitter is returned to minus twelve volt potential through resistor 3006. When transistor 3115 of the seize acknowledge control flip-flip circuit becomes non-conductive, direct ground is removed from the collector of transistor 3217 in the X control flip-flop circuit and that circuit is now enabled for operation.

To illustrate the operation of the X control flip-flop circuit, assume that the originating key sender register now transmits the voice frequency dialing signal comprising compounded frequencies V and X, which compounded signal corresponds to the digit "2." When the compounded frequencies V and X are applied to the input of multifrequency receiver 2701, positive potential is applied by receiver 2701 to output conductors V and X. The positive potential applied to conductor V is applied to the base electrode of transistor 2705 in the V register and the V register is thereby set to the condition wherein transistor 2706 is conductive and 2705 is non-conductive. The positive potential applied to conductor X, of course, triggers seize transistor 3111 non-conductive and seize transistor 3112 conductive but the output of transistor 3112 has no effect at this time. Seize acknowledge amplifier transistor 3117 remains conductive through diode 3114, as previously described. The positive potential on conductor X is also applied to the base of transistor 3217 and sets the X control flip-flop circuit to the condition in which transistor 3218 is conductive and transistor 3217 is non-conductive. When transistor 3218 becomes conductive, a positive pulse is coupled through capacitor 3219 and diode 3220 to the base of the transistor corresponding to 2705 in the X register 2601, and the X register is set to the condition wherein the transistor corresponding to 2706 is conductive and the transistor corresponding to 2705 is non-conductive. When transistor 2705 in the V register becomes non-conductive, negative potential is applied to the base electrodes of transistors corresponding to 2707 in digit "2" stage 2708 and in digit "4" stage 2709. When transistor 2706 in the V register becomes conductive, ground potential is applied to the emitter electrode of transistor 2707 in the digit "1" stage and to the emitter electrode of a transistor corresponding to 2707 in the digit "7" stage 2602. When the transistor corresponding to 2705 in the X register 2601 becomes non-conductive, negative potential is applied to the base electrodes of transistors corresponding to 2707 in the digit "6" stage 2603 and in the digit "9" stage 2604. When the transistor corresponding to 2706 in the X register 2601 becomes conductive, ground potential is applied to the emitter electrodes of transistors corresponding to 2707 in the digit "2" stage 2708 and in the digit "3" stage 2733. Thus, the transistor corresponding to 2707 in digit "2" stage 2708 is the only transistor having both negative potential applied to its base and ground potential applied to its emitter by the operation of the X and V register flip-flop circuits.

When the transistor corresponding to 2707 in the digit "2" stage 2708 becomes conductive, ground potential appearing at its collector is applied to the anode terminal of diode 2710 in the Z gate, to the anode terminal of a diode corresponding to 2710 in the X gate 2608, and to the emitter electrodes of transistors 2605 and 2606 in the digit "2" switch stage. Diode 2710 forms one input of a four-input "or" gate for positive signals and when ground potential is applied to its anode terminal, Z gate transistor 2711 is rendered non-conductive. It can be seen that prior to the time that transistor 2711 becomes non-conductive, Z frequency, which is amplified by emitter follower transistor 2712, is shunted to ground at the collector of transistor 2711 through diode 2713. When transistor 2711 becomes conductive, diode 2713 is biased for non-conduction and Z frequency is coupled through diode 2714 to the base of emitter follower transistor 2809. Similarly, when the transistor corresponding to 2711 in the X gate 2608 becomes conductive, X frequency, which is amplified by emitter follower transistor 2610, is coupled through diode 2609 to the base of emitter follower transistor 2809. Thus, signal samples of compounded frequencies X and Z are coupled through the highway No. 1 send gate to the lower pair of conductors and serve as a digit acknowledge signal to the originating key sender register.

When the transistor corresponding to 2706 in the X register 2601 becomes conductive, ground potential at its collector is applied to the anode terminal of diode 3007, which with diodes 3008 and 3009 forms an "or" gate for positive signals. The anode terminals of diodes 3008 and 3009 are coupled to the collector electrodes of the transistors corresponding to 2706 in the Y and Z registers, respectively. Since at least one of the frequencies X, Y, and Z is used in any one of the digits "2–0," inclusive, one of the inputs to the "or" gate goes to ground potential when any digit other than "1" is stored in the register. Transistor 3005 is now rendered conductive since its emitter is returned to ground potential through diode 3007 and its base is returned to a negative potential at the collector of non-conducting transistor 3116 in the seize acknowledge control flip-flip circuit. When transistor 3005 becomes conductive, the positive-going potential swing at its collector is coupled through diode 3125, capacitor 3126, and diode 3127 to the base of transistor 3119 and serves to set the demand gate control flip-flip circuit to the condition wherein transistors 3119 and 3120 are conductive. When transistor 3119 becomes conductive, ground potential is applied to the emitter of transistor 3002. When transistor 3120 becomes conductive, ground potential is again coupled through diode 3118 to the collector of transistor 3217 in the X control flip-flip circuit and serves to set that flip-flop circuit to the condition in which transistor 3218 is non-conductive.

When the digit acknowledge signal is received by the originating key sender register, the key sender register is controlled to discontinue the transmission of the voice frequency dialing signals V and X, and positive potential is removed from the V and X output conductors by receiver 2701. When positive potential is removed from output conductor X, seize transistor 3111 becomes conductive and seize transistor 3112 reverts to its non-conductive condition. The originating key sender register now functions to transmit a second seize signal and positive potential is applied to output conductor X by receiver 2701 to again render transistor 3111 non-conductive and transistor 3112 conductive. The X control flip-flop circuit remains in the setting wherein transistor 3218 is non-conductive since the collector of transistor 3217 is returned to ground potential at the collector of conducting transistor 3120. When transistor 3112 becomes conductive, the positive-going potential swing at its collector is coupled through capacitor 3001 to render transistor 3002 conductive since the emitter of transistor 3002 is returned to ground potential at the collector of conducting transistor 3119 in the demand control flip-flip circuit.

When transistor 3002 becomes conductive, the negative-going potential swing at its collector is coupled through capacitor 3010 and diode 3011 to set the connect demand flip-flip circuit to the condition in which transistors 3012 and 3013 are both conductive. When transistor 3012 becomes conductive, normally conducting transistor 3014 becomes non-conductive and minus twelve volt potential is applied to the register connect demand conductor RCD1, which extends to the register finder. Negative potential on conductor RCD1 signifies to the register finder that the illustrated incoming register has a routing digit stored therein and is in readiness to read out digit marking information to the route selector and time position channel and highway information to the channel and highway marking bus bars.

The register finder seizes the illustrated incoming register for read out purposes by applying ground potential to register demand answer conductor RDA1 and thus to the cathode terminal of diode 2909, which with diode 2910 forms an "and" gate for positive signals. A positive-going output signal is realized from the "and" gate since the cathode terminal of diode 2910 is returned to ground potential at the collector of conducting transistor 3012. The positive-going signal at the output of the "and" gate is coupled through capacitor 2911 and diode 2912 to the base of transistor 2913 and sets the read out flip-flop circuit to the condition in which transistor 2914 is conductive and transistor 2913 is non-conductive. When transistor 2913 becomes non-conductive and its collector falls to a negative potential, a negative potential is applied to read out conductor RO at the emitter of emitter-follower transistor 2915. The negative potential on conductor RO is applied to the base electrodes of transistors 3015 and 3040 but these transistors remain non-conductive since units found conductor UF and all trunks busy conductor ATB are returned to a negative potential at this time.

The negative potential on conductor RO is also applied to the base of transistor 3221 in the highway 1 selector circuit, to the base electrode of a transistor corresponding to 3221 in the highway 2 selector, to the base electrode 3222 in the time position 1 store circuit, and to the base electrodes of transistors corresponding to 3222 in the remaining nine time position store circuits. Since the flip-flop circuit in the highway 1 selector is operated to the condition in which transistor 3302 is conductive, transistor 3221 is rendered conductive and ground potential at its collector is coupled through diode 3323 to the highway bus bar conductor HW1. Similarly, since the flip-flip circuit transistors in the time position 1 store circuit are conductive, transistor 3222 is rendered conductive and ground potential at its collector is coupled through diode 3224 to the time position bus bar conductor TPM1. Thus, time position 1 channel on highway 1 is identified on the bus bars to the called line terminating unit selected by the route selector. It will be recalled that the channel allotter is effectively disconnected from the bus bars when the register finder seizes one of the registers for read out purposes so that the same set of bus bars can be used by the channel allotter and the registers. Simultaneously with the application of marking signals to the highway and channel bus bars, the register is controlled to transmit digit marking information to the route selector for the purpose of controlling the route selector to seize an idle unit in the group of units represented by the digit information stored in the register. It can be seen that when the read out flip-flop circuit is triggered to the condition in which transistor 2914 is conductive, negative potential appearing at the collector of non-conducting transistor 2913 is applied to the anode terminal of diode 2916, which with diode 2917 forms an "and" gate for negative signals. The anode terminal of diode 2917 is also returned to a negative potential at the collector of non-conducting transistor 2918 in the route control flip-flop circuit. The negative potential signal at the output of the "and" gate formed by diodes 2916 and 2917 is applied to the base electrode of a transistor corresponding to 2605 in each of the digit switches 2–0. Since the digit "2" is stored in the digit register and the emitter electrode of transistor 2605 is therefore returned to ground potential, transistor 2605 in the digit "2" switch becomes conductive and ground potential is applied through diode 2607 to the digit marking 2 conductor DM2, which extends to the route selector. The route selector is thus controlled to select an idle unit in the second group of units, which group of units individually terminate trunk lines extending to the desired long distance switching center. The line terminating unit selected by the route selector is then controlled to read in the highway and time position channel information applied to the bus bars by the illustrated register and thus seize the marked channel.

When an idle unit in the marked group is seized by the route selector, ground potential is applied to unit found conductor UF and thus to the emitter of transistor 3015. Transistor 3015 becomes conductive since the negative potential appearing on conductor RO is applied to its base electrode, as previously described. The positive-going potential swing at the collector of transistor 3015 is coupled through capacitor 3016 and diode 3017 to set the reset control flip-flop circuit to the condition in which transistor 3019 is conductive and transistor 3018 is non-conductive. When transistor 3018 becomes non-conductive, the base of transistor 3020 is returned to negative potential so that the next occurring positive-going clock pulse on conductor 20 kc. trigger renders transistor 3020 conductive. The positive-going potential swing at the collector of transistor 3020 is coupled through diode 3021 and capacitor 3022 to the base of transistor 3023 in the reset monostable circuit comprising transistors 3023, 3024, and 3025, which monostable circuit is identical to the monostable circuits previously described. Briefly, transistors 3023 and 3025 are normally biased for conduction and transistor 3024 is normally biased for non-conduction. When a positive-going pulse is coupled through diode 3021 and capacitor 3022 to the base of transistor 3023, transistor 3023 is triggered non-conductive, transistor 3024 is triggered conductive, and transistor 3025 is triggered non-conductive to apply negative potential to conductor REL. After a short interval, the reset monostable circuit reverts to its normal operated condition. The negative pulse on release conductor REL is applied to the emitter electrodes of transistor 2918 in the route control flip-flop circuit, transistor 2914 in the read out flip-flop, transistor 3218 in the X control flip-flop, transistor 3019 in the reset control flip-flop, transistor 3004 in the ATB flip-flop, transistor 3101 in the register busy marking flip-flop, transistor 3202 in the read in flip-flop, and transistor 3302 in the highway selector circuits. Each of the above-identified flip-flop circuits is thus reset to the condition, or remains in the condition, in which the other transistor of each flip-flop circuit is conductive. The negative pulse on conductor REL is also applied to the emitter of transistor 2905 for the purpose of terminating the timing operation of the monostable circuit comprising transistors 2905, 2906, and 2907. The negative pulse on conductor REL is also applied to the emitter of transistor 3012 and renders both transistors 3012 and 3013 of the connect demand flip-flop circuit non-conductive. The negative pulse on conductor REL is also coupled through capacitor 3128 and diode 3129 to the base of transistor 3116 and triggers both transistors 3116 and 3115 of the seize acknowledge control flip-flop circuit conductive. The negative pulse on conductor REL is also applied to the emitter electrode of a transistor corresponding to 3305 in each of the time position store flip-flop circuits and thus assures that each time position store flip-flop circuit is in the condition in which both transistors are non-conductive. The negative pulse on conductor REL is also coupled through diode 3026 and capacitor 3027 to the base of normally non-conductive transistor 3028. The negative pulse applied to the base of transistor 3028 renders transistor 3028 conductive. When transistor 3028 becomes conductive, transistor 3029, which forms the other stage of the register reset monostable circuit, becomes non-conductive and a negative pulse is applied to the emitter electrode of a transistor corresponding to 2706 in each of the digit register circuits. The digit register flip-flop circuits are thereby set in the condition in which the transistor corresponding to 2705 is conductive. The negative pulse appearing at the collector of transistor 3029 is also coupled through capacitor 3132 and diode 3133 to reset the demand gate control flip-flop circuit to the condition wherein transistors 3119 and 3120 are non-conductive. The incoming register is now completely reset and in readiness to handle another call.

Whenever the route selector encounters an all trunks busy condition in the selected group of line terminating units, ground potential is applied to conductor ATB rather than to the unit found conductor UF, as explained in the description of the route selector. It will be recalled that the base of transistor 3040 is returned to negative potential appearing on read out conductor RO. Therefore, when ground potential is applied to conductor ATB, transistor 3040 becomes conductive and a positive-going pulse is coupled through capacitor 3030 and diode 3031 to the base of transistor 3003 to set the all trunks busy flip-flop circuit to the condition in which transistor 3004 is conductive. When transistor 3004 becomes conductive, the positive potential swing at its collector is coupled through capacitor 3032 and diode 3033 to the base of transistor 3012 to set the connect demand flip-flop circuit to the condition wherein both transistors are non-conductive. Negative potential is thereby removed from the register connect demand conductor RCD1 to enable the register finder to advance to the next register demanding attention. When transistor 3004 becomes conductive, the positive-going potential swing at its collector is also coupled through capacitor 2920 and 2921 to set the read out flip-flop circuit to the condition in which transistor 2913 is conductive. When transistor 2913 becomes conductive, ground potential is applied to read out conductor RO and the transmission of highway and channel marking information to the bus bars is terminated by the illustrated incoming register. When transistor 2913 becomes conductive, ground potential is applied to the anode terminal of diode 2916 and thus to the base electrodes of all of the digit switch transistors corresponding to 2605. Thus, digit marking information is removed from the digit marking conductors, which extend to the route selector.

When transistor 3003 of the all trunks busy flip-flop circuit becomes non-conductive, the negative-going potential swing at its collector is coupled through capacitor 3130 and diode 3131 to set the seize acknowledge control flip-flop circuit to the condition in which both transistors 3115 and 3116 are conductive. The negative-going potential swing at the collector of transistor 3003 is also coupled through diode 3032 and capacitor 3027 to the base of transistor 3028 to trigger the register reset monostable circuit and thereby release the digit register and reset the demand gate control flip-flop circuit as previously explained. Prior to the time when transistor 3003 becomes non-conductive, the recorded busy announcing message received from the tape announcer and amplified by transistor 2715 is shunted to ground at the collector of transistor 3003 through diode 2716. When transistor 3003 becomes non-conductive, diode 2716 is biased in the reverse direction and the recorded message is coupled through diode 2717 to the base of emitter follower amplifier transistor 2809 and thus to the attendant at the originating long distance switching center. When transistor 3003 becomes non-conductive, the negative potential at its collector is also applied to the emitter of transistor 2908 and transistor 2908 is thereby rendered non-conductive. When transistor 2908 becomes non-conductive and its collector potential drops to minus twelve volts, diode 2922 is biased in the reverse direction so as to prevent the operation of the fault flip-flop circuit if the attendant at the originating long distance switching center fails to release the connection within the time interval measured by the monostable circuit comprising transistors 2905, 2906, and 2907. When transistor 2908 becomes non-conductive, transistor 3124 becomes non-conductive but serves no purpose at this time.

When the attendant at the originating long distance switching center releases the connection after receiving the recorded message or at any other time when the incoming register is connected to the highway, a release signal, comprising frequencies U and V, is transmitted over the trunk line and detected by multifrequency receiver 2701 and positive potential appears on the output conductors U and V from the receiver. The V digit register is, of course, triggered but since the digit register stages were all reset under control of the all trunks busy flip-flop circuit, the V stage is the only digit register stage in an activated condition and none of the digit gating transistors are rendered conductive. With positive potential on conductors U and V, normally conducting transistors 2718 and 2719 are rendered non-conductive and a negative signal appears at the output of the "and" gate for negative signals, comprising diodes 2720 and 2721. The negative signal appearing at the output of the "and" gate is coupled through diode 2722 and capacitor 2723 to trigger the monostable circuit, comprising transistors 2724 and 2725, to the condition wherein transistor 2724 is conductive and transistor 2725 is non-conductive. After approximately fifty milliseconds, the monostable circuit reverts to the condition in which transistor 2724 is non-conductive and transistor 2725 is conductive. The negative pulse at the collector of transistor 2725 serves to reverse bias diodes 2726 and 2727 so that signal frequencies Z and U, amplified by emitter follower transistors 2728 and 2729, respectively, are coupled through diodes 2730 and 2731, respectively, to the base of emitter follower transistor 2809. Thus, a release acknowledge signal of approximately fifty milliseconds duration is transmitted to the originating office and to the highway monitor circuit in the illustrated long distance switching center. The highway monitor circuit is responsive to the receipt of the release acknowledge signal to mark time position 1 channel on highway 1 as idle to the channel allotter. The negative pulse at the collector of transistor 2725 is also differentiated by capacitor 3033 and the positive-going spike corresponding to the trailing edge of said pulse is coupled through diode 3034 to trigger the reset monostable circuit, comprising transistors 3023, 3024, and 3025, and thus completely reset the incoming register, as previously described.

Next assume that the digit acknowledge signal returned by the incoming register does not correspond to the digit transmitted by the originating key sender register. Under these conditions, the attendant at the originating long distance switching center controls the equipment to transmit a cancel signal comprising frequencies U and Y over the trunk line. When the cancel signal is detected by receiver 2701, positive potential appears on output conductors U and Y and normally conductive transistors 3134 and 3135 are thereby rendered non-conductive. Under these conditions, the anode terminals of diodes 3136 and 3137, which form an "and" gate for negative signals, are both returned to minus twelve volt potential and the register reset monostable circuit is triggered through diode 3043 and capacitor 3027 to reset the digit register flip-flop stages to the condition in which the transistor corresponding to 2705 in each stage is conductive. The key sender register then re-transmits the canceled digit.

Next assume that there is a malfunction in the incoming register and the incoming register therefore fails to complete a call within the time period measured by the monostable circuit comprising transistors 2905, 2906, and 2907. It will be recalled that when seize acknowledge amplifier transistor 3117 becomes conductive responsive to the receipt of a seize signal by the multifrequency receiver 2701, the negative potential swing at its collector is coupled through capacitor 2903 and diode 2904 to the base of transistor 2905. Transistors 2905, 2906, and 2907 form a monostable circuit in which transistor 2905 is normally non-conductive, the emitter of transistor 2906 is slightly negative, and transistor 2907 is normally conductive. When a negative pulse is coupled through diode 2904 to the base of transistor 2905, transistor 2905 is rendered conductive, the emitter electrode of transistor 2906 goes positive, and transistor 2907 is rendered non-conductive. After a period of approximately one second, the monostable circuit reverts to the condition in which transistor 2907 is conductive. The positive-going potential swing at the collector of transistor 2907 is coupled through capacitor 2923 and diode 2922 to set the fault flip-flop circuit to the condition wherein transistor 2901 is conductive and transistor 2902 is non-conductive. When transistor 2902 becomes non-conductive and its collector potential goes negative, the emitter of emitter follower transistor 2924 goes negative and transistor 2925 is rendered conductive to illuminate fault lamp 2926. When transistor 2901 becomes conductive, the positive-going potential swing at its collector is coupled through diode 3035 and capacitor 3022 to trigger the reset monostable circuit and thus reset the incoming register. It is to be noted that when the register busy marking flip-flop circuit is reset and transistor 3102 becomes conductive, transistors 2908 and 3124 become non-conductive. Now when the send and receive gates are closed as a result of resetting of the highway selector and time position store circuits, a seize signal is no longer detected by multifrequency receiver 2701, output conductor X from the receives goes negative, seize transistor 3111 becomes conductive, and seize transistor 3112 becomes non-conductive. The seize acknowledge control flip-flop circuit, which was triggered to the condition in which both transistors 3115 and 3116 are conductive by the pulse on conductor REL, is prevented from being triggered to the condition in which transistors 3115 and 3116 are both non-conductive when transistor 3112 becomes non-conductive since resistor 3123 is now returned to plus twelve volt potential at the collector of non-conducting transistor 3124.

The ground potential at the collector of conducting transistor 2901 in the fault flip-flop circuit is also applied to the anode terminal of diode 3103 and thus to the register free marking conductor RFM1. Thus, the illustrated incoming register is effectively taken out of service since it cannot be reassigned for use by the register allotter. The incoming register remains in the condition just described until the manually operated fault reset switch is operated to apply ground potential through diode 2928 to the collector of transistor 2902 and thus to the base of transistor 2901 to reset the fault flip-flop circuit to the condition in which transistor 2902 is conductive and transistor 2901 is non-conductive. Under these conditions, fault lamp 2926 is extinguished and negative potential is applied to condutor RFM1.

Next assume that the calling line terminating unit found by the calling unit finder circuit terminates a trunk line extending to a local office. When the calling line terminating unit is enabled by the calling unit finder circuit, the calling unit functions to apply negative potential to register start conductor RST and to conductor local, which conductors are common to all of the incoming registers. If the illustrated incoming register has been assigned for use by the channel allotter, the read in flip-flop circuit is triggered, the time position channel and highway information applied to the bus bars by the channel allotter is read in, the register busy marking flip-flop circuit is triggered, and the read in flip-flop circuit is then reset by the next occurring positive-going clock pulse appearing on conductor 20 KC trigger, all as previously described. When transistor 3101 in the register busy marking flip-flop circuit becomes conductive, ground potential is applied to the emitter of local transistor 3225 and since conductor RI and the anode terminal of diode 3226 both stand at negative potential, transistor 3225 is rendered conductive. When the read in flip-flop circuit is reset by the next occurring clock pulse, conductor RI returns to ground potential and transistor 3225 becomes non-conductive. Thus, a positive-going pulse of approximately forty microseconds duration occurs at the collector of transistor 3225 and a positive pulse is coupled through capacitor 2611 and diode 2612 to the base of a transistor corresponding to 2705 in the Y digit register 2613, and a positive pulse is also coupled through capacitor 2614 and diode 2615 to the base of a transistor corresponding to 2705 in the Z digit register 2616.

When the flip-flop circuit in the Y register 2613 and the flip-flop circuit in the Z register 2616 are both in the condition in which the transistor corresponding to 2706 in each flip-flop is conductive and the transistor corresponding to 2605 in each flip-flop is non-conductive, the transistor corresponding to 2707 in the digit "0" stage 2617 becomes conductive since its base is returned to a negative potential at the collector of the transistor corresponding to 2705 in the Y register 2613 and its emitter is returned to ground potential at the collector of the transistor corresponding to 2706 in the Z register 2616. When the transistor corresponding to 2707 in the digit "0" stage 2617 becomes conductive, ground potential is applied to the emitter electrodes of transistors 2618 and 2619 in the digit "0" switch. The positive-going pulse at the collector of local transistor 3221 is also utilized to trigger the connect demand flip-flip transistors 3013 and 3012 conductive through capacitor 3036 and diode 3037. When transistor 3012 becomes conductive, a negative potential is applied to the register connect demand conductor RCD1 to signal the register finder that the illustrated incoming register is in readiness to read out digit marking, time position, and highway identifying information. When ground potential is applied to conductor RDA1 by the register finder, the read out flip-flop circuit is triggered and negative potential is applied to read out conductor RO to control the highway selector and time position store circuits to read out, all as previously described. When transistor 2913 of the read out flip-flop circuit becomes non-conductive, negative potential is applied to the anode terminal of diode 2916 and transistor 2618 of the digit "0" switch is rendered conductive to apply ground potential to digit marking 0 conductor DM0, which extends to the route selector. Since level 0 corresponds to the attendant's link circuits, the route selector is controlled by the potential on conductor DM0 to seize an idle one of the attendant's link circuits. The seized link circuit is then controlled to read in time position channel and highway information applied to the bus bars by the incoming register in the exact same manner as previously described for a seized line terminating unit. When a link is seized, the route selector applies ground potential to the unit found conductor UF and the register is released during the next occurring clock pulse, as previously described.

It will be noted that the above-described operation of the incoming register occurs automatically responsive to the receipt of marking on conductor local and is completely independent of any signal transmitted over the trunk line from the local office. The seize signal transmitted over the trunk line from the local office and which controls the seizure of the line terminating unit is still present on the highway conductors at the time that the incoming register seizes the allotted time channel. The seize signal frequency X applied to the input of the multifrequency receiver 2701, of course, results in the application of a positive potential to output conductor X from receiver 2701. When seize transistor 3112 becomes conductive, seize acknowledge amplifier 3117 becomes non-conductive and a seize acknowledge signal is returned to the local office, as previously described, but has no effect in the local office. The local office equipment is designed to transmit a timed seize signal of approximately one second duration. The received seize signal has no effect on the incoming register other than that described above.

The operation of the incoming register on a call from another long distance switching center to a local office served by the illustrated long distance switching center will now be described. It will be recalled from the general description that the digit corresponding to the desired local office is prefixed with the digit "1." Assume that the illustrated incoming register has read in time position channel and highway information and has thus seized the allotted time position channel. The seize signal applied to the input of multifrequency receiver 2701 controls seize transistor 3112 to be conductive and seize acknowledge amplifier transistor 3117 to be non-conductive to thereby transmit a seize acknowledge signal to the originating office, as previously described. When the transmission of the seize signal is terminated, transistor 3112 becomes non-conductive, transistor 3117 becomes conductive, and the seize acknowledge control flip-flop circuit transistors 3115 and 3116 become nonconductive, as previously described. The originating key sender register then transmits the compound frequencies V and W, which correspond to the digit "1," and the flip-flop circuits in the V digit register and in the W digit register are triggered to the condition in which transistor 2706 is conductive and transistor 2705 is non-conductive. Thus, the emitter of digit "1" stage transistor 2707 is returned to ground potential at the collector of transistor 2706 in the V register and since its base is returned to a negative potential at the collector of non-conducting transistor 2705 in the W register, transistor 2707 is rendered conductive. When transistor 2707 becomes conductive, the Z gate transistor 2711 and the Y gate transistor corresponding to 2711 become non-conductive and the frequencies Y and Z are transmitted to the originating key sender register as a digit acknowledgment signal.

The ground potential appearing at the collector of conducting transistor 2707 is also coupled through resistor 3044 to bias diode 3038 in the forward direction. The lower terminal of capacitor 3039 remains at a negative potential at this time since the cathode terminal of diode 3038 is returned to negative potential at the collector of non-conducting transistor 3116 in the seize acknowledge control flip-flop circuit. The positive-going potential swing at the collector of transistor 2707 is also coupled through capacitor 2929 and diode 2930 to trigger the route control flip-flop circuit to the condition wherein transistor 2918 is conductive and transistor 2919 is nonconductive. The resulting positive-going potential swing at the collector of transistor 2918 is coupled through capacitor 3138 and diode 3139 to reset the seize acknowledge control flip-flop circuit to the condition in which transistors 3115 and 3116 are conductive. When transistor 3116 becomes conductive, a positive pulse is applied to the base of the register reset transistor 3028 through capacitor 3039 but without effect since transistor 3028 is already non-conductive.

If the first digit was correctly acknowledged, the originating key sender register transmits a second seize signal and when seize transistor 3112 becomes conductive and transistor 3117 therefore becomes non-conductive, a seize acknowledge signal is again transmitted by the incoming register to the originating key sender register. When the transmission of the seize signal is terminated, transistor 3112 becomes non-conductive, transistor 3117 becomes conductive to terminate the transmission of a seize acknowledge signal, and seize ackowledge control flip-flip transistors 3115 and 3116 are triggered non-conductive, all as previously described. When transistor 3116 becomes non-conductive, the negative potential swing at its collector is coupled through diode 3038 and capacitor 3039 to the base of transistor 3028 in the register reset monostable circuit, and the resulting negative pulse appearing at the collector of transistor 3029 serves to reset the V register and W register flip-flop circuits to the condition in which transistor 2705 in each flip-flop circuit is conductive.

The originating key sender register now functions to transmit the next digit over the trunk line to the illustrated long distance switching center. If it be assumed that the digit is "8" and thus comprises the compound frequencies W and Z, positive potential appears on output conductors W and Z from receiver 2701 and the W register and Z register flip-flop circuits are triggered to the condition in which the transistor corresponding to 2706 in each flip-flop is conductive. The transistor corresponding to 2707 in the digit "8" stage 2620 becomes conductive since its base is returned to negative potential at the collector of the transistor corresponding to 2705 in the Z register 2616 and its emitter is returned to ground potential at the collector of the transistor corresponding to 2706 in the W register 2732. Under these conditions, the W gate and X gate transistors corresponding to 2711 are rendered non-conductive and the frequencies W and X are transmitted to the originating key sender register as a digit acknowledgment signal. Ground potential appearing at the collector of the transistor corresponding to 2706 in the Z register 2616 is applied to the anode terminal of diode 3009 and thus to the emitter of transistor 3005. Transistor 3005 becomes conductive since its base is returned to negative potential at the collector of non-conducting transistor 3116 in the seize acknowledge control flip-flip circuit.

The positive potential swing at the collector of transistor 3005 triggers the demand gate control transistors 3119 and 3120 conductive and ground potential is thereby applied to the emitter of transistor 3002, as previously described. If the digit acknowledgment was correct, the originating key sender register removes the digit information from the trunk line and then functions to transmit a third seize signal over the trunk line. When seize transistor 3112 again becomes conductive responsive to the receipt of the seize signal by receiver 2701, transistor 3002 becomes conductive to trigger the connect demand flip-flop circuit transistors 3012 and 3013 conductive and negative potential is applied to the register connect demand conductor RCD1. When the register finder seizes the illustrated incoming register for read out purposes by applying ground potential to conductor RDA1, the ensuing operation in the incoming register is identical to the read out operation previously described with the single exception that digit marking information is read out to the local digit marking bus bars rather than to the digit marking bus bars corresponding to groups of units terminating trunk lines to other long distance switching centers. It can be seen that with the route control flip-flop circuit in the condition in which transistor 2918 is conductive and transistor 2919 is non-conductive, negative potential is applied to the anode terminal of diode 2931 rather than to the anode terminal of diode 2917. Thus, when the read out flip-flop circuit is triggered to the condition in which transistor 2913 is non-conductive and transistor 2914 is conductive and negative potential is applied to the anode terminals of diodes 2916 and 2932, a negative output is obtained from the "and" gate for negative signals formed by diodes 2931 and 2932. Negative potential is thereby applied to the base electrode of each of the lower transistors, such as 2606 and 2619, in each of the digit switches. Since it was assumed that the digit "8" was transmitted, the digit "8" switch transistor corresponding to 2606 or 2619 has ground potential applied to its emitter and therefore becomes conductive to apply ground potential to the local digit marking conductor LDM8.

While there has been shown and described what is at present considered to be the preferred embodiment of the invention, modifications thereto will readily occur to those skilled in the art. It is not, therefore, desired that the invention be limited to the embodiment shown and described, and it is intended to cover in the appended claims all such modifications as fall within the true spirit and scope of the invention.

What is claimed is:

1. In a telephone system, a given number of line terminating units, a register, a multichannel transmission highway network interconnecting said units and said register, said network providing a number of channels less than said given number, a channel allotter, means in said allotter for marking an idle one of said channels to said units and to said register, a calling unit finder, means in said finder for transmitting an enabling signal to each of said units in turn, means in each unit operative only when the line terminated by that unit is in a calling condition and responsive to the receipt of an enabling signal from said finder for causing that unit and said register to seize the marked channel.

2. The system of claim 1 including means for assigning an individual time position which recurs in repetitive time position frames to each of said channels.

3. In a telephone system, a given number of line terminating units, a register, a plurality of transmission highway networks of the time position channel type interconnecting said units and said register, said networks providing a total number of channels less than said given number, a channel allotter, means in said allotter for marking a network having an idle channel therein and for marking an idle channel within that network to said units and to said register, a calling unit finder, means in said finder for transmitting an enabling signal to each of said units in turn, means in each unit operative only when the line terminated by that unit is in a calling condition and responsive to the receipt of an enabling signal for causing that unit and said register to seize the marked channel in the marked network.

4. In a telephone system, a given number of line terminating units, a plurality of registers, a multichannel transmission highway network interconnecting said units and said registers, said network providing a number of channels less than said given number, a register allotter for assigning each of said registers for use in turn, a channel allotter, means in said channel allotter for marking an idle one of said channels to said units and to said registers, a calling unit finder, means associated with each of said units for transmitting a demand signal to said finder when a call is initiated on the line terminated by that unit, means operative only when a register has been assigned and when an idle channel has been marked and responsive to the receipt of a demand signal for controlling said finder to transmit an enabling signal to the calling unit, and means in the calling unit responsive to the receipt of said enabling signal for controlling the calling unit and the assigned one of said registers to seize the marked channel.

5. In a telephone system, a plurality of line terminating units, a plurality of registers, a multichannel transmission network interconnecting said units and said registers, a register allotter for assigning said registers for use in turn, a channel alotter for assigning said channels for use in turn, means in said channel allotter for transmitting a marking signal identifying an assigned one of said channels to said units and said registers, a finder, means in said finder for transmitting an enabling signal to each of said units in turn, means in each unit operative only when the line terminated by that unit is in a calling condition and responsive to the receipt of an enabling signal from said finder for controlling that unit and the assigned register to seize the channel identified by said marking signal, means responsive to the seizure of a channel for controlling said register allotter to assign another one of said registers for use, means also responsive to the seizure of a channel for controlling said channel allotter to assign another one of said channels for use, means in each of said units for transmitting called line selecting information received over its associated line in the channel seized by that unit, and means in each of said registers for receiving called line selecting information in the channel seized by that register.

6. In a telephone system, a plurality of lines, a plurality of registers, a plurality of transmission highway networks of the time division channel type interconnecting said lines and said registers, and means for assigning an individual channel in any one of said networks for the transmittal of called line selecting information between any calling line and any one of said registers.

7. In a telephone system, a plurality of lines, a plurality of registers, a plurality of transmission highway networks interconnecting said lines and said registers, each of said networks comprising a plurality of channels having individually assigned thereto different time positions which recur in repetitive time position frames and like channels in each network being assigned the same time positions, and means for assigning an individual channel in any one of said networks for the transmittal of called line selecting information between each calling line and any one of said registers.

8. In a telephone system, a plurality of line terminating units, a plurality of registers, a plurality of transmission highway networks of the time division channel type interconnecting said units and registers, a register allotter for assigning each of said registers for use in turn, a channel allotter, means in said channel allotter for marking a network having an idle channel therein and for marking an idle channel within that network to said units and to said registers, means in each unit responsive to the initiation of a call on the line terminated by that unit for controlling that unit and the assigned register to seize the marked channel in the marked network, and means for marking seized channels busy to said channel allotter.

9. In a telephone system, a plurality of line terminating units, a register, a multichannel transmission highway network interconnecting said units and said register, a channel allotter, means in said allotter for transmitting a marking signal identifying one of said channels to said units and to said register, a calling unit finder, means in said finder for transmitting an enabling signal to each of said units in turn, means in each unit operative only when the line terminated by that unit is in a calling condition and responsive to the receipt of an enabling signal from said finder for causing that unit and said register to seize the channel identified by said marking signal for the transmittal of called unit selecting information between the calling unit and said register, means in said register responsive to the receipt of said called unit selecting information for registering the designation of the called unit, means in said register for controlling the called unit to seize said one channel, and means for thereafter releasing said register from said transmission network.

10. The system of claim 9 including means for assigning an individual time position which recurs in repetitive time position frames to each of said channels.

11. In a telephone system, a plurality of line terminating units, a register, a plurality of multichannel transmission highway networks interconnecting said units and said register, a channel allotter, means in said allotter for marking a network having an idle channel therein and for marking an idle channel within that network to said units and to said register, a calling unit finder, means in said finder for transmitting an enabling signal to each of said units in turn, means in each unit operative only when the line terminated by that unit is in a calling condition and responsive to the receipt of an enabling signal from said finder for controlling that unit and said register to seize the marked channel in the marked network for the transmittal of called unit selecting information between the calling unit and said register, means in said register responsive to the receipt of called unit selecting information for registering the designation of the called unit, means in said register for controlling the called unit to seize the channel seized by the calling unit and said register, and means for thereafter releasing said register from the seized channel.

12. The system of claim 11 including means for assigning each channel in a particular network an individual time position which recurs in repetitive time position frames and for assigning like channels in the plurality of networks the same time positions.

13. In a telephone system, a plurality of lines, a plurality of registers, a plurality of transmission highway networks of the time position channel type interconnecting said lines and said registers, means for assigning an individual channel in any one of said networks for the transmittal of called line selecting information between any calling line and any one of said registers, means in each register responsive to the receipt of called line selecting information in its assigned channel for registering the designation of the called line, and means in each register for controlling the called line corresponding to the designation registered in that register to seize the channel assigned to that register.

14. In a telephone system, a plurality of line terminating units, a plurality of registers, a plurality of transmission highway networks of the time division channel type interconnecting said units and registers, a register allotter for assigning each of said registers for use in turn, a channel allotter, means in said channel allotter for marking a network having an idle channel therein and for marking an idle channel within that network to said units and to said registers, means in each unit responsive to the initiation of a call on the line terminated by that unit for controlling that unit and the assigned one of said registers to seize the marked channel in the marked network for the transmittal of called unit selecting information between the calling unit and said one register, means in each register responsive to the receipt of called unit selecting information in the channel seized by that register for registering the designation of a called unit, and means in each register for controlling the unit corresponding to the registered designation in that register to seize the channel seized by that register for the transmittal of speech information between the calling and called units.

15. In a telephone system, a plurality of line terminating units, a register, a multichannel transmission network interconnecting said units and said register, a channel allotter, means in said allotter for transmitting a marking signal identifying an idle one of said channels to said units and to said register, a finder, means in said finder for transmitting an enabling signal to each of said units in turn, means in each unit operative only when the line terminated by that unit is in a calling condition and responsive to the receipt of an enabling signal for controlling that unit and said register to seize the channel identified by said marking signal for the transmittal of called unit selecting information between the calling unit and said register, means in said register responsive to the receipt of called unit selecting information for registering the designation of the called unit, a selector, means in said register for controlling said selector in accordance with the registered designation of the called unit to seize the called unit, means in said register for transmitting a marking signal identifying said one channel to said units, and means effective only in the seized unit for seizing said one channel in response to the receipt of the marking signal from said register.

16. In a telephone system, a plurality of line terminating units, a register, a plurality of transmission highway networks of the time position channel type interconnecting said units and said register, a channel allotter, means in said allotter for marking a network having an idle channel therein and for marking an idle one of the channels within that network to said units and to said register, means in a calling one of said units responsive to the allotter marking for controlling that unit and said register to seize said one channel for the transmittal of called unit selecting information between the calling unit and said register, means in said register responsive to the receipt of called unit selecting information for registering the designation of the called unit, a selector, means controlled by said register for controlling said selector in accordance with the registered designation of the called unit to seize the called unit, means in said register for marking the network containing said one channel and for marking said one channel to said units, and means effective only in the seized unit for seizing said one channel in response to the register marking.

17. In a telephone system, a plurality of line terminating units, a plurality of registers, a multichannel transmission network interconnecting said units and said registers, a control network interconnecting said units and said registers, a register allotter for assigning said registers for use in turn, a channel allotter, means in said channel allotter for applying a marking signal corresponding to a first one of said channels to said control network, a unit finder, means in said unit finder for applying an enabling signal to each of said units in turn, means in each unit operative only when the line associated with that unit is in a calling condition and responsive to the receipt of said enabling signal and said marking signal for controlling that unit and the assigned register to seize said first channel for the transmittal of line selecting information between the calling line and the assigned register, means responsive to the seizure of said first channel for controlling said channel allotter to apply a marking signal corresponding to a second one of said channels to said control network, means in said assigned register for registering the designation of the called line, a register finder, means for controlling said register finder to connect to the assigned register, means responsive to the connection of said register finder to the assigned register for controlling said channel allotter to discontinue the application of a marking signal corresponding to a second one of said channels to said control network, means in the assigned register responsive to the connection of said register finder to the assigned register for applying the marking signal corresponding to said first one of said channels to said control network, a selector, means in said assigned register for controlling said selector in accordance with the registered designation of the called line to seize the called line terminating unit, and means effective only in the seized unit for seizing said first one of said channels in response to the receipt of the marking signal from the assigned register.

18. In a telephone system, a given number of line terminating units, a plurality of registers, a multichannel transmission network interconnecting said units and said registers, said network providing a number of channels less than said given number, a control network interconnecting said units and said registers, a channel allotter, means in said allotter for applying marking signals individually corresponding to said channels to said control network on a one at a time basis for the purpose of assigning an individual channel for the transmittal of called unit selecting information between any calling unit and any one of said registers, means for controlling each of said registers on a one at a time basis to apply a marking signal corresponding to the channel assigned to that register to said control network for the purpose of connecting the called unit selected by that register to the channel assigned to the calling unit associated with that register, and means for controlling said allotter to discontinue the application of marking signals to said control network whenever one of said registers is applying a marking signal to said control network.

19. The system of claim 18 including means for assigning an individual time position which recurs in repetitive time position frames to each of said channels.

20. In a telephone system, a given number of line terminating units, a plurality of registers, a plurality of transmission highway networks of the time position channel type interconnecting said units and said registers, said networks providing a total number of channels less than said given number, a control network interconnecting said units and said registers, a channel allotter, means in said allotter for applying network and channel marking signals to said control network on a one at a time basis for the purpose of assigning an individual channel for the transmittal of called unit selecting information between any calling unit and any one of said registers, means for controlling each of said registers on a one at a time basis to apply network and channel marking signals to said control network for the purpose of connecting the called unit selected by that register to the channel assigned to the calling unit associated with that register, and means for controlling said allotter to discontinue the application of marking signals to said control network whenever one of said registers is applying marking signals to said control network.

21. In a telephone system, a plurality of line terminating units, a plurality of registers, a multichannel transmission network interconnecting said units and said registers, a control network interconnecting said units and said registers, a channel allotter, means in said allotter for applying marking signals individually corresponding to idle ones of said channels to said control network on a one at a time basis, means controlled by the marking signals applied to said control network by said allotter for assigning an individual channel for the transmission of called unit selecting information between each calling unit and any one of said registers, means in each register for registering the designation of a called unit responsive to the receipt of called unit selecting information in the channel assigned to that register, means for controlling on a one at a time basis each register having a called unit designation registered therein to apply a marking signal corresponding to the channel assigned to that register to said control network, means for controlling said allotter to discontinue the application of marking signals to said control network whenever one of said registers is applying a marking signal to said control network, means for controlling the called unit corresponding to the called unit designation registered in each register to seize the channel identified by the marking signal applied to said control network by that register, and means for preventing the assignment of the channels identified by marking signals applied to said control network by said registers to calling ones of said units.

22. The system of claim 21 including means for assigning an individual time position which recurs in repetitive time position frames to each of said channels.

23. In a telephone system, a plurality of line terminating units, a plurality of registers, a plurality of transmission networks of the time division channel type interconnecting said units and said registers, a control network interconnecting said units and said registers, a channel allotter, means in said allotter for applying network and channel marking signals corresponding to idle ones of said channels to said control network on a one at a time basis, means controlled by the marking signals applied to said control network by said allotter for assigning an individual channel for the transmittal of called unit selecting information between each calling unit and any one of said registers, means in each register for registering the designation of a called unit responsive to the receipt of called unit selecting information in the channel assigned to that register, means for controlling on a one at a time basis each register having a called unit designation registered therein to apply network and channel marking signals corresponding to the channel assigned to that register to said control network, means for controlling the called unit corresponding to the called unit designation registered in each register to seize the channel identified by the marking signals applied to said control network by that register, and means for controlling said allotter to discontinue the application of marking signals to said control network whenever one of said registers is applying marking signals to said control network.

24. In a telephone system, a plurality of line terminating units, a register, a multichannel transmission network interconnecting said units and said register, a channel identifying storage circuit in each of said units and in said register, a control network interconnecting said storage circuits, a channel allotter, means in said allotter for applying a marking signal identifying one of said channels to said control network, means for controlling the storage circuits in a calling one of said units and in said register to read in the marking signal applied to said control network by said allotter to thereby store the identification of said one channel, means controlled by the storage circuits in the calling unit and said register for connecting the line associated with said calling unit and said register to said one channel for the transmittal of called unit selecting information to said register, means in said register responsive to the receipt of called unit selecting information for registering the designation of the called unit, means for thereafter controlling the storage circuit in said register to read out the marking signal identifying said one channel to said control network, and means for controlling the storage circuit in the called unit as determined by the designation registered in said register to read in the marking signal applied to said control network by said register.

25. In a telephone system, a plurality of line terminating units, a plurality of registers, a multichannel transmission network interconnecting said units and said registers, a channel identifying storage circuit in each of said units and in said registers, a control network interconnecting said storage circuits, a channel allotter, means in said allotter for applying marking signals individually corresponding to idle ones of said channels to said control network on a one at a time basis, means for controlling the storage circuits in a calling one of said units and in one of said registers to read in the marking signal applied to said control network by said allotter and thereby seize one of said channels for the transmittal of called unit selecting information between said one unit and said one register, means in each register for registering the designation of a called unit responsive to the receipt of called unit selecting information in the channel seized by that register, means for controlling on a one at a time basis the storage circuit in each register having a called unit designation registered therein to read out the marking signal identifying the channel seized by that register to said control network, means for controlling said allotter to discontinue the application of marking signals to said control network whenever one of said registers is reading out, and means for controlling the storage circuit in the called unit corresponding to the called unit designation registered in a particular register to read in the marking signal applied to said control network by that register.

26. The system of claim 25 including means for assigning an individual time position which recurs in repetitive time position frames to each of said channels.

27. In a telephone system, a plurality of line terminating units, a plurality of registers, a plurality of transmission highway networks of the time position channel type interconnecting said units and said registers, a storage circuit in each of said units and registers, a control network interconnecting said storage circuits, a channel allotter, means in said allotter for applying network and channel marking signals corresponding to idle ones of said channels to said control network on a one at a time basis, means for controlling the storage circuits in a calling one of said units and in one of said registers to read in the network and channel marking signals applied to said control network by said allotter and thereby seize one of said channels for the transmittal of called unit selecting information between said one unit and said one register, means in each register for registering the designation of a called unit responsive to the receipt of called unit selecting information in the channel seized by that register, means for controlling on a one at a time basis the storage circuit in each register having a called unit designation registered therein to read out the network and channel marking signals corresponding to the channel seized by that register to said control network, means for controlling said allotter to discontinue the application of marking signals to said control network whenever one of said registers is reading out, and means for controlling the storage circuit in the called unit corresponding to the called unit designation registered in a particular register to read in the marking signals applied to said control network by that register.

28. In a telephone system, a plurality of lines, a multichannel transmission network interconnecting said lines, a channel allotter, means for controlling said allotter to individually assign idle ones of said channels to calling ones of said lines in turn, means responsive to the assignment of a channel to a calling one of said lines for marking that channel as busy to said allotter, means for transmitting a release signal over each of said lines when a call is terminated on that line, a monitor circuit, means in said monitor circuit for continuously scanning said channels for release signals, and means in said monitor circuit responsive to the receipt of a release signal in any one of said channels for marking that channel as idle to said allotter.

29. The system of claim 28 including means for assigning an individual time position which recurs in repetitive time position frames to each of said channels.

30. In a telephone system, a plurality of lines, a plurality of transmission highway networks of the time division channel type interconnecting said lines, a channel allotter, means for controlling said allotter to individually assign an idle channel in any one of said networks to each calling line, means responsive to the assignment of a channel to a calling one of said lines for marking that channel as busy to said allotter, means for transmitting a release signal over each of said lines when a call is terminated on that line, a plurality of highway monitor circuits individually associated with each of said highway networks, means in each monitor circuit for continuously scanning the channels of its associated network for release signals, and means in each monitor circuit responsive to the receipt of a release signal in any one of the channels of its associated network for marking that channel idle to said allotter.

31. In a telephone system, a plurality of lines, a multichannel transmission highway network interconnecting said lines, means for assigning an individual channel for the transmission of speech and supervisory signals between pairs of calling and called ones of said lines, means for transmitting a voice frequency release supervisory signal over each of said lines when a call is terminated on that line, a highway monitor circuit, means in said monitor circuit for continuously scanning said channels for release supervisory signals, and means responsive to the detection of a release supervisory signal in any one of said channels by said monitor circuit for freeing said one channel for use on another call.

32. The system of claim 31 including means for assigning an individual time position which recurs in repetitive time position frames to each of said channels.

33. In a telephone system, a plurality of lines, a plurality of transmission highway networks of the time position channel type interconnecting said lines, means for assigning an individual channel in any one of said networks for the transmission of speech and supervisory signals between pairs of calling and called ones of said lines, means for transmitting a voice frequency release supervisory signal over each of said lines when a call is terminated on that line, a plurality of highway monitor circuits individually associated with each of said highway networks, means in each monitor circuit for continuously scanning the channels of its associated network for release supervisory signals, and means responsive to the detection of a release supervisory signal in any one of the channels in any one of the networks by the monitor circuit associated with that network for freeing said one channel for use on another call.

34. In a telephone system, a plurality of lines, a plurality of line terminating units individually associated with said lines, a multichannel transmission network interconnecting said units, means responsive to the initiation of a call on any one of said lines for seizing the unit associated with that line, a channel allotter for individually assigning idle ones of said channels to seized ones of said units in turn, means responsive to the assignment of a channel to one of said units for marking that channel as busy to said allotter, means in each unit for connecting the line associated with that unit to the channel assigned to that unit for the transmittal of speech and supervisory signals therebetween, means for transmitting a voice frequency release supervisory signal over each of said lines when a call is terminated on that line, a monitor circuit, means in said monitor circuit for continuously scanning said channels for release supervisory signals, means responsive to the detection of a release supervisory signal in any one of said channels by said monitor circuit for marking that channel as idle to said allotter, and means in each unit responsive to the receipt of a release supervisory signal over its associated line for disconnecting that line from its assigned channel after a delay of sufficient duration to allow said monitor circuit to detect the release supervisory signal in the assigned channel.

35. The system of claim 34 including means for assigning an individual time position which recurs in repetitive time position frames to each of said channels.

36. In a telephone system, a first office, a second office, a tandem office, a first trunk line interconnecting said first and tandem offices, a second trunk line interconnecting said second and tandem offices, first and second trunk circuits terminating said first and second trunk lines, respectively, in said tandem office, a multichannel transmission network interconnecting said first and second trunk circuits, means for completing a connection between said first and second offices, said connection including said first trunk line, said first trunk circuit, one of said channels, said second trunk circuit, and said second trunk line, means in said first office for transmitting a release supervisory signal over said first trunk line at the termination of the call, a monitor circuit in said tandem office, means in said monitor circuit for continuously scanning said channels for supervisory signals, means in said monitor circuit responsive to the detection of a release supervisory signal in said one channel for regenerating said release supervisory signal and applying said regenerated release signal to said one channel, means in said first trunk circuit responsive to the receipt of a release supervisory signal over said first trunk line for disconnecting said first trunk circuit from said one channel after a delay of sufficient duration to allow said monitor circuit to detect the release supervisory signal in said one channel, means in said second office responsive to the receipt of said regenerated release signal over said second trunk line for transmitting a release acknowledge supervisory signal over said second trunk line to said tandem office, means in said monitor circuit responsive to the detection of said release acknowledge supervisory signal in said one channel for freeing said one channel for use on another call, and means in said second trunk circuit responsive to the receipt of a release acknowledge signal over said second trunk line for disconnecting said second trunk circuit from said one channel after a delay of sufficient duration to allow said monitor circuit to detect the release acknowledge supervisory signal in said one channel.

37. The system of claim 36 including means for assigning an individual time position which recurs in repetitive time position frames to each of said channels.

38. In a telephone system, a first office, a tandem office, a first trunk line interconnecting said first office and said tandem office, a plurality of trunk circuits in said tandem office including a first trunk circuit terminating said first trunk line, a speech and supervisory signal multichannel transmission network interconnecting said trunk circuits, a channel allotter in said tandem office for marking an idle one of said channels to said trunk circuits, means responsive to the initiation of a call in said first office for seizing said first trunk circuit over said first trunk line, means responsive to the seizure of said first trunk circuit for controlling said first trunk circuit to connect to the marked one of said channels, means in said first office for transmitting digital information corresponding to a second one of said trunk circuits over said first trunk line, means in said tandem office responsive to the receipt of said digital information for connecting said second trunk circuit to said one channel, means in said first office for transmitting a release supervisory signal over said first trunk line at the termination of a call, a monitor circuit in said tandem office, means in said monitor circuit for continuously scanning said channels for supervisory signals, means in said monitor circuit responsive to the detection of a release supervisory signal in said one channel for regenerating said release supervisory signal and applying said regenerated signal to said one channel, means in said first trunk circuit responsive to the receipt of said release supervisory signal over said first trunk line for disconnecting said first trunk circuit from said one channel after a delay of sufficient duration to allow said monitor circuit to detect said release supervisory signal in said one channel, a second office, a second trunk line interconnecting said second trunk circuit and said second office, means in said second office responsive to the receipt of said regenerated release supervisory signal over said second trunk line for transmitting an acknowledge supervisory signal over said second trunk line to said tandem office, means in said monitor circuit responsive to the detection of said acknowledge supervisory signal in said one channel for marking said one channel idle to said allotter, and means in said second trunk circuit responsive to the receipt of an acknowledge signal over said second trunk line for disconnecting said second trunk circuit from said one channel after a delay of sufficient duration to allow said monitor circuit to detect the release acknowledge signal in said one channel.

39. The system of claim 38 in which the means in said tandem office responsive to the receipt of said digital information for connecting said second trunk circuit to said one channel comprises a register which is connected to said one channel simultaneously with the connection of said first trunk circuit thereto, and which is disconnected from said one channel after said second trunk circuit is connected thereto.

40. The system of claim 38 including means for assigning an individual time position which recurs in repetitive time position frames to each of said channels.

41. In a telephone system, a first office, a second office, a tandem office, a first trunk line interconnecting said first office and said tandem office, a second trunk line interconnecting said second office and said tandem office, first and second trunk circuits terminating said first and second trunk lines, respectively, in said tandem office, means for extending a connection from said first office to said second office, said connection including said first and second trunk circuits, means in said first office for transmitting a voice frequency release signal over said first trunk line at the termination of the call, means in said tandem office responsive to the receipt of said release signal for regenerating said release signal and for applying said regenerated release signal to said second trunk line, means in said tandem office also responsive to the receipt of said release signal for releasing said first trunk circuit, means in said second office responsive to the receipt of said regenerated release signal over said second trunk line for applying a voice frequency release acknowledge signal to said second trunk line, means in said tandem office responsive to the receipt of said release acknowledge signal for discontinuing the application of said regenerated release signal to said second trunk line, and means in said tandem office also responsive to the receipt of said release acknowledge signal over said second trunk line for releasing said second trunk circuit.

42. In a telephone system, a first office, a second office, a tandem office, means for extending a connection from said first office to said second office through said tandem office, means in said first office for transmitting a release signal to said tandem office at the termination of a call, means in said tandem office for regenerating the received release signal and for transmitting the regenerated release signal to said second office, means in said tandem office responsive to the receipt of a release signal from said first office for transmitting a release acknowledge signal to said first office, means in said first office responsive to the receipt of a release acknowledge signal from said tandem office for discontinuing the transmission of a release signal to said tandem office, means in said second office responsive to the receipt of said regenerated release signal for transmitting a release acknowledge signal to said tandem office, and means in said tandem office responsive to the receipt of a release acknowledge signal from said second office for discontinuing the transmission of said regenerated release signal to said second office.

43. In a telephone system, a plurality of line terminating units, a transmission highway network of the time division channel type interconnecting said units, each of said units comprising a gate adapted to be activated to pass signals between that unit and said network, a channel identifying storage circuit in each of said units, a control network interconnecting said storage circuits, a channel allotter, means in said allotter for applying a marking signal identifying one of said channels to said control network, a pulse generator for developing recurring pulses corresponding to said time division channels, means for transmitting said pulses to said units, means for controlling the storage circuit in a calling one of said units to read in the marking signal applied to said control network by said allotter to thereby store the identification of said one channel, and means in said calling unit controlled in accordance with the identification stored in its storage circuit for utilizing the received pulses corresponding to said one channel for activating the gate in that unit.

44. In a telephone system, a plurality of line terminating units, a transmission highway network comprising first and second pairs of conductors interconnecting said units, each of said units comprising a first gate adapted to be activated to pass signals from that unit to said first pair of conductors and to pass signals from said second pair of conductors to that unit, each of said units also comprising a second gate adapted to be activated to pass signals from that unit to said second pair of conductors and to pass signals from said first pair of conductors to that unit, a pulse generator for developing recurring pulses corresponding to a plurality of time division channels, means for transmitting said pulses to said units, means for assigning an individual one of said channels to pairs of calling and called ones of said units, means in each calling unit for utilizing the received pulses corresponding to the channel assigned to that unit for activating the first gate in that unit, and means in each called unit for utilizing the received pulses corresponding to the channel assigned to that unit for activating the second gate in that unit.

45. In a telephone system, a plurality of line terminating units, a transmission highway network of the time division channel type comprising first and second pairs of conductors interconnecting said units, each of said units comprising a first gate adapted to be activated to pass signals from that unit to said first pair of conductors and to pass signals from said second pair of conductors to that unit, each of said units also comprising a second gate adapted to be activated to pass signals from that unit to said second pair of conductors and to pass signals from said first pair of conductors to that unit, a pulse generator for developing recurring pulses corresponding to said time division channels, means for transmitting said pulses to said units, a channel identifying storage circuit in each of said units, a control network interconnecting said storage circuits, a channel allotter, means in said channel allotter for applying a marking signal identifying one of said channels to said control network, means for controlling the storage circuit in a calling one of said units to read in the marking signal applied to said control network by said allotter to thereby store the identification of said one channel, means in said calling unit for utilizing the received pulses corresponding to said one channel for activating the first gate in that unit, a register, means in said register for applying a marking signal identifying said one channel to said control network, means for controlling the storage circuit in the called unit to read in the marking signal applied to said control network by said register to thereby store the identification of said one channel, and means in the called unit for utilizing the received pulses corresponding to said one channel for activating the second gate in that unit.

46. In a telephone system, a plurality of line terminating units, a plurality of transmission highway networks of the time division channel type interconnecting said units, each of said units comprising a plurality of gates individually corresponding to said transmission networks, the gates in each unit being adapted to be activated to pass signals between that unit and said transmission networks, a channel and transmission network identifying storage circuit in each of said units, a control network interconnecting said storage circuits, means for applying marking signals to said control network identifying one of said transmission networks having an idle channel therein and an idle one of said channels within that network, means for controlling the storage circuit in a calling one of said units to read in the marking signals applied to said control network to thereby store the identification of said one transmission network and said one channel, a pulse generator for developing recurring pulses corresponding to said time division channels, means for transmitting said pulses to said units, and means in said calling unit controlled in accordance with the identification stored in its storage circuit for utilizing the received pulses corresponding to said one channel for activating the gate corresponding to said one transmission network.

References Cited in the file of this patent

UNITED STATES PATENTS

| | | |
|---|---|---|
| 2,522,000 | Shepherd | Sept. 12, 1950 |
| 2,577,141 | Mauchly et al. | Dec. 4, 1951 |
| 2,727,094 | Flowers et al. | Dec. 13, 1955 |
| 2,747,021 | Chubb et al. | May 22, 1956 |
| 2,841,657 | Trousdale | July 1, 1958 |
| 2,890,284 | Flood | June 9, 1959 |
| 2,921,137 | Morris et al. | Jan. 12, 1960 |